United States Patent [19]

Whisler

[11] Patent Number: 5,053,945

[45] Date of Patent: Oct. 1, 1991

[54] SYSTEM AND METHOD FOR PERFORMING A MULTI-FILE TRANSFER OPERATION

[75] Inventor: John W. Whisler, Raleigh, N.C.

[73] Assignee: Alphatronix, Research Triangle Park, N.C.

[21] Appl. No.: 254,274

[22] Filed: Oct. 6, 1988

[51] Int. Cl.⁵ .................... G06F 13/10; G06F 12/08; G06F 12/02

[52] U.S. Cl. .................... 364/200; 364/239.6; 364/245.6; 364/245.7; 364/246; 364/251.6; 364/254.3; 364/256.3; 364/256.8; 364/243.2

[58] Field of Search ................ 364/468, 32, 200, 900

[56] References Cited

U.S. PATENT DOCUMENTS

| | | | |
|---|---|---|---|
| 4,215,407 | 7/1980 | Gomola et al. | 364/468 |
| 4,449,182 | 5/1984 | Rubinson et al. | 364/200 |
| 4,603,382 | 7/1986 | Cole et al. | 364/200 |
| 4,675,807 | 6/1987 | Gourneau et al. | 364/200 |
| 4,752,910 | 6/1988 | Yen et al. | 364/900 |
| 4,792,937 | 12/1988 | Picard | 369/59 |
| 4,825,354 | 4/1989 | Agrawal et al. | 364/200 |
| 4,827,462 | 5/1989 | Flannagan et al. | 369/32 |
| 4,888,691 | 12/1989 | George et al. | 364/200 |
| 4,901,232 | 2/1990 | Harrington et al. | 364/200 |

Primary Examiner—Thomas C. Lee
Assistant Examiner—Daniel Pan
Attorney, Agent, or Firm—Staas & Halsey

[57] ABSTRACT

The present invention is a system and method which follows a directory tree of a random access disk 20 to obtain file location information and the contents for multiple files. For each file found an entry is created on a file description ring 90 and the file location information is stored in the entry. An insert pointer indicates the next available entry on the ring 90. The system then stores the different type location information (for example file headers, directories and directory headers are different types) for each of the files in corresponding segmented ring buffers 172, 176 and 192 dedicated to storing information of only a single type. The file content is also stored in a dedicated segmented file content ring buffer 132. Each time a ring is updated with information for a file, a corresponding operation pointer (96, 100 and 102) for the ring 90 is advanced. When a ring segment is full, the system transfers the segment to a corresponding location on a destination disk 24 and updates a file allocation list ring 162. The writing of file contents from ring 132 advances a write operation pointer 98. When all files have been written the file allocation list ring 162 is written out to the disk 24. The buffering of the different types of information until a ring segment is full reduces the number of write operations and, not only enhances source read out speed since the read operation does not have to wait for the write operation to occur before the next read operation can start because the data read is stored in the segmented buffer rings, but also enhances write speed by writing segments and increases drive life expectancy by reducing mechanical motion.

8 Claims, 22 Drawing Sheets

Microfiche Appendix Included
(1 Microfiche, 72 Pages)

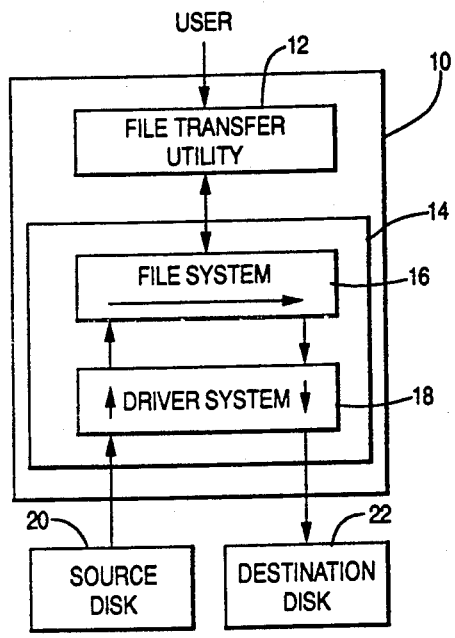
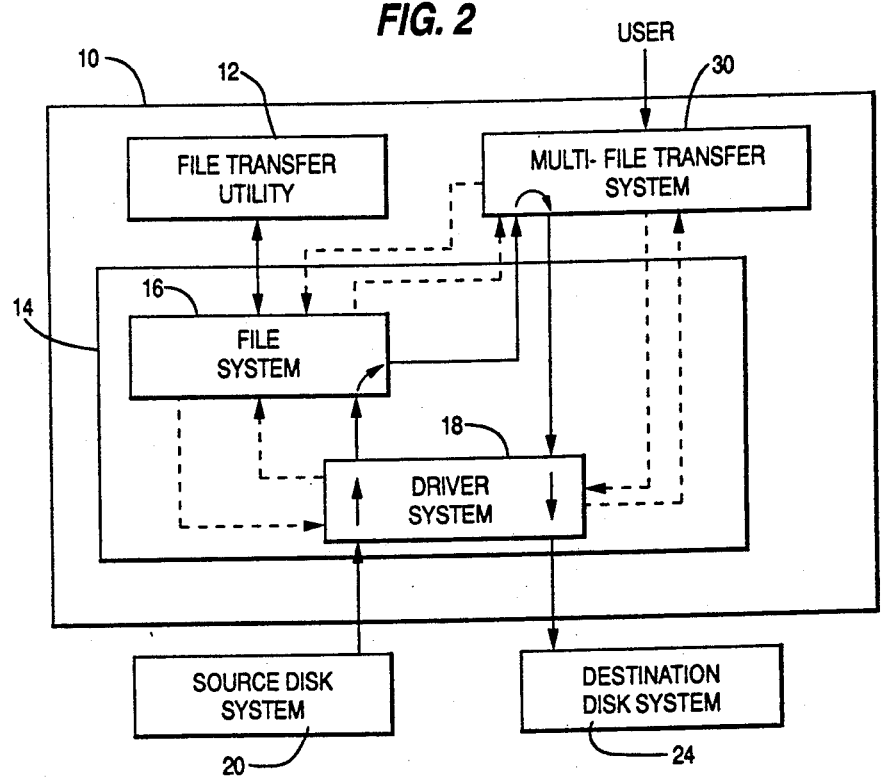

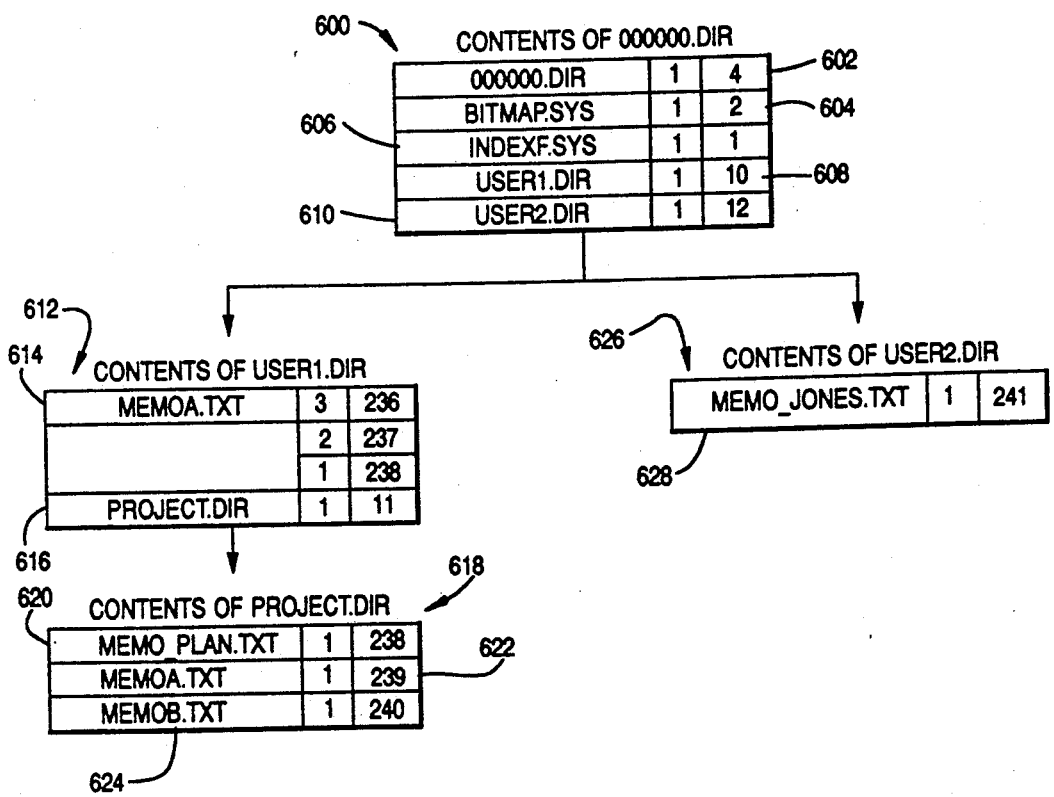

SYSTEM AND METHOD FOR PERFORMING A MULTI-FILE TRANSFER OPERATION

REFERENCE TO MICROFICHE APPENDIX

The present application includes a microfiche appendix that has 72 frames on one fiche.

BACKGROUND OF THE INVENTION

1. Field of the Invention

The present invention is directed to a system and method for performing a multi-file transfer operation where several files are transferred from a random access storage device to a media such an optical disk and, more particularly, to a system which reduces the number of write operations to the media by storing portions of files of the same type in ring buffers until sufficient information is stored to transfer the contents of the ring buffer to the disk.

2. Description of the Related Art

Conventional multi-file transfers are accomplished in one of two ways. During archival or backup operations in which multiple files from a hard magnetic disk are transferred to magnetic tape, a file transfer utility program reads the information describing the file (file attribute information), transfers this information to the tape and then reads the contents of the file and transfers this to the tape. If the information describing the file is divided into sections and these sections are located at different physical locations on the disk, which is a common occurrence, multiple reads and multiple writes must be performed. During this transfer operation the method for accessing the files is converted from random to sequential due to the storage characteristics of the magnetic tape, thereby severely limiting the ability of the user to recover the file from the tape in a timely fashion if needed.

In multi-file transfer operations in which the files are being transferred from one hard magnetic disk (the source) to another hard disk (the destination), as illustrated in FIG. 1, the multiple read-multiple write sequence mentioned above also occurs. In such a prior art system, the computer 10, such as a Digital Equipment Corporation (DEC) VAX computer running the VIRTUAL MEMORY SYSTEM (VMS) operating system, is commanded by a user to transfer the contents of a source disk 20 to a destination disk 22. The operation is controlled by a file transfer utility 12 (such as the BACKUP or COPY utility of VMS) which issues a transfer command to the operating system 14. The operating system 14 has a file system 16 (such as the XQP Ancillary Control Processor of VMS) which is a generic system capable of controlling transfers between various types of media. The file system 16 controls driver systems 18 which are dedicated to a particular type media to accomplish the transfer.

When either a copy or backup utility command is executed, four distinct pieces of information must be obtained from different portions of a source disk 20 and transferred to corresponding portions of a destination disk 22 after which the portions of the destination disk 22 which have been written must be flagged as "in use" or "allocated" which is a fifth indicator or piece of information for each file. The DEC-VMS operating system stores a file using these five parts. Other operating systems such as IBM-DOS, UNIX and AEGIS store the information in at least three parts.

In the DEC-VMS operating system the four pieces of information transferred are a directory header, a directory itself referenced by the directory header, a file header and the contents of the file referenced by the file header. During such a transfer, the source disk 20 is accessed to obtain the directory header which is then written onto the destination disk 22 in a corresponding location in a file called the index file. Next the directory pointed to by the directory header is retrieved from the source disk 20 and written on the destination disk 22 in a corresponding location. Then, the file header pointed to by the directory for the file being transferred is retrieved from the source disk 20 and written in a corresponding location in the index file on the destination disk 22. The last retrieval from the source disk 20 retrieves the contents of the file designated by the header which is then written onto the destination disk 22 in a corresponding location. The last operation associated with this file is to update the corresponding flag bits in an allocation control list on the destination disk 22 to indicate that the portions written have been allocated or in use. For each file moved in a DEC-VMS system four read operations and five write operations must be performed.

Most computer users store valuable information in their computer that requires that a backup copy be kept in a safe place to protect against fire of the computer site, a computer malfunction or other disaster that can destroy the information. Until the availability of erasable optical disks, users had only four options for making backup copies.

The first is creating the backup copy using magnetic tape. This type of backup copy provides satisfactory capacity and site removability at an acceptable cost but does not provide rapid access to the information because the mechanical drive is slow and the access method is serial rather than random. In addition, the tape and tape drives are not particularly reliable. The second option is to use floppy disks. This storage media provides removable random access capability at an acceptable price but is too small in capacity for large scale backup operations and has a slow access speed because of the low rotation rate of the disks. The third option is a backup on a removable hard disk. This option provides good removable random access capacity and reliability at an acceptable speed, however, the cost is very high because the removable assembly contains the head and mechanical and electrical components for head control. The final option is write-once optical disks. This media provides acceptable capacity, reliability and speed along with removability and random access capability at a high price because the media cannot be reused. The most popular option is the tape backup method with the vast majority of backup copies being made on tape and floppy disks.

The programs used to transfer the information onto the backup copy is designed mainly for use with tapes and floppy disks. Because the media is slow the backup software is also slow. High speed backup operations are not possible because of the limitations of the tape or floppy disk drives and media.

A prior art disk write method which is not used for back-up or multi-file transfer operations, is generally called a disk cache method and is used for enhancing the speed of access to disk file contents. In this disk access method, an image or exact duplicate of the contents of the disk 22 which are most frequently accessed is maintained in the random access memory (RAM) of the computer 10. Whenever a write operation by an application program occurs the data are written into the image location in the RAM. Whenever the data need to be retrieved the location in the image is accessed. Periodically in some of these systems, for example every five to ten seconds, the operating system performs a write operation which transfers the contents of a disk image onto the disk 22, so that the disk is updated with any changes that have occurred since the last disk write. Some of these types of systems maintain a change list which indicates which portions of the disk image have been changed and only those image portions which have been changed are written out onto the physical disk. The disk cache method speeds disk operations when the disk is used for a random mixture of read and write operations but provides no benefits in a multi-file write operation where data flow is in one direction and the vast majority of the data (file contents) ar accessed only once.

The need for faster backup software has arisen because of the advent of erasable optical disk storage systems. The present invention is a novel multi-buffering method designed for performing multi-file write operations quickly and making a backup copy is an example of a multi-file write operation.

SUMMARY OF THE INVENTION

It is an object of the present invention to provide a system which rapidly transfers multiple files from one media to a random access backup media.

It is another object of the present invention to provide a multiple file transfer system for transferring files to a removable media.

It is an additional object of the present invention to create a random access backup file.

It is a further object of the present invention to reduce the number of write operations thereby improving the mechanical life expectancy of a disk system.

It is also an object of the present invention to minimize disk drive rotational and lateral motions during a multi-file transfer operation.

It is still another object of the present invention to provide a multiple file transfer system which is particularly suitable for optical storage media and more particularly for erasable optical storage media.

It is also object of the present invention to provide a method which will perform a multi-file transfer by storing file contents in a contents buffer and file location information in an information buffer and separately writing the contents of the buffers to a storage media when the buffers reach a predetermined percentage full.

It is still another object of the present invention to save mechanical wear and tear on the destination disk drive and more importantly to increase the write speed for writing onto the disk by reducing the number of times the write head must change tracks, reduce the distance the write head must move when it must change tracks and reduce the number of revolutions required by the disk during a multi-file transfer operation.

The above objects can be attained by a system and method which follows a directory tree of a random access source disk to obtain file attribute information and the contents of multiple files. The system then stores the attribute information of each type (for example directories and directory headers are different types) for each of the files in segmented ring buffers each buffer being dedicated to storing information of only a single type, that is, related file information is stored together. The file contents are also stored in a dedicated segmented file content ring buffer. The ring buffers are kept in the random access memory of the computer. When a ring segment is full the system transfers the segment to a corresponding location on a destination disk and updates a segmented file allocation list ring. Segment size is chosen to maximize the data transfer rate to the disk. When all files have been written a file allocation list buffer ring is written out to the disk. The buffering of the different types of information until a ring segment is full reduces the number of write operations to the destination disk. The buffering enhances source disk read out speed since the read operation does not have to wait for the write operation to complete before the next read operation can start because the read data is stored in the segmented buffer rings. The buffering also reduces mechanical wear on the destination drive and enhances write speed.

These together with other objects and advantages which will be subsequentially apparent, reside in the details of construction and operation as more fully hereinafter described and claimed, reference being had to the accompanying drawings forming a part hereof, wherein in like numerals refer to like parts throughout.

BRIEF DESCRIPTION OF THE DRAWINGS

FIG. 1 illustrates a prior art file transfer system;

FIG. 2 illustrates the multi-file transfer system of the present invention;

FIG. 18 illustrates directory entries; and

FIG. 19 illustrates a created directory tree.

DESCRIPTION OF THE PREFERRED EMBODIMENTS

Figure 3:
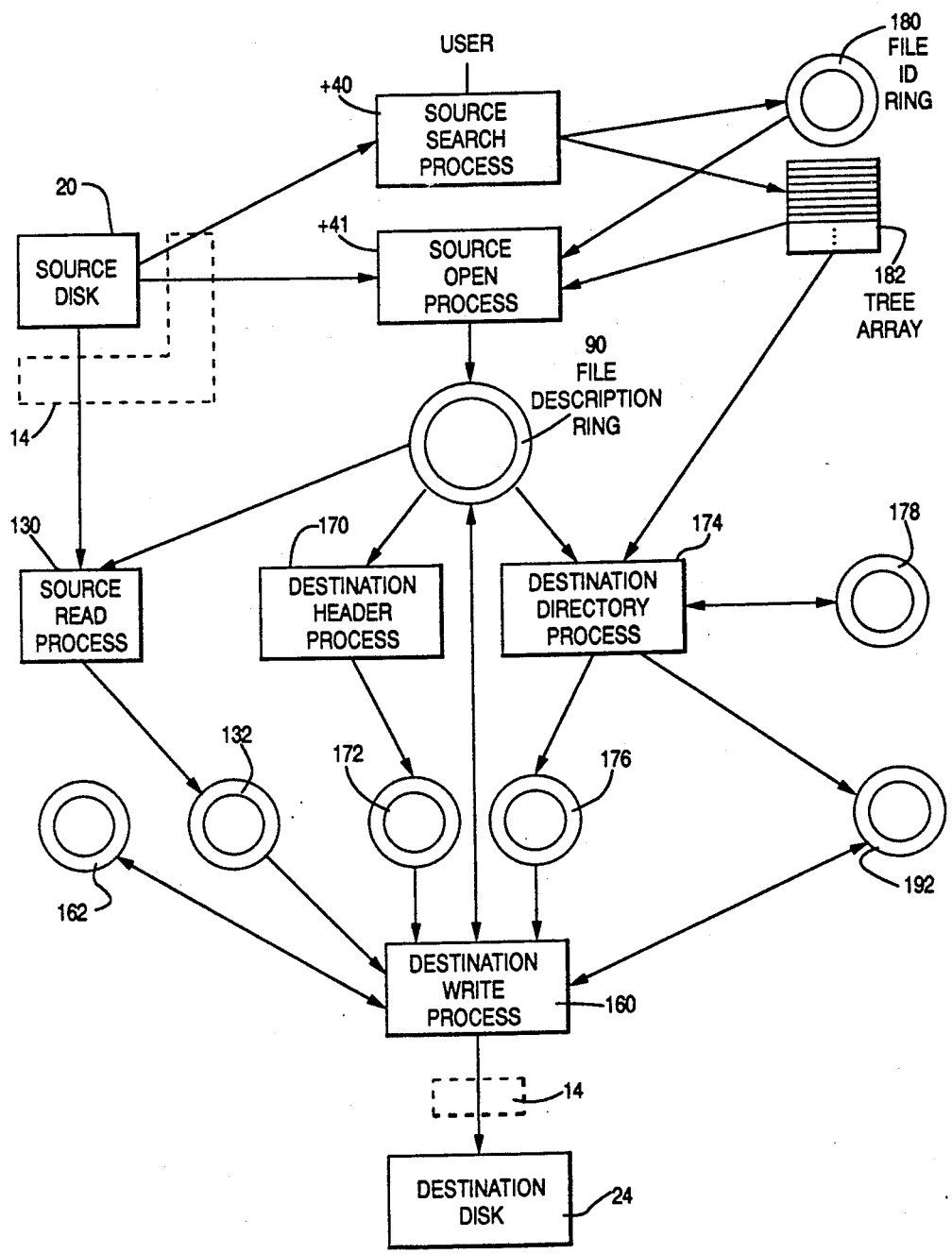
FIG. 3 depicts the processes and buffers of the present invention.

The preferred embodiment of the present invention illustrated in FIG. 2 is preferably implemented on a Digital Equipment Corporation (DEC) MICROVAX II computer 10 that is operating under the control of a DEC-VMS operating system 14 and that contains a file system 16 and driver system 18. The available RAM should be about one megabyte although the system will work with a smaller amount of storage. The computer language preferably used is Fortran however other languages such as Assembler and C can be used. The source disk system 20 would typically be a DEC RD54 hard drive and the destination disk system 24 is preferably an INFINITY erasable optical disk system available from Alphatronix, Inc. located in Durham, N.C. During a transfer the system 30 of the present invention, based on a user request, will transfer appropriate commands to the file system 16 for retrieving the files through the driver system 18 from the source disk 20. The files are transferred to ring buffers of the multi-file transfer system 30 of the present invention. The program of the present invention and ring buffers are preferably not swapped in a virtual memory system so that they will remain RAM resident and the efficiency improvements of the present invention will be realized. The system 30 transfers the contents of the ring buffers, into which the retrieved files have been divided, through the driver system 18 to the destination disk system 24. As can be seen by comparing FIG. 2 and FIG. 1 the present invention completely bypasses the file transfer utility 12 provided with the preferred computer system.

The present invention as illustrated in FIG. 3, includes several processes through which the VMS operating system 14 obtain files from the source disk 20 and stores them on the destination disk 24. When the user requests that several files be transferred from the source disk 20 to the destination disk 24, source search 40 and open 41 processes issues appropriate commands to the operating system 14 to traverse the source disk directory and file tree structure to obtain the file attribute information for the files being transferred. The source search process 40 is designated P1 in the appendix and the source open process 41 is designated P2 in the appendix. The source search process 40 finds the file names and IDs of the files designated by the user, preserves any file hierarchial information and assigns sequential search and file numbers as found.

The write process 160 to be discussed later divides the destination disk 24 into 4 non-overlapping regions where it stores the related file information for data files, directory files, data file headers and directory file headers. A fifth region is reserved for the allocation control list (traditionally called a BitMap). The regions for file headers lie within the index file, with the region for directory file headers preceding the region for data file headers. These regions in the index file are filled sequentially by ascending logical block numbers at a rate of 1 header (i.e. 1 block) per file, the location of a file's header in the index file and therefore its file number are known as soon as the file's position in the search order is determined. For example, the header for the 30th data file found will be placed in the 30th block of the region reserved for data file headers. The file number for the 30th file will therefore be 29 higher than the file number of the first data file found.

Figure 4A:
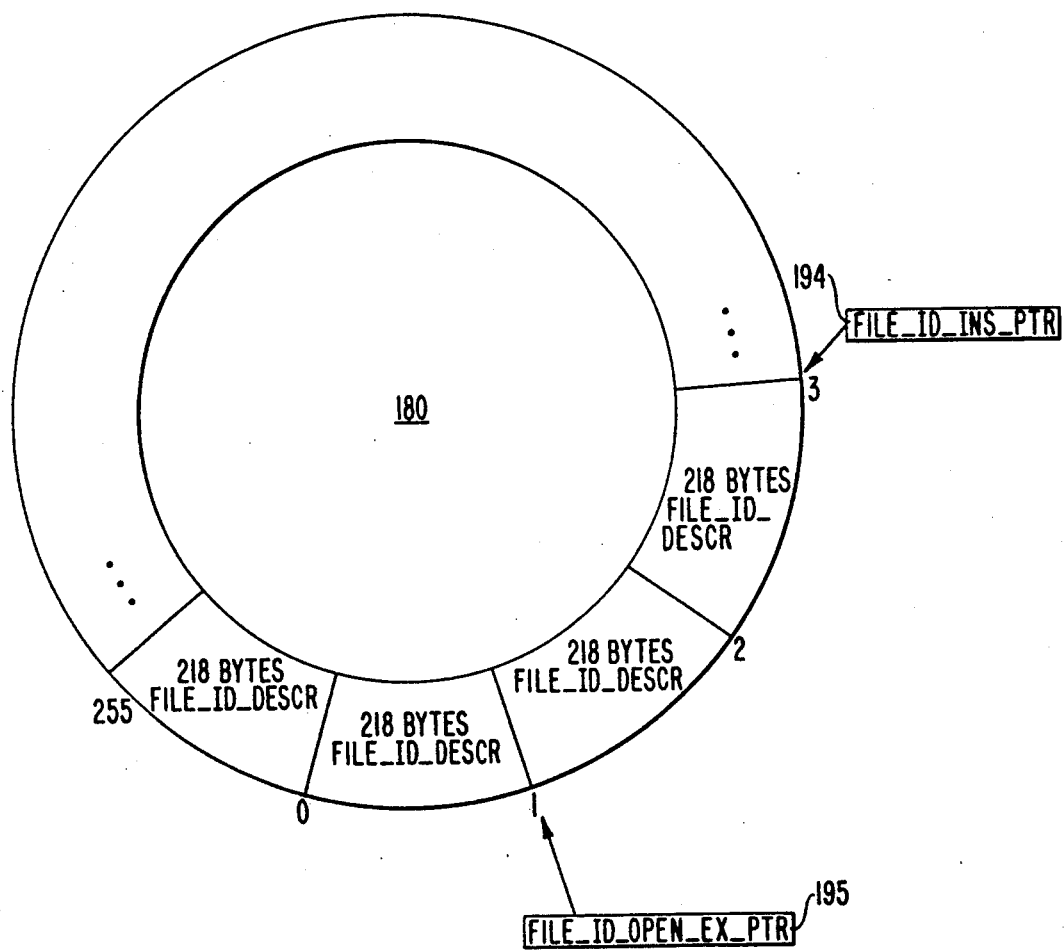
FIG. 4A is an example of a file ID ring 180.
Figure 4B:
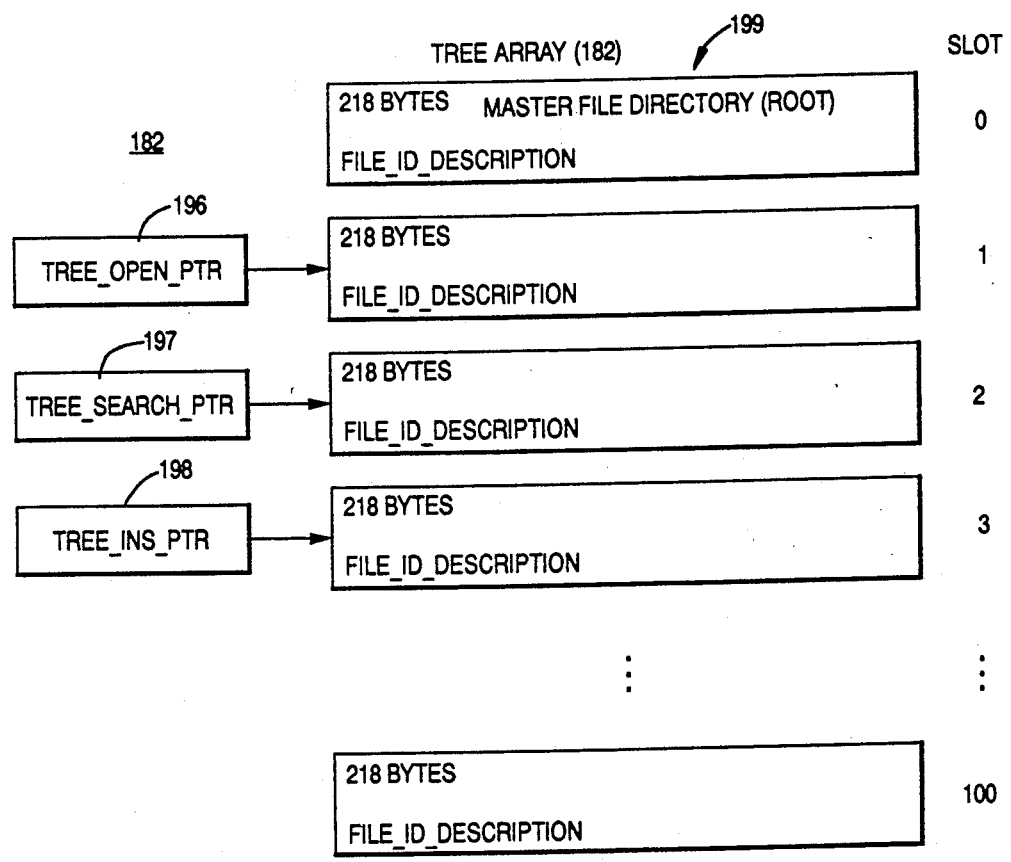
FIG. 4B is an example of a tree array 182.

The source search process 40 maintains a file number counter which is initialized to the file number of the first data file and is incremented for each data file found. This counter is copied into the file number field of the file's entry in a file ID ring 180 (See FIG. 4A) by the source search process 40. The source open process 41 then creates the file ID and a back link file ID from the file number fields of the file and its directory. The process of assigning file numbers and file IDs for a directory file is identical except that the file number counter maintained by the source search process is the current directory file number counter and its value is copied to the file number field in a tree array 182 (See FIG. 4B) instead of the file ID ring 180.

For each directory found the source search process 40 makes an entry in the tree array 182 and for each file found an entry is made in the file ID ring 180. The format for entries in the tree array 182 and the file ID ring 180 along with a definition of the information in each field can be found in the data structure definition designated DS2 in the appendix. Source open process 41 obtains a channel to the source disk 20 for each file and creates an entry in a file description ring 90 including the information stored in the ring 180 and the array 182. The definition for the entry in the file description ring can be found in the data structure definition designated DS1 in the appendix. A typical command for retrieving the attribute information and file ID in the VMS system is the $Q10 command and the format for the commands can be found at R1 and R2 in P1 and at R3 in P2. With each command request for a file using one of these commands the VMS operating system automatically searches for and finds a match for an input file name string which can include wild card identifiers and designates the directory in which the search is to be conducted and then returns the file name and file ID in response to the request. A person of ordinary skill in the art can provide an appropriate corresponding commands for other operating systems such as DOS used by IBM. The file description ring 90 is the means of coordinating the various processes. The source search and open processes 40, 41 inserts one entry 92 into the file description ring 90 for each file being transferred. The file description ring 90 preferably has 64 entries and will allow 64 files to be in transit at the same time. However, it is possible to increase or decrease the size of the ring 90 as desired.

Figure 4C:
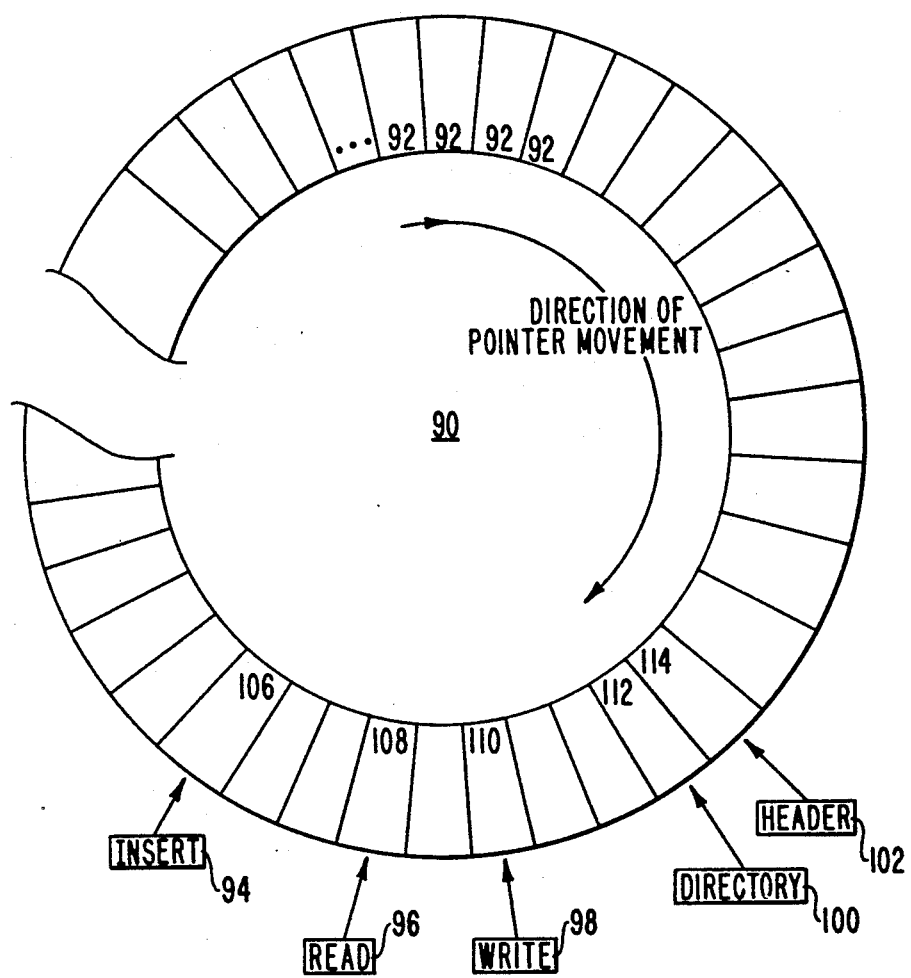
FIG. 4C is a file description buffer ring 90.

FIG. 4C illustrates the file description ring 90 in more detail and the contents of each entry 92 is set forth in DS1 in the appendix. Coordination of the processes of the present invention is critical because when the operation is complete, the right file contents must be matched with the right file attributes and entered in the correct directory with the correct disk blocks being marked as in use. This coordination is accomplished by current operation pointers 94-102 which point to entries 106-114 on the ring 90 which are currently being used by the processes of the present invention. For example, the file description ring insert pointer 94 identifies the entry 106 being currently filled by the source open process 41. When the entry 106 is complete the source open process 41 checks to see if the next entry in the direction of pointer movement has the directory pointer 100 or header pointer 102 pointing to it indicating that the entry is currently in use (See R7 in P2). When no pointers point to the entry the source open process 41 recognizes that the entry can be filled. That is, when an entry 92 has no pointers pointing to it, the source open process 41 recognizes that another file can be transferred. If the next entry 92 around the ring 90 is not pointed at by any of the pointers the source open process 41 advances the insert pointer 94 one slot clockwise and begins filling in the next entry 92. Similar coordination of other operations with respect to the process 40 and other processes is accomplished with the other pointers 96-102.

Figure 5:
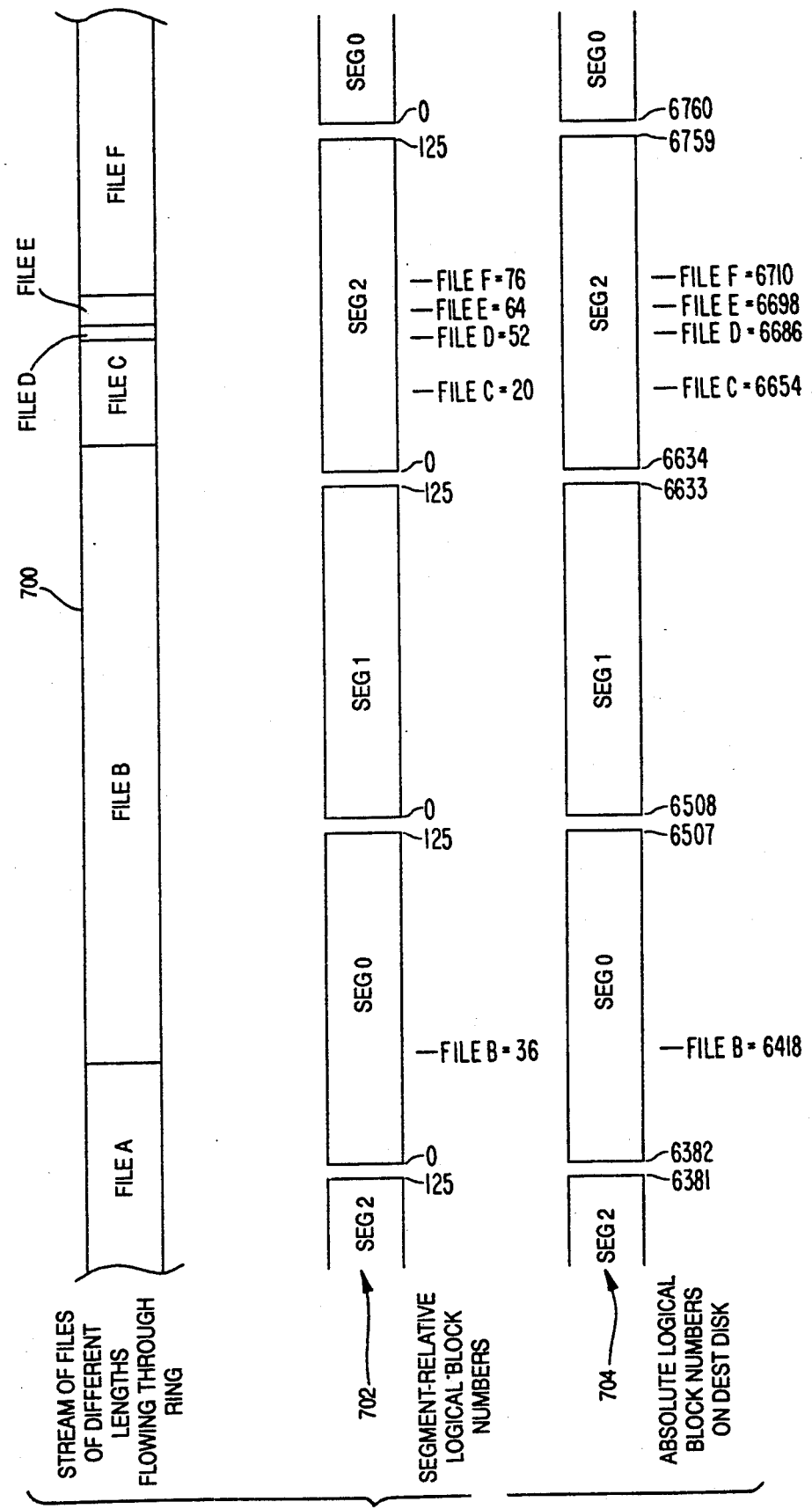
FIG. 5 illustrates determination of absolute file location from relative location.
Figure 6A:
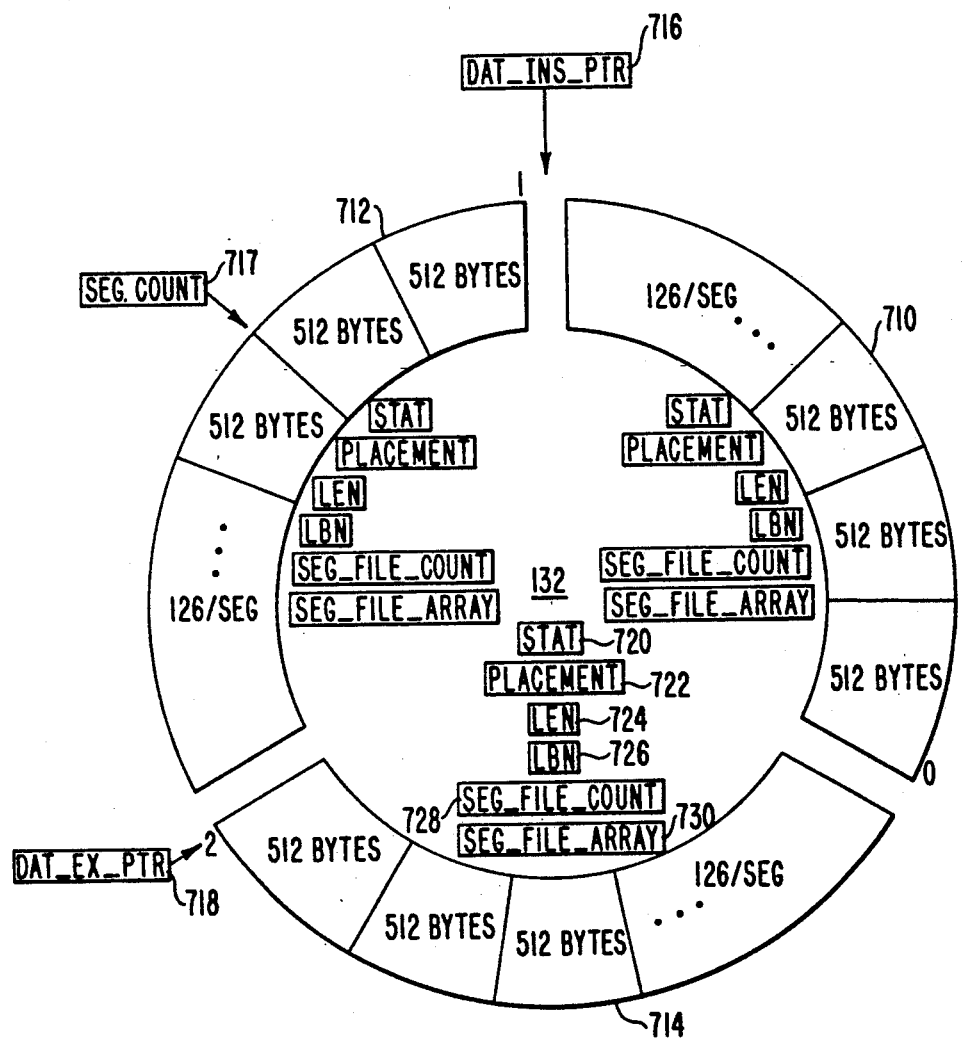
FIGS. 6A–6D illustrate segmented intermediate storage buffer rings 132, 172, 176 and 192 used in the present invention.
Figure 6B:
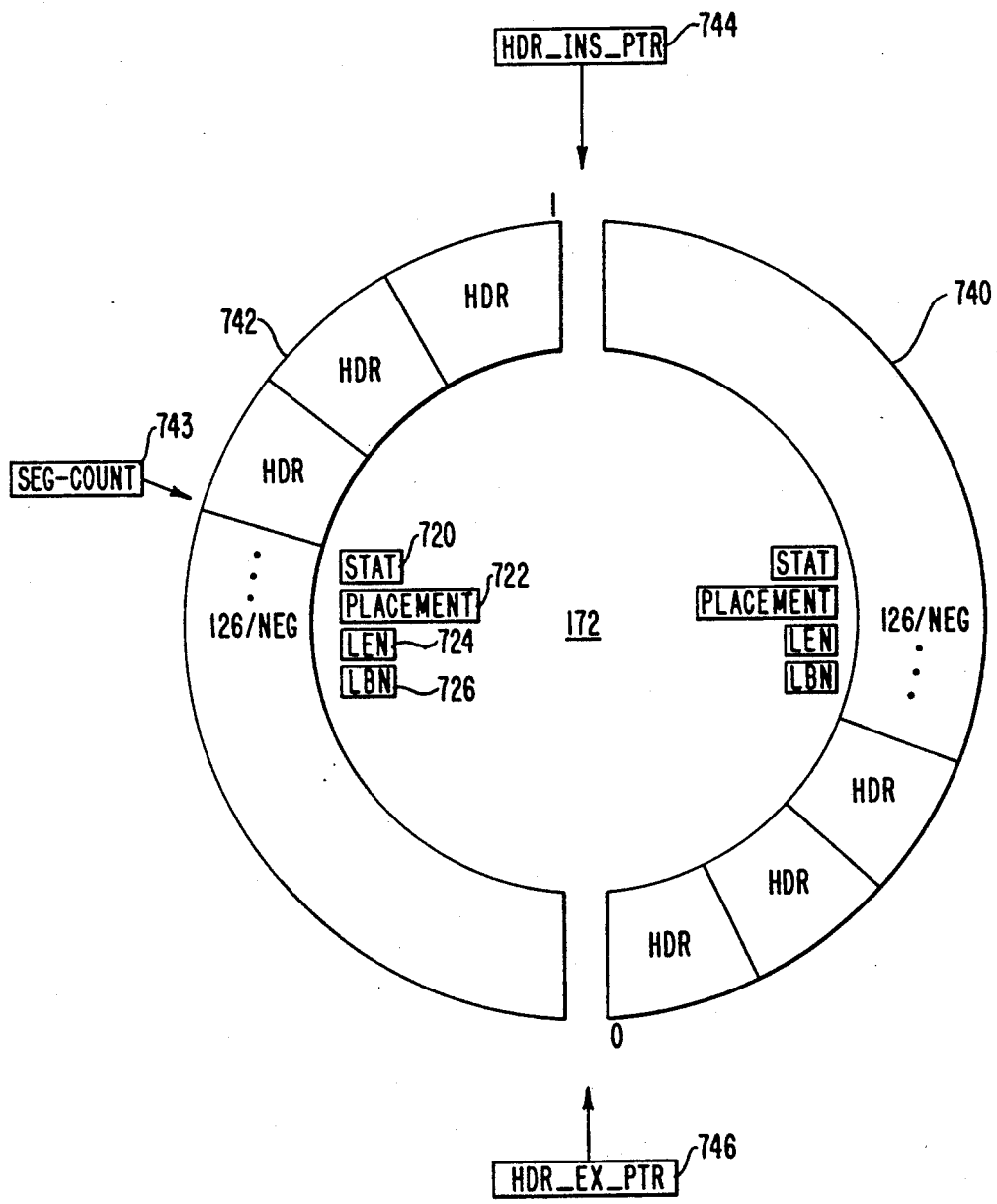
Figure 6C:
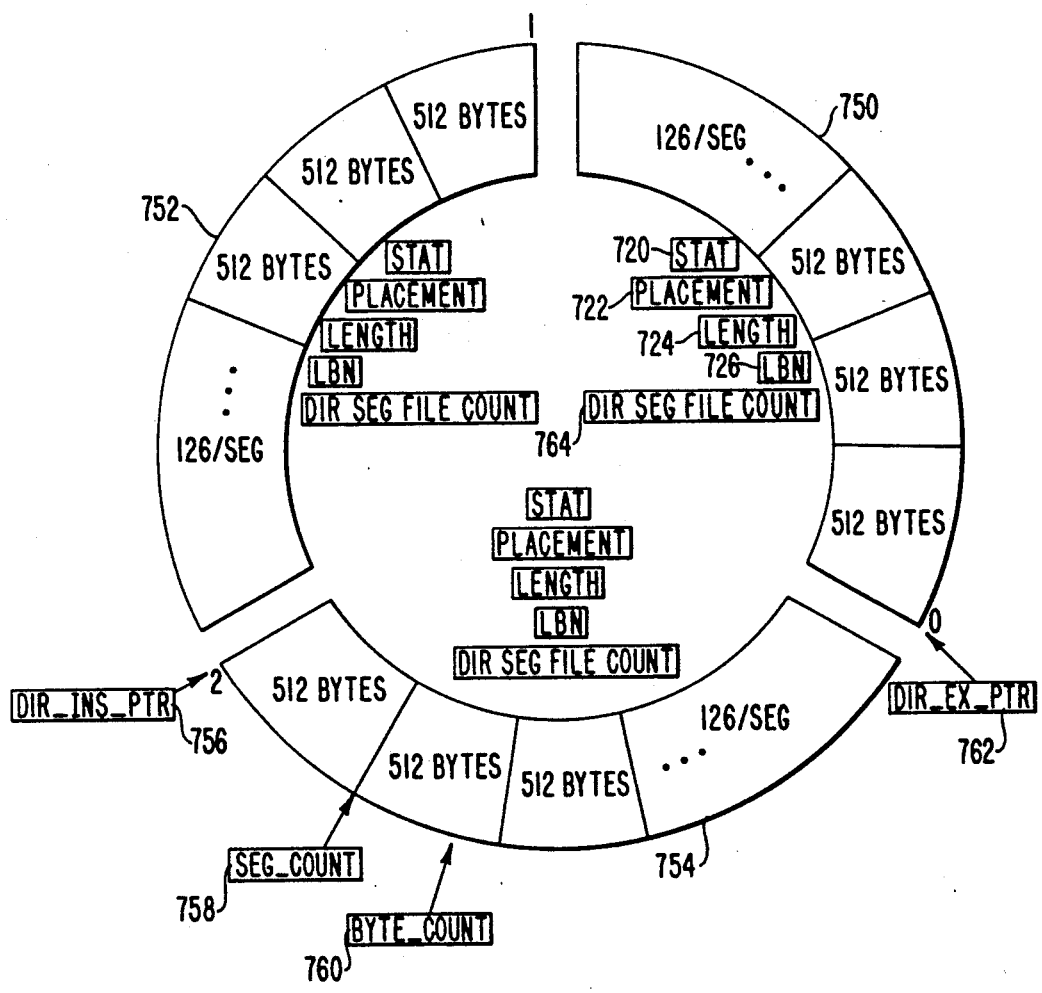
Figure 6D:
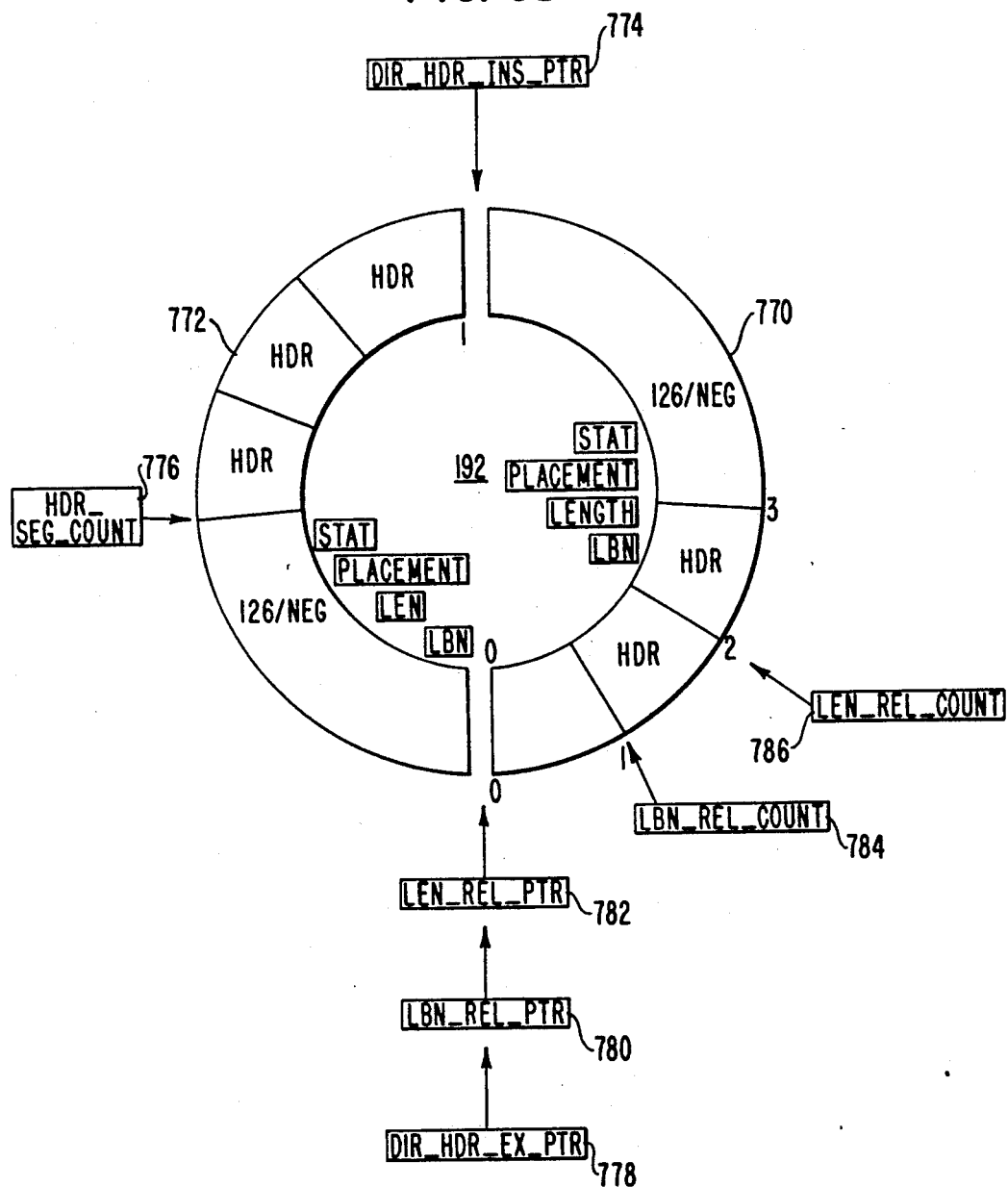

Once the source open process 41 has advanced the insert pointer 94, a source read process 130 (FIG. 3) can advance the read pointer 96 to the entry 108 created by the source open process 41 corresponding to the file being read. The source read process 130 will be explained more generally with respect to FIG. 9, however, the details of the process 130 can be found in P3 in the appendix. The source read process 130, after the read pointer 96 is advanced, transfers the file contents to a segmented data ring 132 by issuing a $Q10 command with the format as set forth at R8 in P3 to the VMS operating system 14. Each segment includes data blocks and data blocks are allocated in groups called clusters. The cluster size is variable and can be one or many data blocks. If there is no room on the data ring 132, the source read process 130 waits (See R9A in P3). When the source read process 130 completes reading a file and storing it on segmented ring 132, the process 130 checks to see if there is another file to read by determining whether the insert pointer 94 is pointing at the next element in a clockwise direction around the ring 90 (See R10 in P3). If the insert pointer 94 is not pointing to the next element, then the source read process 130 recognizes that there are more files to read. The source read process 130 then advances the read operation pointer 96 and begins to transfer the next file to the segmented ring 132. If there are no more files to read, the source read process 130 waits. The source read process 130 when it encounters a file for the first time stores the segment relative logical block number in ring 90, these numbers are illustrated in FIG. 5 (See R35 and R39 in P3). The write process 160 converts the relative numbers to absolute numbers when it writes the segment to the destination disk 24 as illustrated in FIG. 5 (See R36 in P6.7).

The segmented rings used in the present invention are illustrated in FIGS. 6A-6D. The data 132 and directory 176 rings each have three segments, while the header 172 and directory header 192 rings have two segments. A fewer number of segments for these rings decreases transfer speeds, while increasing the number of segments increases the transfer speed with diminishing returns and a decrease in available RAM and possibly increasingly the number of page faults. Each of these rings has pointers associated therewith around the exterior of the ring and on the interior of each ring is an illustration of the information stored about each segment where stat 720 is the field where the status of the segment is stored and an explanation of the contents of this field can be found at F1 in the appendix; placement 722 indicates the storage method for the segment where sequential storage is preferred but other storage methods are possible; LEN 724 is the length of the of the segment because it is possible to write partial segments; LBN 726 is the logical block number on the destination disk where the segment is to be stored; while the segment file count 728, segment file array 730 and directory segment file count 764 are all associated with the completion of incomplete headers discussed previously. The segment file count 728 is the number of files starting within that segment and in FIG. 5 the segment file count for segment 2 would be 4, the segment file array 730 is the slot number in ring 90 for each of the four files and the directory segment file count 764 is the number of directory files that begin in the particular segment.

Each ring includes an insert pointer (716, 744, 756 and 774) which indicates which segment is currently being written into and a segment extract pointer (718, 746, 762, and 778) which indicates the segment available for writing. The segment count pointer 717 or 758 in FIG. 6A indicates the next available block for writing in the segment while the byte count pointer 760 indicates the next available byte for writing. Insert location (dir—hdr—ins—ptr 782, 774, hdr—seg—count 776) identifies the segment and block where the next directory header will be created. Length-release location (len—rel—ptr 782, len—rel—count 784) identifies the segment and block of the next directory header needing its length updated by the directory process 174. LBN-release location (lbn—rel—ptr 780, lbn—rel—count 784) identifies the segment and block of the next directory header needing its LBN (logical block number) field updated by the write process 160. Extract location (dir—hdr—ex—ptr 778) identifies the next segment of the ring 192 to be written to the destination disk by the write process 160. The four pointers (Insert, Length-release, LBN-Release, Extract) move around the ring 192 in strict order, though they may coincide. When the ring is empty they all coincide. When the Insert, Length-Release, LBN-Release pointers coincide all the headers in the ring are complete. The headers between the Insert and Length-Release pointers have just been created and are awaiting completion of both length and logical block number fields. The headers between the Length-Release and LBN-Release pointers are awaiting completion of their logical block number fields. The headers between LBN-Release and Extract pointers are waiting to be written to the disk. The blocks between the Extract and Insert pointers are not in use.

Each slot in each ring is equal in size to a logical block and on the disk. The slot size is preferably 512 bytes and a segment contains preferably 126 blocks which is the largest unit that VMS will write at one time. In other systems the number of blocks in a segment should be set at the maximum size transfer.

When the segment insert pointer 150 and segment extract pointer for a ring are the same the ring can only be filled because a complete segment is not available for transfer. When a segment is full the destination write process 160 can then transfer the segment to the destination disk 24 through the operating system 14.

The write process 160 (FIG. 3) not only controls the order in which information is written to the destination disk 24 but more importantly minimizes the mechanical motion associated with seeking the proper location on the destination disk 24 where the data is to be stored. The process 160 also updates the allocation control list ring 162 to indicate what data blocks on the disk are in use. The details of the write process 160 can be found in the appendix designated as P6-P6.7. Each bit of the allocation control list represents allocation of a cluster of logical blocks since VMS allocates disk usage in units of clusters rather than blocks. However, actual file length is stored in terms of blocks. At the beginning of each write operation, the write process 160 takes a census (See P6.1) of the rings and assigns each ring a priority (See P6.2) based on whether it is full. The process 160 then picks the ring (See P.6.3) which will be written next using an algorithm which tends to maximize overall throughput. The prioritizing algorithm gives full rings the highest priority, rings with one empty segment the next highest priority, and rings with two or more empty segments the next to lowest priority and empty rings the lowest priority. Within these levels of priority, priority ties are broken by a static rule which says that data (file contents) are written before headers, headers before directory entries and directory entries before directory headers. Ring switching during the write process 160 is optimized by the selecting algorithm to prevent switching rings too often, where switching too often will cause extra mechanical motion reducing transfer speed. The algorithm also keeps ring switching from being too infrequent which would cause the ring filling processes to wait also reducing transfer speed. The ring switching algorithm maintains a balance to obtain the high transfer speed.

The destination header process 170 always waits until the write process 160 writes the beginning of the file to the disk 24 and stores the location of the file in an appropriate field on the file description ring 90. In other words, the header operation pointer 102 is not allowed to pass the write operation pointer 98.

The segment relative logical block numbers for directory files was previously stored in the logical block field of the headers in the directory header ring 192 by the directory process 174. The write process converts the segment relative logical block number to absolute logical block numbers now that the location of the segment on the disk is known when it writes the segment to the disk, thus completing the headers. (See R24-R30 in P6.6). The same updating process occurs for data files except the segment relative block numbers are stored and subsequently updated in ring 90.

The destination header process 170 obtains all its information from the file description ring 90, and creates and stores the header information in segmented ring 172. This process is described in general in FIG. 13 and in more detail in the appendix in P4.

The destination directory process 174 creates the contents of the directory files for the destination disk 24 and obtains all the needed information from the information stored on the file description ring 90. This process 174 will be described in more detail with respect to FIG. 14 and is described in even more detail in P5. The contents of the created directory files contain the file number of each file but does not contain the location (logical block number) where the file is written. As previously mentioned the file numbers are assigned by the source search process 40 and stored in the file ID ring 180 or tree array 182 and then copied by the open process 41 onto ring 90. (See R11 and R12 in P1 and R13 and R14 in P2). The destination directory process 174 does not need to wait on any other process and, as a result, the directory current operation pointer 100 (FIG. 5) may advance all the way to the insert pointer 94. The destination directory process 174 stores the created directory files on the directory segmented ring 176. In general when the destination directory process 174 creates a directory containing both regular files and directory files, the process 174 must delay the insertion of directory entries for the directory file until the proper place is encountered during an alphabetical order merge process. It does this by creating directory entries for directory files in a delay ring 178 instead of writing the entries directly onto ring 176. Before inserting a directory entry for a regular file onto ring 176, the destination directory process 174 first inserts any entries waiting in the delay ring 178. A more detailed example of this process is set forth in examples E1 and E2 in the appendix.

The destination directory process 174 (FIG. 3) also creates the directory headers and stores them on a directory header segmented ring 192 (See R44 in P5). The destination directory process 174 is the only process which writes incomplete information to its corresponding ring an output ring (132, 172, 176 and 192). If this process did not write incomplete information to the ring 192 then ring 90 would have to be of a size which would accommodate the largest number of files ever found in a single directory which is a very unsatisfactory constraint. At the time that the process 174 creates the header for a directory file in ring 192 and advances the directory pointer 100, both the final length and the final location of the directory file will be unknown because the directory file has yet to be created and written onto the destination disk 24 by the write process 160. Because of this incomplete information write problem, pointers are provided which includes pointers (len—rel—ptr and len—rel—count) and which point to a block in ring 192 which contains the incomplete header for the directory file currently creating. When the destination directory process 174 completes the contents of a directory file it records the final length in the incomplete header in the ring 192 by using the pointers (See R18-R23 in P5). When the write process 160 writes the contents of the directory file from ring 176 to the destination disk 24, it records the final location in the corresponding header in ring 192 by using the pointers (lbn—rel—ptr 780 and lbn—rel—count 784) (See R24-R30 in P6.6)

Figure 7:
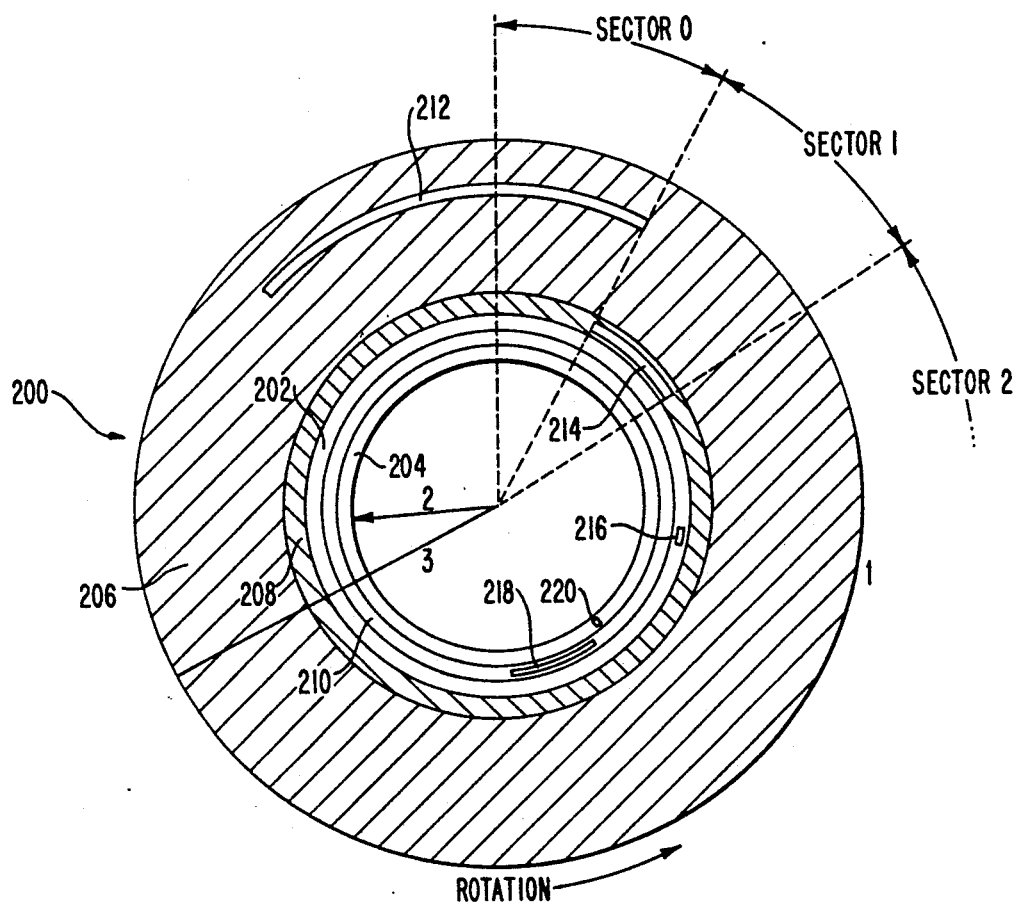
FIG. 7 depicts a physical layout of a destination media such as an erasable optical disk.

The destination write process 160 stores the data in a physical arrangement on an erasable optical disk 200 as for example illustrated in FIG. 7. The disk 200 is divided into storage regions where 208 indicates the region for storing directories, 204 the region for the allocation control list, 206 the region for file contents, 202 the region for file headers and 210 the region for directory header. To write a new file to the disk 200, the file contents would be written into region 206 at a location for example 212 and the header of the file would be written within region 202 at a specific location 216. The directory entry for the file would be written in region 208 at a specific location such as 214, while the header of the directory file is written at location 218 within region 210. Once the various portions of the regions 202-210 have been completely written, the allocation control list at particular location such as for example 220 is updated. The spaces allowed for headers (both types) are within the body of the index file. Preferably the index file is 5000 blocks long, the first 5% of the index file is the space allowed for directory headers and the remaining 95% of the index file is the space allowed for data file headers. Preferably following the index file is the rest of the disk where the first 0.1% of the rest of the disk is the space for directory files and the remaining 99.9% of the rest of the disk is the space allowed for data files. The index file size and the percentages above reflect typical #files/directory and #blocks/file. The order discussed above (directory headers before data file headers and directories before data files) is arbitrary. The present invention would work equally well with a different order.

The processes 40, 41, 130, 160, 170 and 174 are called by a process sequence control routine (not shown but set forth as P7 in the appendix) which is a looping routine which calls the processes starting with the source search process 40 and then the open process 41, followed by the source read process 130, then the destination write process 160, followed by the destination header process 170 and then the destination directory process 174. After the destination directory process 174 is called the process sequence control routine again calls the source search process 40 thereby starting the scan call loop all over again. Prior to calling each of the processes, the process sequence control scan routine checks a flag associated with each process to determine whether the process needs to be called. For example, if the source search process 40 has found all the files requested by the user, the process 40 sets a flag so that source search process is no longer called. The other processes set corresponding flags. When all flags are set the looping stops.

Figure 8:
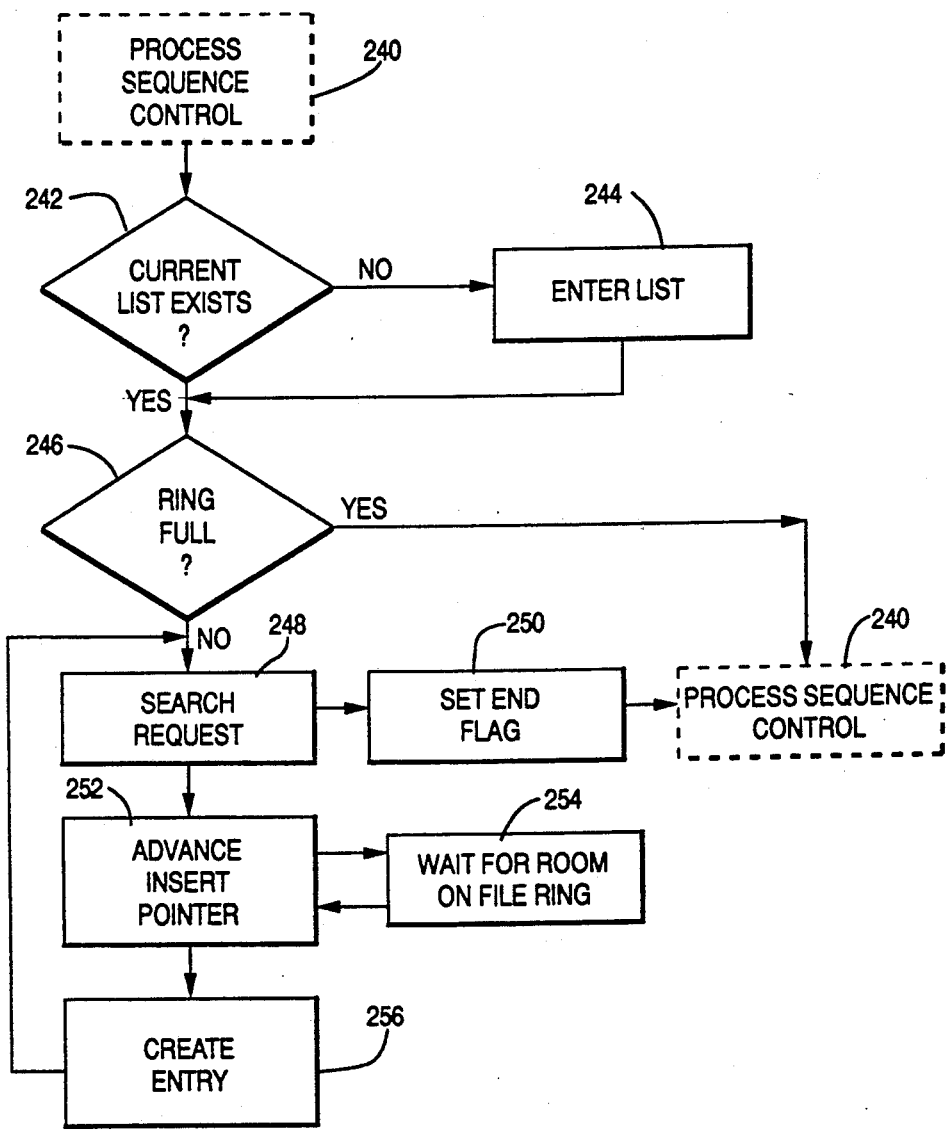
FIG. 8 is a flowchart of combined source search and open 41 processes of FIG. 3.

The source search 40 and source open 41 processes operate together to create entries on the file description ring 90. This combined operation is illustrated in FIG. 8. The details of these processes as previously mentioned can be found in P1 and P2 in the appendix. The source search process 40 begins after a transfer from the process sequence control routine 240. At the beginning of this process 40, a determination 242 is made as to whether a current list of files to be transferred exists. If a current list does not exist, the user is requested to enter 244 a list of processes to be transferred. A determination 246 is made by the process 41 regarding whether the file description ring 90 is full by comparing the insert pointer 94 to the other pointers 96-102 where any match indicates the ring 90 is full (See R7 in P2). If the ring is full the control is transferred back to the process sequence control routine 240. If the ring is not full the process 40 issues a search request 248 (See R2 in P1) for the directory tree on the source disk 20. If search has reached the end of the list and found all files the processes 40 and 41 set their end flags (See R46 in P1 and R47 in P2) indicating that the process of scanning the source disk 20 and loading the file description ring 90 has ended and need not be recalled during this multi-file transfer. The return information is used to create 256 an entry on the ring 90. When the search request 248 finds and opens a file, the process 41 attempts to advance 252 the insert pointer 94 (See R48 in P2). This step 252 creates a temporary incremented pointer value which is compared to the values of the pointers 96-102 and if a match occurs, indicating that the ring 90 is full, the process 40 enters a wait state 254.

The above-discussed wait state 254 and all other wait state discussed herein have the effect of transferring control to the process sequence control routine 240 until the event that is holding the process in the wait state is resolved. The process sequence control routine 240 to properly return to the waiting process can maintain a conventional push down interrupt type control stack of processes in the wait state.

In the present situation, the wait state 254 would end when the one of the pointers 96-102 which is blocking the advance of the insert pointer 94 has itself advanced. When this occurs, step 252 advances the insert pointer 94 by incrementing same and then a new entry is created 256. Once the entry is created, the search process 40, as illustrated in FIG. 8, returns to the search request step 248 to continue looking for other files.

Each entry in the file description ring 90 is 434 bytes long and includes the fields set forth in the appendix in DSI of the file which are copied from the source disk to ring 90 and then to the destination disk and which indicate when a file was created and other related information.

Figure 9:
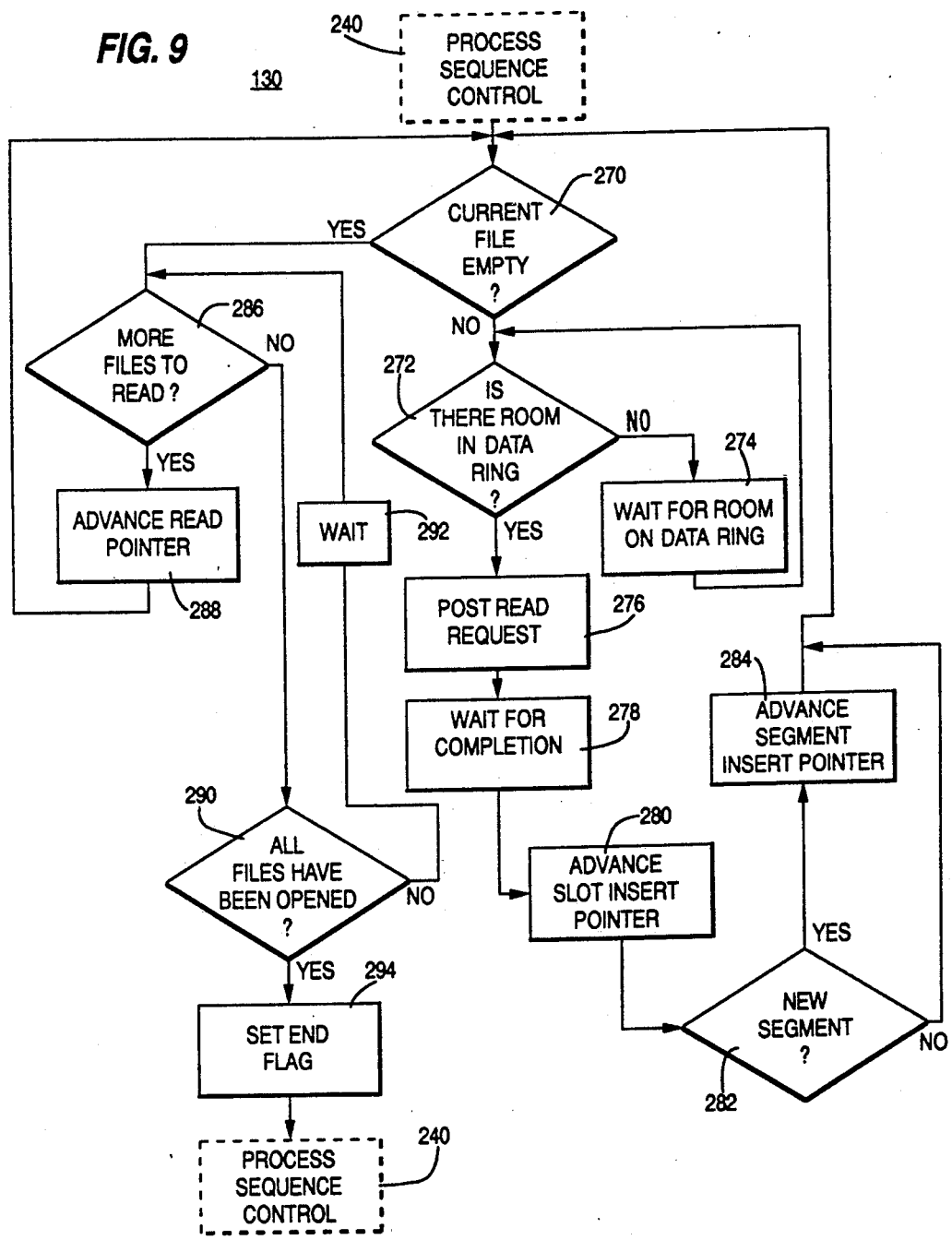
FIG. 9 is a flow diagram of the source read process 130 of FIG. 3.

If control is returned to the process sequence control looping routine 240 or if the processes enter a wait state, the next process chosen for execution is the source read process 139 as generally illustrated in FIG. 9 and described in detail in P3 in the appendix. This process 130 first determines 270 whether the current file is empty. That is, a determination is made as to whether the entire file (all the blocks in the file) has been transferred (See R37 in P3). If the current file is not empty and additional data blocks need to be transferred from the source disk 20 to the data ring 132, a determination 272 is made regarding whether the ring 132 is full. This determination is made by temporarily advancing the pointer 756 and pointer 758 by the number of blocks to be read from the source disk 20 and determining whether the pointer 756 has moved to a new segment and if so, comparing the temporarily advanced pointer 756 to the pointer 762. If pointer 756 is equal to the pointer 762, then the data ring 132 is full and the process 130 waits 274 for additional room on the ring 132. Additional room is indicated by an advance of the segment extract pointer 154 so that it no longer equals the temporarily advanced pointer 756. If there is room on the data ring 132 the source read process 130, based on the information from the file description ring 90 identifying the channel and block number of the file to be transferred and the value of the pointers 756 and 758, posts 276 a read request to the file system 16 of the operating system 14 (See R38 in P3). The file system 16 and driver system 18 then reads the information from the source disk 20 and stores the information beginning at the location indicated by the pointers 756 and 758. The read request requests that 126 blocks be transferred if 126 blocks remain in the file. If 126 blocks do not remain only the remaining blocks are transferred and a status word indicates how many. The process then waits 278 for this transfer to complete, advances 280 the pointer 758 by the number of blocks of data transferred, and, if the pointer 758 has moved to a new segment, the pointer 756 is also advanced 284. An indicator of the total number of blocks transferred is also updated so that the determination at step 270 can be made on the next pass through this loop. If the current file is empty (270) a determination 286 is made concerning whether there are more files to read. This determination is made by temporarily advancing the read pointer 96 by one and comparing it with the value of the insert pointer 94. If the read pointer 96 does not equal the insert pointer 94, then the read pointer is advanced 288 by one and the operation of transferring the blocks of the file from the source disk 20 to the data ring 132 continues. If there are no additional files to read, a determination is made 290 concerning whether all the files have been opened. This determination is made by checking the end of process flag of the open process 41 (See R40 in P3) If all the files have not been opened, the process waits 292 until additional files have been opened and are ready to be read. If all the files have been opened, this indicates that the source read process 130 has transferred all the data files from the source disk 20 to the ring 132 and the end of process flag is set 294 followed by a transfer of control to the process sequence control routine 240.

Figure 10:
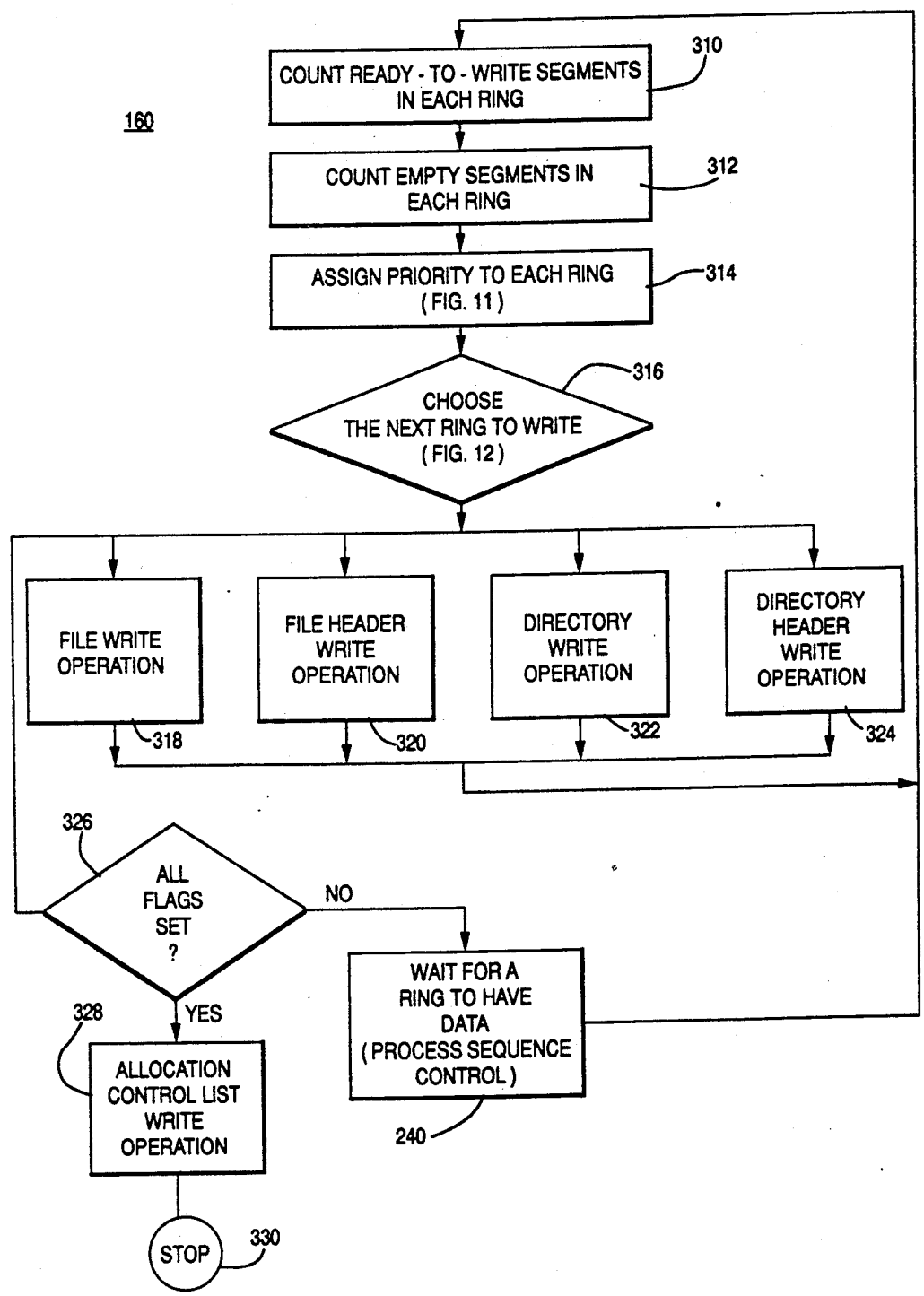
FIG. 10 depicts the write process 160 of FIG. 3.

At some point in time at least one of the rings 132, 172, 176 and 192 will include at least one full segment for writing to the destination disk 24 then the process sequence control routine 240 will transfer control to the destination write process 160 generally as illustrated in FIG. 10. As previously mentioned this process is described in more detail in P6-P6.7 in the appendix. Once transfer of control from the process sequence control routine 240 has occurred, the present invention counts 310 the number of ready to write segments in each ring by examining the stat field of the rings (See P6.1). The process 160 also counts 312 the number of empty segments in each ring (See P6.1) and then assigns 314 a priority to each ring (See P6.2). The details of this priority assignment process will be discussed in more detail with respect to FIG. 11. Next the process selects 316 the next ring to be written which will be described in more detail with respect to FIG. 12 (See also P6.3). If the rings are all empty, as determined by the ring choosing step 316 a determination 326 is made whether all the end of operation flags are set, if so then the write process 160 writes 328 the contents of the allocation control list ring 162 to a fixed position on the destination disk 24. If all the end of process flags are not set, then control is transferred back to the process sequence control routine 240. If a ring is selected for writing the appropriate write operation from the file write operation 318 (See P6.4), file header write operation 320 (See P6.5), directory write operation 322 (See P6.6) and directory header write operation 324 (See P6.7) is executed. The process 160 then returns to step 310 for another attempt to write another ring segment from a ring to the destination disk 24.

Figure 11:
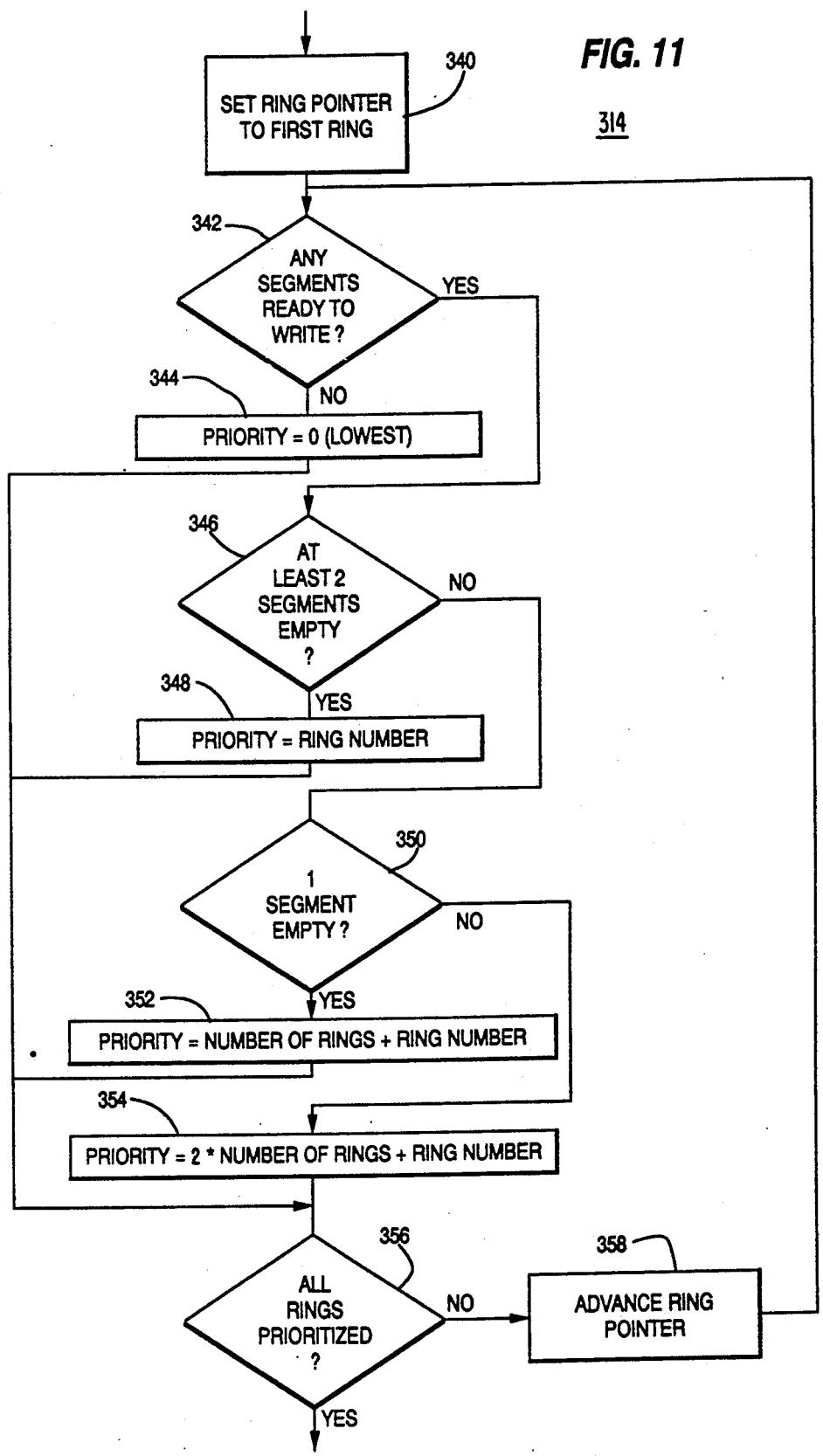
FIG. 11 illustrates the priority assignment operation of FIG. 10.

The priority assignment process 314, as illustrated in FIG. 11 (See P6.2), starts by setting 340 a ring pointer to point to the first ring. This first ring is preferably the data ring 132, the second ring the header ring 172, the third ring the directory ring 176 and the fourth ring the directory header ring 192. Preferably the ring size of the allocation control list ring 162 is chosen to equal the size of the entire list region on the destination disk 24, however, if a smaller size is chosen the ring 162 should be segmented and the operation for writing the allocation control list would be included in the competition for writing discussed hereinafter. Next a determination 342 is made concerning whether there are any segments ready to write on the selected ring. If not the ring priority is set 344 to zero. If the ring has at least two empty segments 346, then the priority for this ring is set 348 at the ring number. If there is a single segment empty 350, then the priority of the ring is set to the number of rings plus the ring number. By using the number of rings in the priority setting algorithm, the present invention can be adjusted to handle other operating system formats such as DOS, which provides only three different types of information with respect to a file. If at least one segment is not empty, the ring is full and the priority is set 354 to the highest priority which is two times the number of rings plus the ring number. Next a determination 356 is made concerning whether all the rings have been prioritized. If so, the next step 316 in the ring selection process is executed. If not, the ring pointer is advanced 358 and the prioritization process continues.

Figure 12:
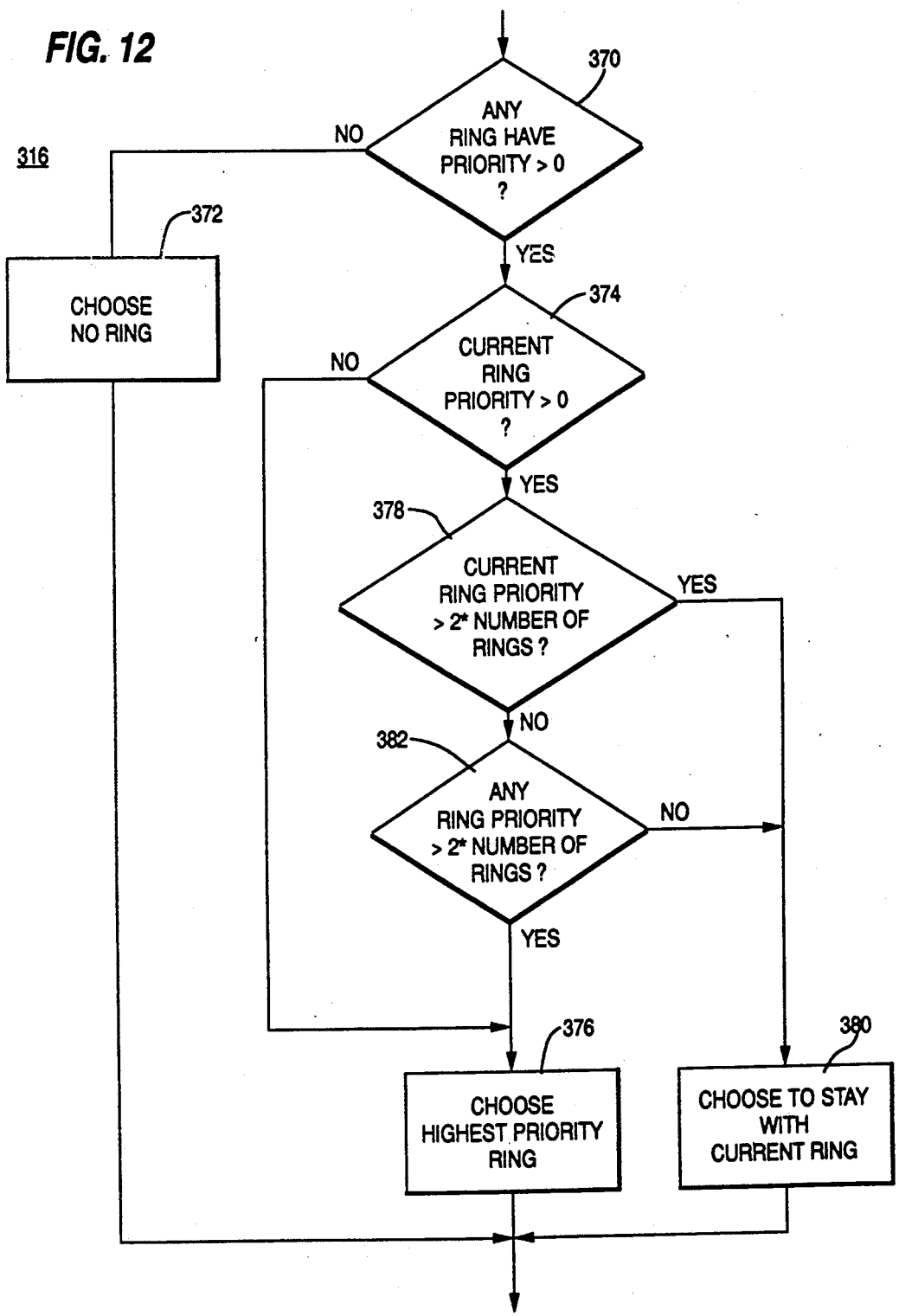
FIG. 12 shows how rings are chosen for writing by the write process 160 of FIG. 10.

The ring selection process, as illustrated in FIG. 12 (See P6.3), begins by determining 370 whether any ring has a priority greater than 0. If not, the process does not choose a ring 372 which usually results in transfer back to the process sequence control routine 240. If any of the rings have a priority greater than 0 then a determination 374 is made whether the current ring (that is, the ring most recently written) has a priority greater than 0. If not, the ring with the highest priority is chosen for writing and the appropriate write operation (318-324) is executed. If the current ring has 378 a priority greater than two times the number of rings, then the current ring is chosen 380 since this priority indicates that the current ring is full. If the current ring is not full, then a determination 382 is made concerning whether any other ring is full, if so, the ring with the highest priority is chosen 376 if not, the current ring is written again by continuing to select the current write operation.

In the file write operation 318 (See P6.4) the following steps are performed:

1. Choose a physical location for this segment. If the destination disk 24 is formatted or physically laid out as illustrated in FIG. 7, this step merely involves obtaining the next available block number pointer for the region 26. Other disk formats are possible. For example, DEC prefers to position the housekeeping information of regions 202, 204 and 210, in a position half way from the most interior track to the most exterior track. This reduces the average distance that the read head in the disk mechanism has to move once the location of the file is obtained from the housekeeping information. If such a disk format is used, choosing a physical location involves determining whether the write operation will write across information already stored in another type region. This determination would be accomplished by examining the allocation control list in ring 162 or adding the length of the data to be written to the location pointer and comparing the result with region ranges. The process of dividing the file into one or more pieces and storing the pieces at different locations on the disk is conventionally called a file extension process and the file extensions are created during this process.

2. Command the interface to write the segment to disk 24. This operation merely involves issuing a write command to the operating system 14 which includes the address of the beginning of the segment to be transferred to the operating system 14 along With a length of the segment to be transferred and the block location on the destination disk 24 where the data is to be stored. A typical command in VMS is set forth at R41 in P6.4. The operating system 14 will then automatically retrieve the data from the RAM starting at the address and write same to the destination disk 24. When the transfer is complete the operating system 14 returns a transfer complete status indicator or word to the process 318.

3. Wait for completion of the write operation. As mentioned above, this is indicated by a transfer complete status word from the operating system 14.

4. For each file begun in this segment as indicated in the list created by the read process 130 (See R39 in P3):
  a. Store physical location (starting logical block number) of start of this file into file description ring 90. This step involves adding the relative logical block number, inserted in the location list for this segment by the source read process 130, to the physical location (logical block number) of the storage location of the segment.
  b. Advance the Write Pointer 98.

5. Advance the physical location pointer. This involves incrementing the location pointer for the region 206 by the number of blocks in the segment that have been transferred.

6. Mark segment as empty by advancing the segment extract pointer 154 for ring 132 by one and updating the stat field 720 for the segment.

7. Mark blocks on the destination disk 24 as in use in allocation control list ring 162.

The file header write operation 320 (See P6.5) performs all the steps illustrated above except steps 4 and 7. The operation 320 uses the physical location pointer for region 202 in FIG. 6 and obtains the data to be written from segmented ring 172 of FIG. 3.

The directory write operation 322 (See P6.6) performs all the steps as discussed above using the physical location pointer for region 202 and the segment extract pointer 154 for ring 176. Rather than storing the final location step (4a) in the file description ring 90, the operation stores this value in the directory header ring 192 using the pointers 780 and 784 as previously discussed.

The directory header write operation 324 (See P6.7) performs all the steps except steps 4 and 7 using the physical location pointer for the directory header region 210 and the segment extract pointer 154 for ring 192.

The allocation control list write operation 328 performs steps 1-3 while writing the entire ring 162 to the disk 24.

Figure 13:
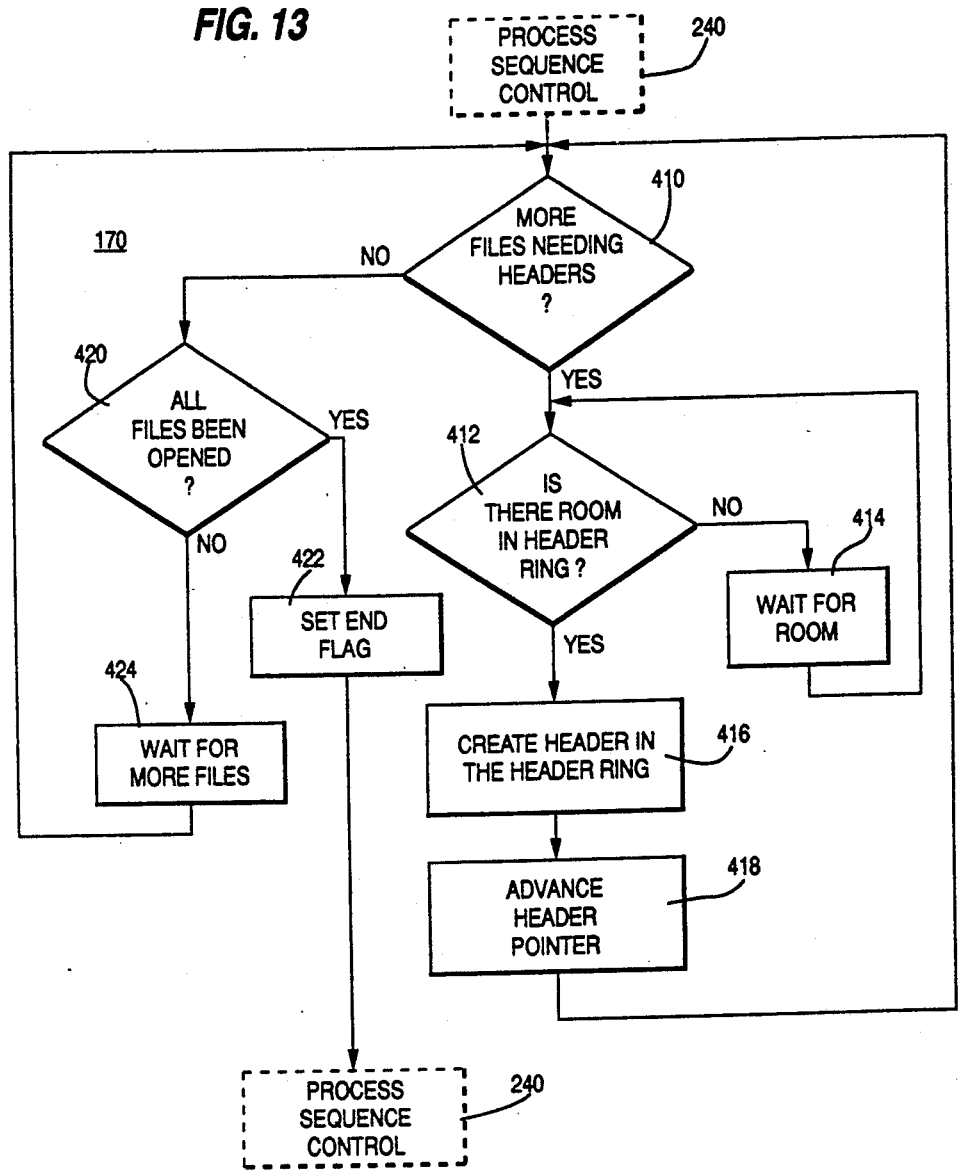
FIG. 13 is a flow chart of the destination header process 170 of FIG. 3.

When the destination header process 170 (See P4 in the appendix) receives execution control from the process sequence control routine 240, the process 170 first determines 410 whether there are any data files needing headers (See R42 in P4) as illustrated in FIG. 13. This determination 410 is performed by comparing the value of the header pointer 102 with the insert pointer 94. If the header pointer 102 is not equal to the insert pointer 94 then there are additional files which need headers. Next the routine determines 412 whether there is sufficient room on the header ring 172 for additional headers. This step is performed by comparing the pointer 744 for the header ring 172 with the pointer 746 as previously discussed. If there is no additional room on the header ring 172, the process 170 enters a wait state during which other processes under the control of the process sequence control routine 240 such as the write process 160 can clear the file header ring 172. If there is room on the header ring 172, the process 170 obtains the appropriate information from the file description ring 90 and creates 416 the header (See R31 in P4 and DS6) in an appropriate slot as indicated by the pointers 744 and 743 in the header ring 172. Next the header pointer 102 is advanced 417. The pointer 102 cannot advance past the write pointer 98, so the comparison process previously discussed is performed to see if the pointer 102 can be advanced. If there are no more files needing headers 410 and all the files have been opened (that is the source open process 41 has completed as indicated by the corresponding end of operations flag), then the destination header process 170 sets 422 its end flag indicating that this process is also completed and transfers control back to the process sequence control 240. If all the files have not been opened, as indicated by the process complete flag of the process 41, then the destination header process 170 waits 424 for additional files to be written by the write process 160 which will advance the write pointer 98. When the write pointer 98 and header pointer 102 are not equal this wait state 424 will terminate.

Figure 14A:
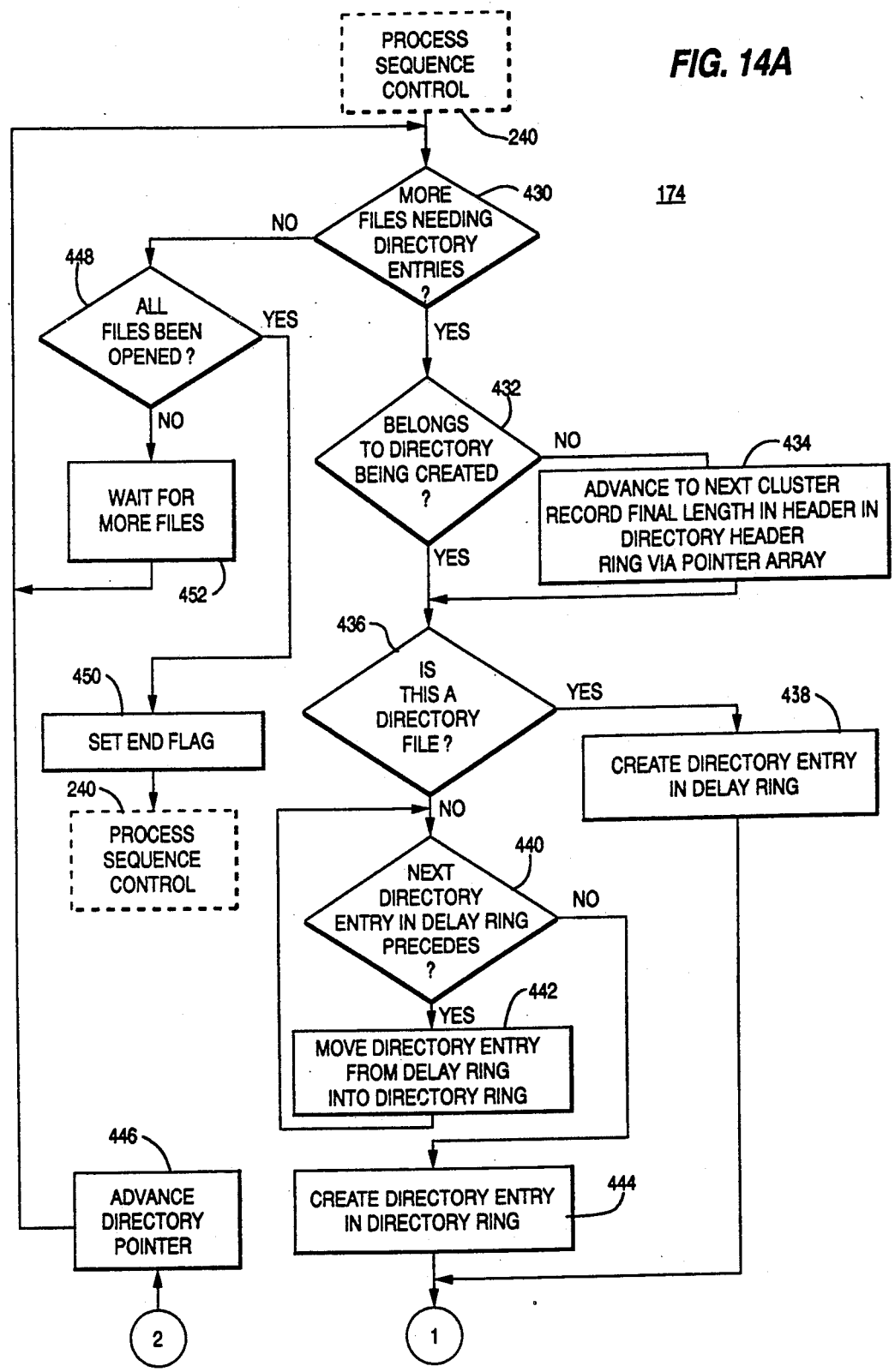
FIGS. 14A and 14B show the directory process 174 of FIG. 3.

The destination directory process 174 (See P5) when control is transferred thereto from the process sequence control routine 240 will first check 430 to see whether there are additional files needing directory entries, as illustrated in FIG. 14A. This process is similar to the previous processes for determining whether operations are necessary in that the directory pointer 100 is compared to the insert pointer 94 of the file description ring 90 in FIG. 5 to determine whether additional files need directory entries. Next the process 174 determines (See R43 in P5) whether the file belongs to a directory being created by examining the directory file nu_ _r for the destination disk on the ring 90. If the file does not belong to the directory being created the process 174 advances the insert pointer for ring 176 to the next cluster (See R44 in P5). A cluster is a small number of contiguous blocks allocated as a unit by an operating system. For a more detailed explanation of this known term see E3 in the appendix. The process 174 records the final length of the file in the header in the directory header ring 192 via the pointers (len—rel—ptr 782 and len—rel—count 786) (See R18, R19 and R20 in P5). Next, the process determines 436 whether this is a directory file by accessing the appropriate flag field of the entry in the file description ring 90. If this is a directory file an entry is created 438 in the delay ring 178 (See R33 in P5). If it is not a directory file, a check 440 is made to determine whether the next directory entry in the delay ring precedes (in alphabetical order) the current entry (See R17 and R45 in P5). If it does the directory entry from the delay ring 178 is moved onto the directory ring 176. If not, the process creates 444 a directory entry in the directory ring 176. Once the directory entry is created either in the delay ring 178 or the directory ring 176 control is transferred to FIG. 14B where a header is created for a directory file if the file is a directory. Please note that as in other processes if the directory pointer 100 cannot advance because the directory pointer 100 equals the insert pointer 94, the process enters a wait state until the directory pointer 100 can advance. If the process 174 reaches the point where there are no more files needing directory entries and all files have been opened 448 by the source search and open process 41, as indicated by the end flag of process 41, then the end flag of the directory process 174 is set 450 followed by transfer of control to the process sequence control routine 240. If all files have not been opened as determined by checking the source search and open process end flag then the process waits 452 for more files to be opened. This wait process again transfers the control to the process sequence control routine 240.

Figure 14B:
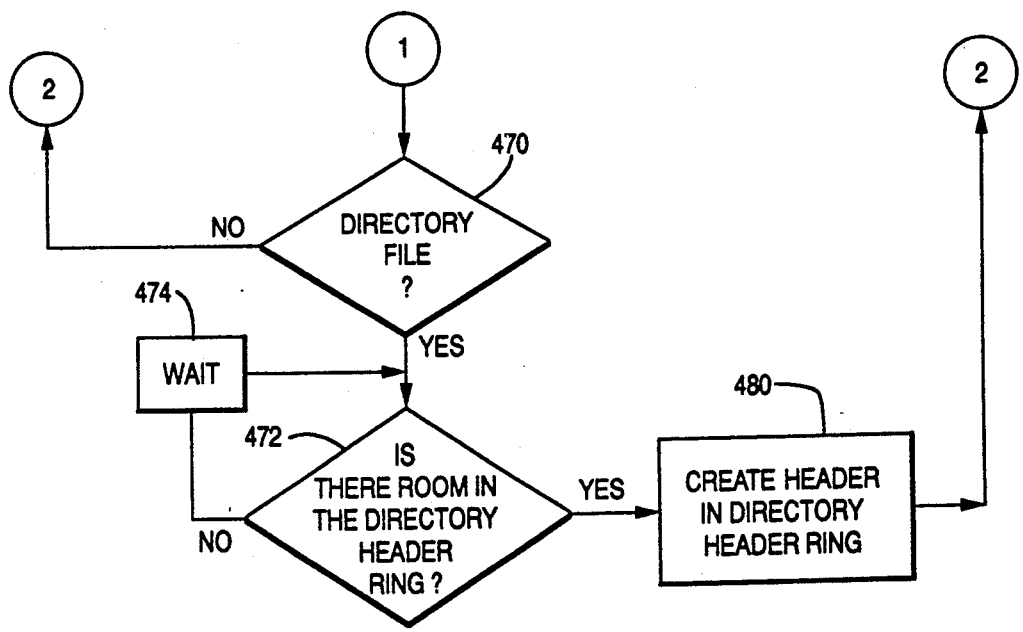

In FIG. 14B the process 174 determines 470 whether the file is a directory file by examining the directory indication field (See DS2 in ring 90). If it is a directory file, the process 174 determines 472 whether there is room in the directory header ring 192 by comparing the insert pointer to the extract pointer illustrated in FIG. 6D. If not, the process waits 474 for more room on the directory header ring 192 by transferring control to the process sequence control routine 240 which will eventually execute the destination write process 160 emptying at least one segment of this full ring 192. If there is room, a header is created 480 in the directory header ring 192 after which the directory pointer 100 is advanced 446(FIG. 14A).

Figure 15:
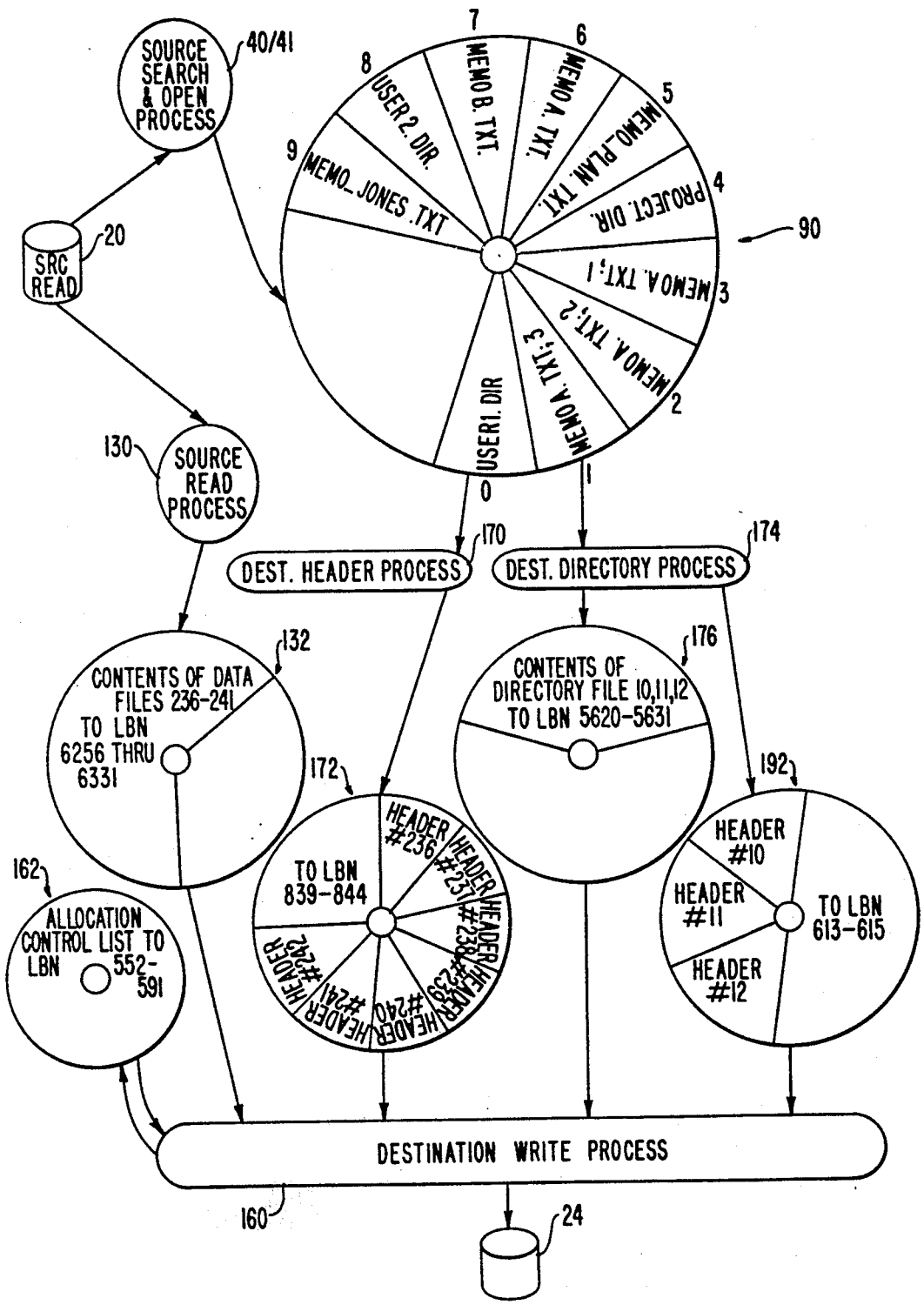
FIG. 15 shows the intermediate contents of ring buffers 90, 132, 162, 172, 176 and 192.

If the present invention is requested to transfer 7 files whose names begin with "memo" from three directories on the source disk 20 onto the destination disk 24 recreating the directory hierarchy, the contents of the rings 90, 132, 162, 172, 176 and 190 at some point during execution would include the information illustrated in FIG. 15. As can be seen by examining the file description ring 90 an entry is made for each of the directories and files that are located. By examining the order of the entries on the ring 90 the order of locating the various files by the source search and open processes 40 and 41 is indicated. That is the USER1.DIR directory file was found first by the source search and open process. This directory file including entries for text files named ME- MOA.TXT with versions 3, 2 and 1 and an entry for the PROJECT.DIR directory. The PROJECT.DIR directory file contained entries for text files MEMOA.TXT, MEMOB.TXT and the directory USER2.DIR which contained the MEMO_JONES.TXT text file. The contents of the text (data) files (txt) would have been transferred from the source disk 20 to the source data disk 132 by the source read process 130 as indicated. Eventually the destination write process 160 will transfer the text file contents to destination disk 24 and store same in logical block numbers (LBN) 6256–6331. The created directory file contents of ring 176 are transferred to the destination disk 24 by the write process 160. As indicated, the destination header process 170 creates data file headers and stores them on ring 176 while the destination directory process 174 creates directory headers and stores them on the ring 192.

Figure 16:
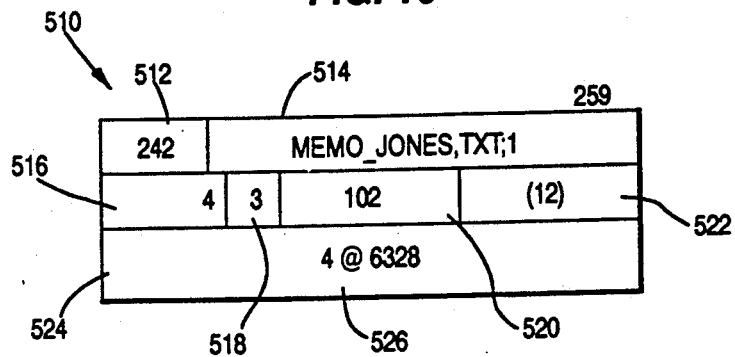
FIG. 16 illustrates the contents of a file header 510.

Each header 510 whether it is a data file header or directory file header includes the fields illustrated in FIG. 16 and in more detail in DS6. The first field 512 is a file number field which gives the location of the file header within the index file which is created on the disk. As previously mentioned the file number is assigned by the source search process 40 as each file is found. One portion of the index file which includes the directory headers is created by the destination directory process 174 and the other portion of the index file is created by the destination header process 170 as will be illustrated with respect to FIG. 17. The second field 514 is a file name field which can be up to 80 characters in length. This is the source file name found on the source disk 20 and transferred to the file description ring 90. The next field 516 is the allocation length field and is the number of blocks on the destination disk 24 allocated to the file. This value is determined by the open process 41 (See R49 in P2). This file length is always an integer multiple of the cluster size. The fourth field 518 is the file length field and indicates the length of the file in blocks on the disk storing the information. A last byte field 520 gives the byte number of the last byte used in the last block of the file record on the destination disk 24. A back link field 522 gives the file number of the directory file containing the file, that is, the file directory/header tree structure is a forward and reverse linked list allowing tree traversal in two directions. The extent length field 524 stores the length of an extent of this file. As previously mentioned, an extent is a fragment of a file and this field is used when the file must be divided into sections. A non-fragmented file has only a single extent. The extent logical block number field 526 indicates the logical starting block of this extent.

Figure 17:
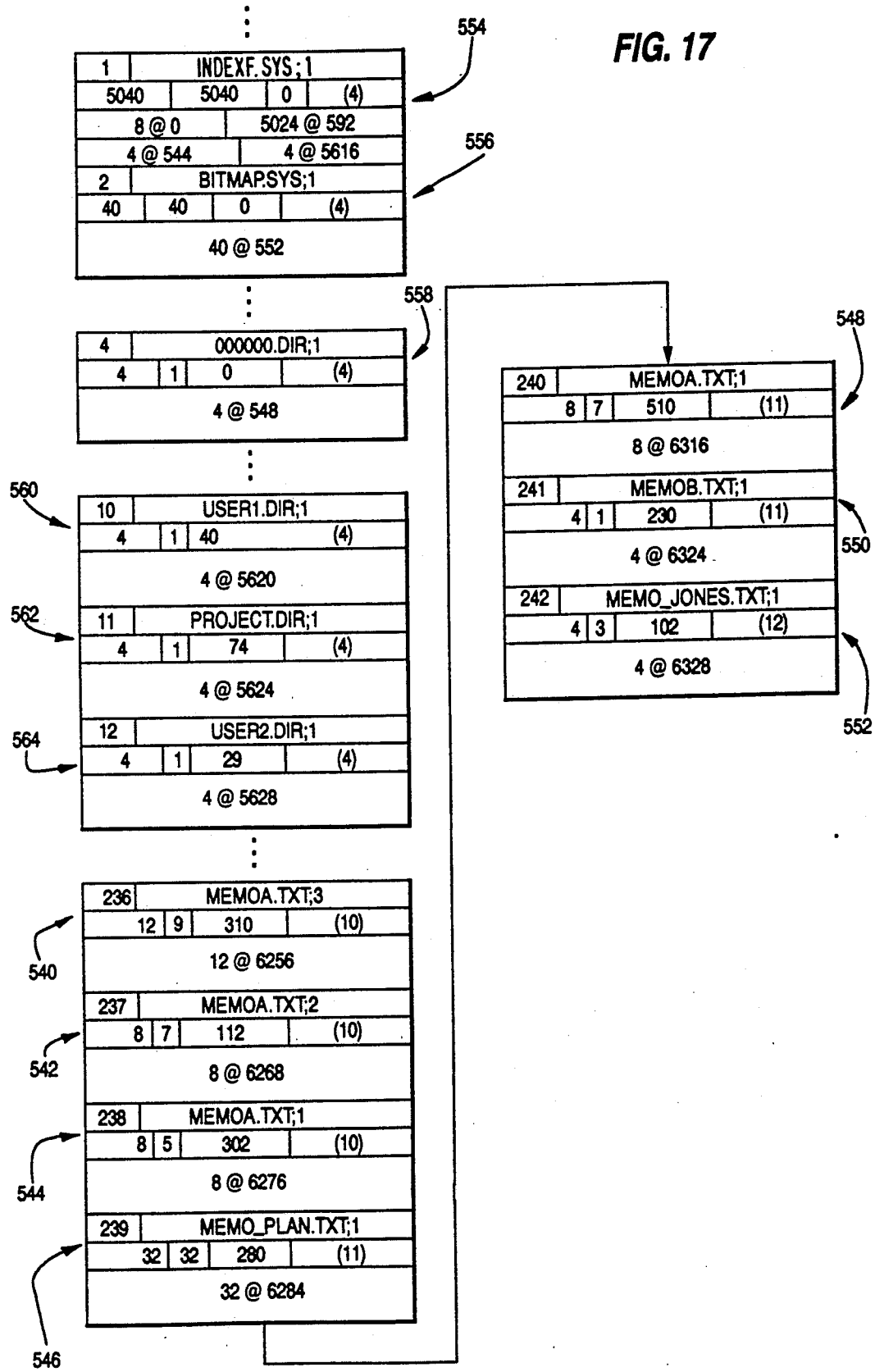
FIG. 17 depicts a portion of an index file.

The destination header process 170, creates a header to correspond to each of the text files in our example. The destination write process 160 transfers these headers from ring 172 to the index file as illustrated in FIG. 17. The destination directory process 174, although not previously discussed in the detailed discussion of this process 174, the very first time it is executed creates three standard header entries in the index file as illustrated by entries 1, 2 and 4 which are always created at the same location in the destination disk 24. The creation of these three headers is a conventional operation when a new disk is being formatted and is well within the skill of those of ordinary skill in the art. These three standard headers are the headers 554 for the index file itself, the header 556 for the bit map of the system that is, the header for the allocation control list which indicates the allocation status of each block on the disk 24 and the root directory header 558. In this seven file transfer example, the destination directory header process 174 also creates the directory headers for the directories in the index file of FIG. 17 as indicated by reference numerals 560–564 while the destination header process 170 creates the file headers 540–552.

The destination directory process 174 creates directory entries for this example as illustrated in FIG. 18. FIG. 18 illustrates the directory file contents for the USER1.DIR and a similar directory is created for the PROJECT.DIR and USER2.DIR files as illustrated in FIG. 19. Each directory entry is a variable length data structure (See DS8) which contains a file name field 580 a version number field 582 and a file number field 584 for each version of the field stored on the disk. FIG. 18 illustrates two directory entries where the longer entry is for the file MEMOA.TXT which has three versions and the shorter entry is for the PROJECT.DIR file which is a directory file. Directory files cannot have multiple versions because only a single version of a directory is allowed by the VMS operating system.

The present invention creates the directory contents as illustrated in FIG. 19. The root directory 600 includes five entries 602–610, the first user directory 612 contains two entries 614 and 616, while the project directory 618 includes three entries 620–624 and the second user directory 626 only contains a single entry 628.

Table 1 below indicates the starting and ending logical block numbers for the various files and headers created by the present invention in this seven file transfer example where the dashed horizontal lines indicate the division of the disk into the four areas previously discussed.

TABLE I

| Starting Logical Block # | Ending Logical Block # | Description |
|---|---|---|
| 0 | | Boot Block |
| 1 | 7 | Home Block and Copies unused |
| 544 | 547 | More home block copies |
| 548 | 551 | Contents of Root Directory |
| 552 | 591 | Allocation Control List |
| 592 | 603 | Headers (12 blank headers) |
| 604 | | Headers (INDEXF.SYS) |
| 605 | | Headers (BITMAP.SYS) |
| 606 | | Headers (Special empty VMS file) |
| 607 | | Headers (000000.DIR) |
| 608 | 612 | Headers (special empty VMS files) |
| 613 | 615 | Headers (in use for user directories) |
| 616 | 838 | Headers (unused - for user directories) |
| 839 | 844 | Headers (in use - for user files) |
| 845 | 5615 | Headers (unused - for user files) |

TABLE I-continued

| Starting Logical Block # | Ending Logical Block # | Description |
|---|---|---|
| 5616 | 5619 | Copies of INDEX file header |
| 5620 | 5623 | Contents of USER1 directory |
| 5624 | 5627 | Contents of PROJECT directory |
| 5628 | 5631 | Contents of USER2 directory |
| 5632 | 6255 | Unused - for contents of user directories |
| 6256 | 6267 | Contents of file MEMOA.TXT;3 |
| 6268 | 6275 | Contents of file MEMOA.TXT;2 |
| 6276 | 6283 | Contents of file MEMOA.TXT;1 |
| 6284 | 6315 | Contents of file MEMO.PLAN.TXT;1 |
| 6316 | 6323 | Contents of file MEMOA.TXT;1 |
| 6324 | 6327 | Contents of file MEMOB.TXT;1 |
| 6328 | 6331 | Contents of file MEMO_JONES.TXT;1 |
| 6332 | 637,323 | Unused - for contents of user files |

Table 2 below indicates the tracks, sectors and contents for the ISO standard erasable optical disk format, available from 3M or Sony, where the disk has 1024 bytes/sector no bad sectors and where:

$$\text{Track \#} = INT(LBN/2/17) \quad (1)$$

$$\text{Sector \#} = \frac{LBN}{2} \text{ modulo } 17 \quad (2)$$

$$LBN \text{ even} - \text{Half} = 1 \quad (3)$$
$$LBN \text{ odd} - \text{Half} = 2 \quad (4)$$

TABLE 2

| Track/Sector/Half Description | Track/Sector/Half |
|---|---|
| 0/0/2 First Home Block | |
| 16/2/1 Contents of Root Directory | 16/3/2 |
| 16/4/1 Allocation Control List | 17/6/2 |
| 18/0/2 User directory headers | 24/11/1 |
| 24/11/2 User file headers | 165/2/2 |
| 165/5/1 Contents of User directories | 183/16/2 |
| 184/0/1 Contents of user files | 18,744/16/2 |

The present invention has been described with respect to an embodiment of the invention which communicates to the existing disk operating system using appropriate disk operating system commands however, it is possible for the present invention to completely replace the file system software 16 of the operating system thereby creating a much more efficient file write system even in random access read and write operations. However, if such an embodiment were created additional software must be provided to coordinate the contents of the disk and the contents of the various rings so that when a read request is made the appropriate contents are obtained.

The present invention has additionally been described using a loop that calls the routines periodically and it is of course possible to substitute an interrupt driven calling routine for this type of loop control.

The invention has also been described in an embodiment which allows the directory headers to be written to ring 192 before the directories are written to the disk 24. As a result, the subsequent directory file header updating is necessary. It is possible to avoid the need for this if ring 90 is made large enough to accommodate the maximum number of files in one directory.

The present invention has been described with respect to implementation on a DEC-VMS system, however, one of skill in the art could implement the invention on the IBM-DOS system the UNIX system, or the AEGIS system by reference to the corresponding operating system manuals.

The present invention when compared to a standard VMS Backup operation for 63 files transferred from magnetic to optical disk varies from about 1.5 times faster to 8.2 times faster as average file size changes from 1000 to 8 K bytes. Average file size at most computer installations ranges between 7 and 90 K bytes. Each optical disk will store the contents of six tapes suitable for a tape drive model Kennedy 9400 at 1600 bits per inch and each file will be randomly accessible in approximately 0.1 seconds.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

APPENDIX

A System And Method For Performing
A Multi-File Transfer Operation by John W. Whisler

Staas and Halsey
1825 K Street, N.W.
Washington, D.C. 20006

PSEUDO-CODE FOR THE SOURCE SEARCH PROCESS (40)

P1

( The source search process (40) is responsible for finding the filenames
and file IDs of all the files on the source disk matching the user's selection
criteria. It must preserve the hierarchical relationship among the files
if they come from multiple directories. It assigns a sequential search
number and a file number to each file found.

During program initialization slot 0 of the Tree Array is loaded with fixed
information about the root directory (called the Master File Directory under
VMS). In particular, the fid field is loaded with (4,4,0) which is always
the file ID of the root directory under VMS. The Tree_search_ptr is set
to point to slot zero.

Then the main search loop is entered. File-level operating system requests
are used to obtain the names and file IDs of all the matching files in the
directory identified by the Tree_search_ptr. Directory files are requested
first. Data files are requested second. For each directory file found
an entry in the Tree Array is filled in and the Tree_ins_ptr is advanced.
For each data file found an entry in the File_ID Ring (180) is filled in
and the File_ID_ins_ptr is advanced.

When the status returned by the file-level operating system request indicates
that there are no more files in the given directory, the Tree_search_ptr
is advanced and the process is repeated. When there are no more directory
files in the Tree Array to search the source search process (40) sets its
done flag. )

ENTRY POINT A (see if there is a directory to search)
if (tree_search_ptr = tree_ins_ptr) then (there is no more searching to do)
  set the DONE flag for the source search process (40)
  return to Process Sequence Control (240) never to be called again

R46 else (there is a directory to search)

(find all the matching directory files in this directory. They will
  be found in alphabetical order)
  Repeat (Do a file-level request to the operating system (called a "look-up")
    to return the name and file ID of the next matching file to a variable called Temp_File_ID_Descr which is defined by File_ID_Descr_Type.
Note: control returns from the SQIO as soon as VMS has recorded the
request in its internal data structures. When the look-up operation
completes VMS sets fields in the Synchronization/Status structure as
defined in the VAX/VMS SYSTEM SERVICES REFERENCE MANUAL.

NOTE: During program initialization the user's selection criteria for
the files to transfer are obtained. The code to obtain the user's
selection criteria is not given. In the preferred embodiment, the
directions in Chapter 7 "Command Input and Syntax" of the MICROVMS
PROGRAMMER'S MANUAL were followed to write this code. Other computer
systems have similar methods described in their manuals for obtaining
information from the user at the keyboard. A person of ordinary skill
in the art can consult the same manuals to write this code.)

SQIO( Lookup Function Code,
      Address of Synchronization/Status structure,
      "XXX.DIR;1",                        (match criterion (XXX specified by user))
      Tree_Array(Tree_search_ptr).fid,    (directory to search)
      Temp_File_ID_Descr.name.body,       (filename returned here)
      Temp_File_ID_Descr.name.len,        (name length returned here)
      Temp_File_ID_Descr.fid)             (file ID returned here)

Return to Process Sequence Control (240) to be called again at
   ENTRY POINT B

ENTRY POINT B:

(see if look-up operation is still going)
if (Completion Flag is not set in Synchronization/Status structure) then (look-up operation is still going)
   Return to Process Sequence Control (240) to be called again at
      ENTRY POINT B (Look-up operation is now finished. See if a file was found)
if (Status field in Synchronization/Status = "success" then (A file was found. Fill in the rest of the fields)

(Set pointer to its directory file)
   Temp_File_ID_Descr.dir = Tree_search_ptr (Give it the next file number available for directory files.
   This file number will form the File ID of this file on the dest disk.)
   cur_dir_file_num = cur_dir_file_num + 1
   Temp_File_ID_Descr.file_num = cur_dir_file_num (Increment sequential search number and store it)
   current_search_num = current_search_num + 1
   Temp_File_ID_Descr.search_num = current_search_num (Record the file ID of its directory)
   Temp_File_ID_Descr.did = Tree_Array(Tree_search_ptr).fid (Record its level in the hierarchy - always one more than its directory)
   Temp_File_ID_Descr.level = Tree_Array(Tree_search_ptr).level + 1

(Mark it as a directory file)
   Temp_File_ID_Descr.is_a_dir = true (copy it into Tree Array and advance insert pointer.
   Note: it is assumed that there is room in Tree Array.
   The size of Tree Array must be set to the maximum number of directories
   which will ever be searched.)

```
        Tree_Array(Tree_ins_ptr) = Temp_File_ID_Descr
        Tree_ins_ptr = Tree_ins_ptr + 1

END OF if (Status field...

Until (Synchronization/Status structure status field = "no more files")

(Find all the matching data files in this directory. They will
be found in alphabetical order)
Repeat (Do the same "look-up" operation but with a different match criterion
    to select data files matching the user's selection criterion.)

$QIO( Lookup Function Code,
          Address of Synchronization/Status structure,
          "XXX.YYY" (YYY cannot be "DIR"), (match criterion (XXX.YYY from user))
          Tree_Array(Tree_search_ptr).fid,    (directory to search)
          Temp_File_ID_Descr.name.body,       (filename returned here)
          Temp_File_ID_Descr.name.len,        (name length returned here)
          Temp_File_ID_Descr.fid)             (file ID returned here)

Return to Process Sequence Control (240) to be called again at
        ENTRY POINT C

ENTRY POINT C:

(see if look-up operation is still going)
    if (Completion Flag is not set in Synchronization/Status structure) then (look-up operation is still going)
        Return to Process Sequence Control (240) to be called again at
            ENTRY POINT C (Look-up operation is now finished. See if a file was found)
    if (Status field in Synchronization/Status = "success") then (A file was found. Fill in the rest of the fields)

(Set pointer to its directory file)
        Temp_File_ID_Descr.dir = Tree_search_ptr (Give it the next file number available for data files.
        This file number will form the File ID of this file on the dest disk.)
        cur_file_num = cur_file_num + 1
        Temp_File_ID_Descr.file_num = cur_file_num (Increment the sequential search number and store it)
        current_search_num = current_search_num + 1
        Temp_File_ID_Descr.search_num = current_search_num (Record the file ID of its directory)
        Temp_File_ID_Descr.did = Tree_Array(Tree_search_ptr).fid (Record its level in the hierarchy - always one more than its directory)
        Temp_File_ID_Descr.level = Tree_Array(Tree_search_ptr).level + 1

(Mark it as a data file)
        Temp_File_ID_Descr.is_a_dir = false

ENTRY POINT D:

(see if there is room in the File_ID ring (180))
    if (room(File_ID_ins_ptr,File_ID_open_ex_ptr)) then
```

```
            (there is room.  Insert this new entry)
            File_ID_ring(file_ID_ins_ptr) = Temp_File_ID_Descr
            INCR(file_ID_ins_ptr)

else (there is no room in File_ID ring (180) right now)

Return to Process Sequence Control (240) to be called again
               at ENTRY POINT D END OF if (Status field...

Until (Synchronization/Status structure status field = "no more files")

(Done searching this directory.  Advance search pointer and start again
   with next directory.)

Tree_search_ptr = Tree_search_ptr + 1
   Go To ENTRY POINT A
```

PSEUDO-CODE FOR THE SOURCE OPEN PROCESS (41)

P2

( The source open process (41) is responsible for obtaining a VMS channel
to the source disk for each file being transferred and for using the channel
to read the file header from the source disk.  This process is generally
called "opening a file".  A file-level request to the operating system is
used to open a file.

For each file successfully opened, the source open process (41) creates
a new entry in the File Description Ring 90 filling it with all the previously
known information (from the Tree Array or the File ID Ring) and adding to
it the channel number and the contents of the header from the source disk.

The source open process must open files and insert them into the File
Description Ring (90) in the same order they were found, by ascending
search_num, or else the order of files in the File Description Ring would
be wrong.

The source open process (41) may have to wait when no files are available
from the File_ID Ring (180) or Tree Array (182), or when no channels
are available from VMS, or when the reading of the header is in progress,
or when there is no room for new entries in the File Description Ring (90). )

ENTRY POINT A:

(See if a file is available from either the Tree Array or the File_ID Ring)

```
if (tree_ins_ptr = tree_open_ptr) then
   directory_available = false
else
   directory_available = true if (File_ID_ins_ptr = File_ID_open_ex_ptr) then
   data_file_available = false
else
   data_file_available = true if (directory_available = false) and (data_file_available = false) then (no files are available right now.  See if more are coming.)
```

```
if (source search process DONE flag is set) then (no more files are coming.  Source open process is done too.)
    Set the source open process DONE flag.                              R47
    Return to Process Sequence Control (240) never to be called again.

else (more files may be coming)

Return to Process Sequence Control (240) to be called again at
        ENTRY POINT A else (at least one file is available)

(we have to process files by search order but we do not know if the file
    with the next higher search_num is in the Tree Array or in the File_ID
    Ring.  So, check both.)

if (directory_available and
        (last_search_num + 1 = Tree_Array(Tree_open_ptr).search_num)) then (the correct next file is in the Tree array.  Extract it into a temporary
        storage area called Next_Ring90_Entry defined as a File_Descr_Type.)

Next_Ring90_Entry.ID = Tree(Tree_open_ptr)                      R13
        Tree_open_ptr = Tree_open_ptr + 1 else (the correct next file was not in the Tree Array.  Check File_ID Ring)

if (data_file_available and
            (last_search_num + 1 = File_ID_ring(File_ID_open_ex_ptr).search_num)) then (the correct next file is in the File_ID ring.  Extract it into a the
            temporary storage area. )

Next_Ring90_Entry.ID = File_ID_ring(File_ID_open_ex_ptr)    R14
            INCR(File_ID_open_ex_ptr)

ENTRY POINT B:

(Request a channel from VMS for use with this file.  This uses a VMS
system service called $ASSIGN which is neither block- nor file- level IO.
All this request does is set up some VMS internal data structures.
If the memory available to this program is insufficient to create the
additional internal data structures then the request will fail with a status
of "no more channels available".  When this happens the source open process
will go into wait mode.  The source read process is constantly freeing up
channels as files are read.)

Status = $ASSIGN ("source_disk_name",  (disk that channel will be used with)
        Next_Ring90_Entry.chan)    (channel number will be returned here)   R34

(see if we succeeded in getting a channel)

if (status = "no more channels available") then (did not get a channel.  Go into wait mode.)

Return to Process Sequence Control to be called again at ENTRY POINT B.

(We have a channel.  Post the file-level request to VMS to open the file
and thus read the header)
```

```
SQIO (Open Function Code,
     Address of Synchronization/Status structure,
     Next_Ring90_Entry.chan,       (channel number to use)        R3
     Temp_Header)                  (the header will be returned here)
```

Return to Process Sequence Control (240) to be called again at ENTRY POINT C.

ENTRY POINT C:

(see if the open operation is still going)

if (Completion flag is not set in Synchronization/Status structure) then (open operation is still going)
  Return to Process Sequence Control (240) to be called again
    at ENTRY POINT C.

(The open operation is now done. Save the ID_Area (the first 200 bytes)
of the header from the source disk. Discard the Map_Area since the location
information in it is specific to the source disk. Copy the file length
from ID_Area to the length field so it is in standard integer format.

```
Next_Ring90_Entry.hdr = Temp_Header.ID_Area
Next_Ring90_Entry.len = Reverse_words(Next_Ring90_Entry.hdr.efblk)      R6
```

(Compute the number of blocks that will be allocated to this file on the
dest disk as the actual file length rounded up to the nearest cluster boundary)

```
Next_Ring90_Entry.dest_alloc_len =
   (((Next_Ring90_Entry.len - 1)/cluster_size) + 1) * cluster_size      R49
```

(Zero the extension information)

```
Next_Ring90_Entry.hdr.exten_segment_num = 0
Next_Ring90_Entry.hdr.exten_fileid_a = 0
Next_Ring90_Entry.hdr.exten_fileid_b = 0
Next_Ring90_Entry.hdr.exten_fileid_c = 0
```

(Create the file id)
```
Next_Ring90_Entry.hdr.fileid_a = Next_Ring90_Entry.id.file_num
Next_Ring90_Entry.hdr.fileid_b = 1                                      R15
Next_Ring90_Entry.hdr.fileid_c = 0
```

(Create the back link file id)
```
Temp = Next_Ring90_Entry.id.dir   (Temp = slot number of directory in Tree Array)
Next_Ring90_Entry.hdr.back_link_fileid_a = Tree(Temp).file_num
Next_Ring90_Entry.hdr.back_link_fileid_b = 1                            R16
Next_Ring90_Entry.hdr.back_link_fileid_c = 0
```

ENTRY POINT D:

(see if there is room in the file description ring (90) for this file)
if (room_in_Ring90(insert_ptr, hdr_ptr) and
    room_in_Ring90(insert_ptr, dir_ptr)) then         R7

(there is room. Insert the file and advance the insert pointer.)

```
   File_Description_Ring(insert_ptr) = Next_Ring90_Entry
   INCR (insert_ptr)                                                    R48
``` else { there is no room in File Description Ring for this file}

Return to the Process Sequence Control (240) to be called again
      at ENTRY POINT D {Loop back to open the next file}
Go To ENTRY POINT A

PSEUDO-CODE FOR THE SOURCE READ PROCESS (130)

{ The source read process (130) is responsible for reading the contents
of each data file from the source disk (20) and placing it in the data ring
(132). The source read process (130) processes files one-by-one as it
encounters them in the File Description Ring (90).

For high thruput, the source read process attempts to read data from the
source disk in 126 block pieces (1 segment at a time).

There are two circumstances when the source read process cannot read data
in segment-size pieces. First, when less than 126 blocks of data remain
in a file. Second, when the data from a single read command would span
the boundary from the highest segment to the lowest segment (e.g. segment
2 to segment 0).

The reason for the second circumstance is that the read command to the
source disk causes the Driver System (18) to place the data directly into
the data ring (132) by Direct Memory Access (DMA). Data transfer by DMA
must use contiguously addressed memory locations. A segmented ring occupies
continguously addressed memory locations with byte 0, block 0, segment 0
at the lowest address and byte 511, block 125, segment 2 at the highest
address. DMA data transfers across segment boundaries work fine as long
as it is not the boundary from the highest segment to the lowest segment.

The only other complicating factor in the source read process (130)
is that file boundaries fall randomly among segment boundaries (see
explanatory figure). This is handled by having two places in the code
where the read command is given, one place gives the first read command
of a file and the other place gives all subsequent read commands for the
file.

The source read process (130) waits under three circumstances: 1. no files
in the File Description Ring (90) to read; 2. a read command to source disk
is in progress; 3. no room in data ring (132). }

ENTRY POINT A:

{See if there is a file in the File Descriptor Ring (90) to be read} if (ins_ptr = read_ptr) then

{there is no file to be read. See if more are coming}
   if (source open process DONE flag is set) then {there are no more files coming. See if we have a partially filled
      segment in the data ring (132)}
      if (dest_data_STAT(dat_ins_ptr) = seg_busy) then {we have a partial segment. Release it to the write process (160)}
         dest_data_LEN(dat_ins_ptr) = seg_count
         dest_data_STAT(dat_ins_ptr) = seg_ready

```
  Set source read process DONE flag
  Return to Process Sequence Control (240) never to be called again.

else  (there may be more files coming)

Return to Process Sequence Control (240) to be called again
     at ENTRY POINT A (There is at least one file remaining in the File Description Ring (90).
The source read process (130) processes only data files.  Skip over
directory files by advancing the read_ptr.)

While (Ring90(read_ptr).id.is_a_dir) do (the file identified by the read_ptr is a directory file.  Skip it)
  INCR(read_ptr)

(see if there is still at least one file)
  if (ins_ptr = read_ptr) then (no more files now.  Maybe more later)
    Return to Process Sequence Control (240) to be called again
      at ENTRY POINT A

END OF WHILE LOOP (The file in the File Description Ring (90) identified by read_ptr
is the next file we will read.  Compute how much will be read on the
next read command, src_read_count, in blocks.  We will read the whole
file or 126 blocks whichever is less)

src_read_count = Ring90(read_ptr).len
if (src_read_count > seg_size) then src_read_count = seg_size

ENTRY POINT B:

(see if we have a partially filled segment in the data ring (132))
if (dest_data_STAT(dat_ins_ptr) is not equal to seg_busy) then (we have no partial segment.  Check the next segment.  If it is
  free then make it our current segment for inserting.)

next_dat_ins_ptr = dat_ins_ptr
  INCR(next_dat_ins_ptr)

if (dest_data_STAT(next_dat_ins_ptr) = seg_free then (is it free.  make it our current segment for inserting)

dat_ins_ptr = next_dat_ins_ptr
    seg_count = 0
    dest_data_STAT(dat_ins_ptr) = seg_busy
    dest_data_PLACEMENT(dat_ins_ptr) = seg_sequential
    dest_data_LEN(dat_ins_ptr) = 0
    dest_data_LBN(dat_ins_ptr) = 0
    seg_file_count(dat_ins_ptr) = 0
    seg_file_array(dat_ins_ptr, all elements) = 0 else  (next segment was not free)

(there    room in the data ring)
```

Return to Process Sequence Control (240) to be called again at
    ENTRY POINT B (We have a segment in the data ring (132) to use. Compute the new
insert location for the data ring (132) assuming we read the number of
blocks we want to read)

next_dat_ins_ptr = dat_ins_ptr
next_seg_count = seg_count + src_read_count (if the new insert location is past the end of the current segment we
will attempt to span segments)

read_spans_segments = false            (initialize condition flag)
if (next_seg_count > seg_size) then (see if this is the highest segment)
  if (dat_ins_ptr = dest_data_size - 1)     (i.e. the highest segment)

(it is the highest segment so we are prevented by DMA operation from
    spanning segments. So read fewer blocks, as many as will fit in this
    segment)

src_read_count = seg_size - seg_count
    next_seg_count = seg_size else (this is not the highest segment. We will attempt to span segments.)

(to span segments the next segment also has to be free. See if it is.)
    INCR(next_dat_ins_ptr)
    if (dest_data_STAT(next_dat_ins_ptr) = seg_free) then (the next segment is free. Mark it as busy with inserting)

dest_data_STAT(dat_ins_ptr) = seg_busy
      dest_data_PLACEMENT(dat_ins_ptr) = seg_sequential
      dest_data_LEN(dat_ins_ptr) = 0
      dest_data_LBN(dat_ins_ptr) = 0
      seg_file_count(dat_ins_ptr) = 0
      seg_file_array(dat_ins_ptr, all elements) = 0

(set condition flag indicating a spanned read is underway)

read_spans_segments = true (recompute where new insertion point will be in new segment
      following this spanned read)
      next_seg_count = next_seg_count - seg_size else (the next segment is not free. So read fewer blocks, as many
          as will fit in this segment)

src_read_count = seg_size - seg_count
      next_seg_count = seg_size (Issue the first read command for this file. See the pseudo-code for the
write process (160) for general explanation of $QIO calls.

This $QIO performs a virtual block read instead of a logical block read.
The blocks on a disk are numbered sequentially from zero to the highest
block on the disk. These are called their Logical Block Numbers (LBNs).
For example, a particular 50 block file may be stored in logical blocks
2100 to 2149. Any command which refers to disk blocks by their LBNs is
a logical block command.

The blocks of a particular file can also be numbered sequentially from one
to the highest block in the file. These are called Virtual Block Numbers
(VBNs). Virtual block numbers start over at one at the beginning of each
file. Virtual block numbers are independent of the storage location of the
file or even whether it is stored contiguously. For example, a 50 block
file is always stored in virtual blocks 1 to 50. Any command which refers
to disk blocks by their VBNs is a virtual block command.

The source read process uses Virtual Block read commands so it does not
have to concern itself with the physical location of the files on the
source disk. The invention is a means of doing Multi-File Writes.
The method of accessing the source disk is not relavent as long as it does
not slow the multi-file write operation. )

```
doing_first_read = true            (set condition flag)
src_read_vbn = 1       (start reading with the first block of the file)

SQIO( Read Virtual Block Function Code,
      Address of Synchronization/Status Structure,
      Ring90(read_ptr).chan,         (channel number of file being read)
      dest_data(seg_count,dat_ins_ptr),  (address where DMA puts data)
      src_read_count,                (number of blocks to read)
      src_read_vbn)                  (blk number within file to start at)

Return to Process Sequence Control (240) to be called again
  at ENTRY POINT C

ENTRY POINT C:

(check for completion of the read operation)

if (Completion Flag is not set in the Synchronization/Status Structure) then (read operation is not done)
   Return to Process Sequence Control (240) to be called again
     at ENTRY POINT C (The read operation is now complete.)

(Remember where in the file we left off for the next read)
src_read_vbn = src_read_vbn + src_read_count (see if this was the first read operation on the file)
if (doing_first_read) then (this was the first read operation on the file. That means this file
   was begun in this segment.)

(store the segment-relative lbn in the file's entry in the File Description
   Ring (90). Later this number will be converted to absolute LBN on the
   dest disk (22) by the write process (160))

Ring90(read_ptr).dest_lbn = seg_count (enter this file into the list of files begun in this segment)

(fetch first free slot number in the seg_file_array)
   Temp = seg_file_count(dat_ins_ptr)

(store this file's Ring90 slot number in seg_file_array)
   seg_file_array(Temp,dat_ins_ptr) = read_ptr (increment the list length)
   Temp = Temp + 1
   seg_file_count(dat_ins_ptr) = Temp
```

{if this is a spanned read the first segment of the pair can now be
released to the write process (160)} if (read_spans_segments) then dest_data_LEN(dat_ins_ptr) = seg_size        (it is full be definition)
    dest_data_STAT(dat_ins_ptr) = seg_ready {make the (previously computed) new insert location official}
    dat_ins_ptr = next_dat_ins_ptr seg_count = next_seg_count {update the current length of the segment}
dest_data_LEN(dat_ins_ptr) = seg_count {if the current segment is full release it to the write process}
if (seg_count > or = seg_size)
    dest_data_STAT(dat_ins_ptr) = seg_ready {check for more file to read}
if (src_read_vbn > Ring90(read_ptr).len) then      R37

{there is no more of the file to read}

{deassign the channel so it can be reused by the source open process (41).
    See the general information about assigning channels in the pseudo-code
    for the source open process (41)}

$DEASSIGN( Ring90(read_ptr).chan)

{advance the pointer to the File Description Ring (90)}

INCR(read_ptr)

{start reading the next file}
    Go To ENTRY POINT A

{There is more of this file to read. Compute how much will be read on the
next read command. We will read the all that's left or 126 blocks whichever
is less} src_read_count = 1 + Ring90(read_ptr).len - src_read_vbn
if (src_read_count > seg_size) then src_read_count = seg_size

ENTRY POINT D:

{see if we have a partially filled segment in the data ring (132)}
if (dest_data_STAT(dat_ins_ptr) is not equal to seg_busy) then {we have no partial segment. Check the next segment. If it is
    free then make it our current segment for inserting.} next_dat_ins_ptr = dat_ins_ptr
    INCR(next_dat_ins_ptr)

if (dest_data_STAT(next_dat_ins_ptr) = seg_free then

{is it free. make it our current segment for inserting}

```
        dat_ins_ptr = next_dat_ins_ptr
        seg_count = 0
        dest_data_STAT(dat_ins_ptr) = seg_busy
        dest_data_PLACEMENT(dat_ins_ptr) = seg_sequential
        dest_data_LEN(dat_ins_ptr) = 0
        dest_data_LBN(dat_ins_ptr) = 0
        seg_file_count(dat_ins_ptr) = 0
        seg_file_array(dat_ins_ptr, all elements) = 0 else (next segment was not free)

(there is no room in the data ring)         R9A

Return to Process Sequence Control (240) to be called again at
        ENTRY POINT D (We have a segment in the data ring (132) to use. Compute the new
insert location for the data ring (132) assuming we read the number of
blocks we want to read)

next_dat_ins_ptr = dat_ins_ptr
next_seg_count = seg_count + src_read_count (if the new insert location is past the end of the current segment we
will attempt to span segments)

read_spans_segments = false           (initialize condition flag)
if (next_seg_count > seg_size) then (see if this is the highest segment)
  if (dat_ins_ptr = dest_data_size - 1)    (i.e. the highest segment)

(it is the highest segment so we are prevented by DMA operation from
     spanning segments. So read fewer blocks, as many as will fit in this
     segment)

src_read_count = seg_size - seg_count
     next_seg_count = seg_size else (this is not the highest segment. We will attempt to span segments.)

(to span segments the next segment also has to be free. See if it is.)
     INCR(next_dat_ins_ptr)
     if (dest_data_STAT(next_dat_ins_ptr) = seg_free) then (the next segment is free. Mark it as busy with inserting)

dest_data_STAT(dat_ins_ptr) = seg_busy
        dest_data_PLACEMENT(dat_ins_ptr) = seg_sequential
        dest_data_LEN(dat_ins_ptr) = 0
        dest_data_LBN(dat_ins_ptr) = 0
        seg_file_count(dat_ins_ptr) = 0
        seg_file_array(dat_ins_ptr, all elements) = 0

(set condition flag indicating a spanned read is underway)
        read_spans_segments = true (recompute where new insertion point will be in new segment
        following this spanned read)
        next_seg_count = next_seg_count - seg_size else (the next segment is not free. So read fewer blocks, as many
           as will fit in this segment)
```

```
        src_read_count = seg_size - seg_count
        next_seg_count = seg_size (Issue the next read command for this file.)

doing_first_read = false          (set condition flag)

SQIO( Read Virtual Block Function Code,
      Address of Synchronization/Status Structure,
      Ring90(read_ptr).chan,           (channel number of file being read)
      dest_data(seg_count,dat_ins_ptr),(address where DMA puts data)
      src_read_count,                  (number of blocks to read)
      src_read_vbn)                    (blk number within file to start at)

Return to Process Sequence Control (240) to be called again
  at ENTRY POINT C
```

PSEUDO-CODE FOR THE DESTINATION HEADER PROCESS (170)

```
{ The destination header process (170) is responsible for creating in
the dest_hdr ring (172) the headers for data files.

It processes files one-by-one as it encounters them in the File Description
Ring (90) skipping over directory files. The file currently being processed
is identified by the hdr_ptr (102). The hdr_ptr (102) is not allowed to
pass the write_ptr (98). This rule guarantees that all the information
necessary to create the header (including the file's final length and
absolute LBN on the dest disk (22)) is available in the File Description
Ring (90) before the header is made.

The destination hdr process (170) waits in two circumstances:
1. no more files ready for headers in File Description Ring (90); and
2. no room for more headers in the dest_hdr ring (172). }

ENTRY POINT A:

(skip over directory files)

while (write_ptr not equal to hdr_ptr) and
      (Ring90(hdr_ptr).id.is_a_dir = true) do INCR(hdr_ptr)

end of while loop (see if there is a data file needing a header)

if (write_ptr = hdr_ptr) then (no data files need headers. see if more are coming)

if (hdr_ptr = ins_ptr) and
     (source open process DONE flag is set) then (no more files coming. See if we have a partially filled hdr ring
    segment that should be released to the write process)

if (dest_hdr_STAT(hdr_ins_ptr) = seg_busy) then (we have a partial segment, so release it)
      dest_hdr_LEN(hdr_ins_ptr) = seg_count
      dest_hdr_STAT(hdr_ins_ptr) = seg_ready
```

```
    Set the destination header process DONE flag
    Return to Process Sequence Control (240) never to be called again else (there may be more files coming)

Return to Process Sequence Control (240) to be called again at
        ENTRY POINT A

ENTRY POINT B:

(see if we have a partially filled segment in the dest_hdr ring)

if (dest_hdr_STAT(hdr_ins_ptr) is not equal to seg_busy) then (we have no current segment for inserting. See if the next segment
    around the ring is free)

next_hdr_ins_ptr = hdr_ins_ptr
    INCR(next_hdr_ins_ptr)

if (dest_hdr_STAT(next_hdr_ins_ptr) = seg_free) then (the next segment is free. Set it up to be the current segment)

hdr_ins_ptr = next_hdr_ins_ptr
      seg_count = 0
      dest_hdr_STAT(hdr_ins_ptr) = seg_busy
      dest_hdr_PLACEMENT(hdr_ins_ptr) = seg_sequential
      dest_hdr_LEN(hdr_ins_ptr) = 0
      dest_hdr_LBN(hdr_ins_ptr) = 0 else (the next segment is not free)

Return to Process Sequence Control (240) to be called again at
          ENTRY POINT B (We now have a file to process and a place to put its header.
Proceed to create the header)

(copy the whole ID_AREA as it is stored in the File Description Ring (90))

dest_hdr(seg_count,hdr_ins_ptr).id_area = Ring90(hdr_ptr).hdr      R 31

(Leave the efblk and ffbyte fields the same. Set the hiblk and highest_vbn
fields to the allocation length)

Temp = Ring90(hdr_ptr).dest_alloc_len
dest_hdr(seg_count,hdr_ins_ptr).id_area.rms_attr.hiblk = Temp
dest_hdr(seg_count,hdr_ins_ptr).id_area.next_vbn_to_allocate = Temp (make a compressed map of the location info in the map_area of the header)
Compress_Map( Ring90(hdr_ptr).dest_alloc_len,    (file's allocated length)
              Ring90(hdr_ptr).dest_lbn,          (file's absolute LBN)
              dest_hdr(seg_count,hdr_ins_ptr))   (address of map)

(add the checksum at the end of the header)

Add_Checkword( dest_hdr(seg_count,hdr_ins_ptr),  (address of header)
               255)                              (offset of checksum)
```

{Header is done. Advance the hdr ring insert location} seg_count = seg_count + 1

{Update the segment length} dest_hdr_LEN(hdr_ins_ptr) = seg_count

{if the segment is full, release it to the write process} if (seg_count >= seg_size) then

{segment is full}
  dest_hdr_STAT(hdr_ins_ptr) = seg_ready

{Advance the hdr_ptr to the File Description Ring (90)}

INCR(hdr_ptr)

{Start on next file right away}
Go To ENTRY POINT A

PSEUDO-CODE FOR THE DESTINATION DIRECTORY PROCESS (174)

{ The destination directory process (174) is responsible for creating in
the dir ring (176) the contents of directory files. It is also responsible
for creating in the dir_hdr ring (192) the directory file headers.

A directory file is a list of filenames and file IDs in alphabetical order
by filename.

The dir process (174) processes both data and directory files marking its
place in the file description ring (90) with the dir_ptr (100). The dir_ptr
(100) may advance all the way up to the insert_ptr (94).

The dir process always has a currently open directory into which it is
inserting directory entries. The main actions of the dir process (174)
depend on the file identified by the dir_ptr (100) and on the currently
open directory as follows:

1. if the file is a data file and belongs in the currently open directory
then a directory entry is created for it in the dir ring (176);

2. if the file is a data file but doesn't belong in the currently open
directory then the currently open directory is closed off and released
(i.e. its final length is written into its header in the dir_hdr ring,
the dir_hdr ring len_release pointer moves to the next header, the dir ring
insert pointer moves to the beginning of the next cluster). Then the next
directory is prepared for use as the currently open directory and a
directory entry for the file is created in the dir ring (176).

3. if the file is a directory file then a directory entry is created for
it in the Dir_Entry ring (178) and an incomplete header is created for it
in the dir_hdr ring (192).

ENTRY POINT A:

{Assess the work that the dir process (174) needs to do.}

{check for file waiting to be processed in the file description ring (90)}
if (insert_ptr (94) = dir_ptr (100)) then    {there is no file to process}
  have_new_descr = false
else                                      {there is a file to process}
  have_new_descr = true

```
(see if there are unwritten directories in the dir ring (176))
if (dest_dir_STAT(dir_ins_ptr) is neither seg_ready nor seg_free) then
  (there are unwritten directories)
  dirs_on_hand = true
else (there are no unwritten dirs)
  dirs_on_hand = false (see if there are headers in the dir_hdr ring (192) needing final lengths)
if ((dir_hdr_ins_ptr = len_rel_ptr) and
    (hdr_seg_count = len_rel_count)) then
  (there are no headers needing final lengths)
  dir_hdrs_on_hand = false
else
  (there are headers needing final lengths)
  dir_hdrs_on_hand = true (if no more work to do, then return for the last time)
if (have_new_descr, dirs_on_hand, dir_hdrs_on_hand are all false) and
   (source open process (41) DONE flag is set) then Set DONE flag for the destination dir process (174)
  Return to Process Sequence Control (240) never to be called again (if no work to do right now, then return)
if (have_new_descr = false) but
   (source open process (41) DONE flag is not set) then Return to Process Sequence Control (240) to be called again at
    ENTRY POINT A (There is work to do. A collection of condition flags control what work
is done. The method of setting the condition flags is as follows:
1. all flags are initially set to false.
2. if individual conditions are found to exist, flags are set to true.
This results in a logical OR of conditions. For example,
  color_present = false
  if shirt is red then color_present = true
  if sky is blue then color_present = true The condition flag "color_present" will end up true if the shirt is red
OR the sky is blue.)

(Initialize the condition flags to false)

done_with_segment = false
        done_with_file = false
        done_with_block = false
        done_with_entry = false
        insert_new_hdr = false
        done_with_hdr_segment = false
        need_new_dir_seg = false
        need_new_dir_hdr_seg = false (At the end of the whole operation we will probably have a partially filled
segment in the dir ring (176) and no more files coming. Set the condition
flags so the segment gets closed off and released to the write process (160).)

if (not have_new_descr and dirs_on_hand and
    (source open process (41) DONE flag is set) then
  done_with_segment = true
  done_with_file = true
  done_with_entry = true
  done_with_block = true
```

{At the end of each directory file, actions are needed to close off the
old directory file and set up the new one. Detect this situation and
set the condition flags accordingly.}

{see if the next file belongs to the currently open directory file}
if (have_new_descr and dir_hdrs_on_hand) then {Fetch the file number of the currently open directory}
  Temp1 = dest_dir_hdr(len_rel_count,len_rel_ptr).id_area.fileid_a {Fetch the Tree_Array slot number of the next file's directory}
  Temp2 = Ring90(dir_ptr).id.dir {Fetch the file number of the next file's directory}
  Temp3 = Tree_Array(Temp2).file_num {if the file numbers do not match then the next file does not belong in the
  current directory so it is time to change to the next directory}
  if (Temp1 is not equal to Temp3) then
    done_with_file = true
    done_with_entry = true
    done_with_block = true

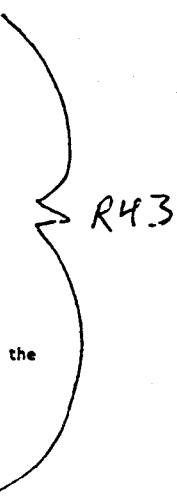
R43

{Multiple versions of the same file share the same directory entry. Detect
this situation and set the condition flags accordingly.}

{Check the name of the file to be processed against the name of the last
file processed}
if (Ring90(dir_ptr).id.name is not equal to last_name_processed) then
  done_with_entry = true {VMS does not completely fill the blocks in directory files.
This is because the entries in directories are alphabetical and inserting a
new entry requires shifting down succeeding entries. To reduce the shifting
required VMS only fills about the first half of each disk block of a
directory file so that only the entries in that block need shifting.
Entries are generally not split between blocks. Detect this "block full"
condition and set the condition flags accordingly.}

{see if the current block is getting full}
if (have_new_descr and dirs_on_hand and (byte_count > 300 bytes) then {block is getting full. see if we are between entries}
  if (done_with_entry) then {conditions are right for skipping to a new block}
    done_with_block = true {if the file to be processed is a directory file then we need to make a
new (though incomplete) header in dir_hdr ring (192)} if (have_new_descr) then
  if (Ring90(dir_ptr).id.is_a_dir = true) then
    insert_new_hdr = true {if we need to make a dir entry but do not have an already started segment
of the dir ring (176) then we need to get one} if (have_new_descr but not dirs_on_hand) then
  need_new_dir_seg = true (The segment, block, and byte where we left off after our last insert into
the dir ring (176) are contained in dir_ins_ptr, seg_count, and byte_count
respectively. But that is not always where we want to begin the next insert.
For example, if the block is getting full we want to skip ahead to the next
block. If we are starting a new directory file we want to skip ahead to
the next cluster. In some cases, we need to skip ahead to the next segment.)

(see if we are even going to do an insert)
if (have_new_descr) then (we are going to insert. Figure out the segment, block, and byte where we
   want to begin the insert. Store them in next_dir_ins_ptr, next_seg_count,
   and next_byte_count)

(Use place where we left off by default)
   next_dir_ins_ptr = dir_ins_ptr
   next_seg_count = seg_count
   next_byte_count = byte_count if (done_with_block) then        (skip ahead to start of next block)
     next_seg_count = seg_count + 1
     next_byte_count = 0 if (done_with_file) then        (skip ahead to start of next cluster)
     next_seg_count = (((seg_count - 1)/cluster_size) + 1) * cluster_size
     next_byte_count = 0 if (done_with_seg) then        (skip ahead to start of next segment)
     next_seg_count = seg_size        (dir_ins_ptr will be advanced below)
     next_byte_count = 0

{R44}

(skipping ahead by setting next_seg_count and next_byte_count may have
   carried the point of insert out of the current segment. See if this
   is the case.)
   if (next_seg_count > seg_size - 1) then (It is the case that the point of insert is in the next segment. Remember
     this condition.)
     need_new_dir_seg = true (release the old segment to the write process. This is the first of two
     locations in the code where the old dir seg is released. This one
     executes when a segment is full. The other executes only to release the
     partial segment at the end of the whole operation. The number of places
     in the code where a particular operation is executed is easily changeable
     by a person of ordinary skill in the art. Generally, it is preferrable
     to have each operation appear in the code only once.)

dest_dir_STAT(dir_ins_ptr) = seg_ready (the LEN field contains the number of blocks from this segment that will
     actually be written to the dest disk. Set it according to where our
     last insert left off (rounded up to next cluster))
     Temp = seg_count + 1        (we left off at seg_count)
     Temp = (((Temp - 1)/cluster_size) + 1) * cluster_size    (round up)
     dest_dir_LEN(dir_ins_ptr) = Temp (if we are going to insert a new header into to the dir_hdr ring we need
   a place to put it. Check if we have a segment already started. If not,
   we need to start one)
   if (insert_new_hdr) then
    if (dest_dir_hdr_STAT(dir_hdr_ins_ptr) is not equal to seg_busy) then (we do not have a segment already started)
     need_new_dir_hdr_seg = true {If we need a new segment in the dir ring to do our insert and one is not available then the insertion is blocked. Likewise, if we need a new segment in the dir_hdr ring to insert a new header and one is not available then that insertion is blocked. As a speed enhancement, the code below decides which insertion to attempt first based on which is not blocked.}

{by default, to the dir ring insertion first}
do_dir_first = true

{if dir ring insertion may be blocked then do dir_hdr ring insertion first}
if (need_new_dir_seg but not need_new_dir_hdr_seg) then
  do_dir_first = false {skip down to code for dir_hdr ring insertion if that is what we decided to do first}
if (do_dir_first = false) then
  Go To ENTRY POINT C ENTRY POINT B:    {Handle the dir ring}

{Condition flags are all set. Locations for inserts are all set.
If we need a new segment in the dir ring we will get it here, remaining blocked until we do} if (need_new_dir_seg) then

{see if the next segment around the ring is available}
  next_dir_ins_ptr = dir_ins_ptr
  INCR(next_dir_ins_ptr)
  if (dest_dir_STAT(next_dir_ins_ptr) = seg_free) then
  {the next segment is available. Correctly initialize all the pointers and fields associated with this segment}
  need_new_dir_seg = false
  next_seg_count = 0
  next_byte_count = 0
  dest_dir_STAT(next_dir_ins_ptr) = seg_busy
  dest_dir_PLACEMENT(next_dir_ins_ptr) = seg_sequential
  dest_dir_LEN(next_dir_ins_ptr) = 0
  dest_dir_LBN(next_dir_ins_ptr) = 0
  dir_seg_file_count(next_dir_ins_ptr) = 0 else {the next segment is not available}

Return to Process Sequence Control (240) to be called again at
    ENTRY POINT B {Begin the actual work of creating and inserting directory entries into the dir ring.}

{If the directory entry we are about to insert is the first of a new directory file then the possibility exists that there are directory entries for directory files still sitting in the Dir_Entry Ring (178). This condition occurs when there are directory files whose names follow in alphabetical order the name of the last data file.}

{see if we are changing to a new directory file}
if (done_with_file) then

{we are changing to a new directory file. Copy all directory entries in the Dir_Entry ring (178) into the dir ring (176). The following loop executes once per directory entry copied} while (dir_entry_ins_ptr is not equal to dir_entry_ex_ptr) then (Copy, byte-by-byte the directory entry in the Dir_Entry ring starting
    at dir_entry_ex_ptr to the dir ring starting at the location whose
    (segment,block,byte) is stored in (dir_ins_ptr,seg_count,byte_count).
    Directory entries are not a fixed length, but the length is stored in
    the first two bytes of the entry. Exact pseudo-code is not provided
    for the byte by byte copy operation because a person of ordinary skill
    in the art can provide it from the English-language description given)

END OF WHILE LOOP (Since directory entries are variable in length and blocks of directory
files are only about half filled, one needs a means of knowing where the
last directory entry in a block ends. The means used by VMS is to store
the number FFFF (hexadecimal) into the two bytes following the last entry.
TurboStore conforms to this rule and stores FFFF in each block of a directory
file following the last entry)

(see if we are changing to a new block)

if (done_with_block) then (we are changing to a new block. Terminate the old block first)
   dest_dir(byte_count,seg_count,dir_ins_ptr) = FF   (first byte in hex)
   byte_count = byte_count + 1
   dest_dir(byte_count,seg_count,dir_ins_ptr) = FF   (second byte in hex)
   byte_count = byte_count + 1

(add this block to the accumulating length of the directory file stored
   in its header in the dir_hdr ring)
   dest_dir_hdr(len_rel_count,len_rel_ptr).map.len = itself + 1

(if we are done inserting into this segment then release it to the write
process. This is the second of two locations in the code where the old dir
seg is released. This one executes just once to release the partial segment
at the end of the whole operation.)

if (done_with_segment) then (release it to the write process)
   dest_dir_STAT(dir_ins_ptr) = seg_ready (the LEN field contains the number of blocks from this segment that will
   actually be written to the dest disk. Set it according to where our
   last insert left off (rounded up to next cluster))
   Temp = seg_count + 1                          (we left off at seg_count)
   Temp = (((Temp - 1)/cluster_size) + 1) * cluster_size   (round up)
   dest_dir_LEN(dir_ins_ptr) = Temp (if we are changing to a new directory file then close out the old one)
if (done_with_file) then (Copy the final length of the file from one place in its header:
       dest_dir_hdr(len_rel_count,len_rel_ptr).map.len
   to a couple other places in its header:
       dest_dir_hdr(len_rel_count,len_rel_ptr).id_area.rms_attr.efblk
       dest_dir_hdr(len_rel_count,len_rel_ptr).id_area.rms_attr.ffbyte Compute the number of blocks to be allocated to this file as its length
   rounded up to the next cluster boundary and store it in two places in
   its header:
       dest_dir_} (len_rel_count,len_rel_ptr).id_area.rms_attr.hiblk
       dest_dir_    n_rel_count,len_rel_ptr).id_area.next_vbn_to_allocate)

R18

R19

{release its header, moving the length_release pointer of the dir_hdr ring
to the next header}
next_len_rel_count = len_rel_count + 1
next_len_rel_ptr = len_rel_ptr                                               R20

{see if we just crossed into the next segment of the dir_hdr ring}
if (next_len_rel_count > seg_size - 1) then {we just crossed into the next segment of the dir_hdr ring}
   {mark the old segment for release to the write process}
   done_with_hdr_segment = true {correct the length_release pointer}
   next_len_rel_count = 0
   INCR(next_len_rel_ptr)

{test for more directory headers to process in the dir_hdr ring. If the
length_release pointer has caught up to the insert pointer then there are    R21
no more directory headers to process} if ((dir_hdr_ins_ptr = next_len_rel_ptr) and
    (hdr_seg_count = next_len_rel_count)) then {the length_release pointer has caught up with the insert pointer}
   dir_hdrs_on_hand = false else {the length_release pointer has not caught up}
   dir_hdrs_on_hand = true {see if we are all done processing dir_hdrs}
if ((not have_new_descr) and
    (not dir_hdrs_on_hand) and
    (the source open process (41) DONE flag is set)) then {we are all done processing dir_hdrs. mark current partial segment
   for release to write process}
   done_with_hdr_segment = true {if we are all done with the last segment in the dir_hdr ring either because
it it full or because it is partially full and there are no more files coming
then the done_with_hdr_segment flag is set. Release the last dir_hdr segment   R22
to the write process. Note: the headers in the segment being released are
still incomplete. The write process still has to store the final location
of the dir files into the headers. So the segment status is set accordingly} if (done_with_hdr_segment) then
  dest_dir_hdr_STAT(len_rel_ptr) = seg_await_lbn {move the (previously computed) location of the directory header for the
new currently open directory into the official length release pointer.        R23
This action establishes a new currently open directory} len_rel_count = next_len_rel_count
len_rel_ptr = next_len_rel_ptr

{if we are now about to begin filling a new directory file it is a
"file begun in this segment".

if (done_with_file) then

{Store the current block number of the insert ptr into its header as its
segment-relative lbn and initialize its length to zero} dest_dir_hdr(len_rel_count,len_rel_ptr).map.lbn = next_seg_count
dest_dir_hdr(len_rel_count,len_rel_ptr).map.len = 0

{Add it to the list of files begun in this segment. Note: unlike for
data files where a count AND a list is kept, only a count is kept of
directory files begun in this segment. This is because the the LBN
release pointer always points to the header of the first file begun in
this segment and the headers of the files begun in this segment are
contiguous in dir_hdr ring. So a count is all that is needed to locate
them.} dir_seg_file_count(next_dir_ins_ptr) = itself + 1

{The old directory file is closed off and the new one is ready. But we
have to insure that it is the directory to which the file we are processing
belongs.}

{Fetch the file number of the currently open directory}
Temp1 = dest_dir_hdr(len_rel_count,len_rel_ptr).id_area.fileid_a {Fetch the Tree_Array slot number of the next file's directory}
Temp2 = Ring90(dir_ptr).id.dir {Fetch the file number of the next file's directory}
Temp3 = Tree_Array(Temp2).file_num {if the file numbers do not match then the file we are processing does not
belong in the new current directory so we have to change directories again
before doing the insert. This is accomplished by setting the done_with_file
flag. All creating of directory entries below is contingent on this flag
so that if the currently open directory is not the right one we will skip
over the code below and end up starting over at ENTRY POINT A} if (Temp1 is not equal to Temp3) then
  done_with_file = true
else
  done_with_file = false {Move the (previously computed) new insert location for the dir ring into the
official insert pointer. This action establishes the new current insert
location} dir_ins_ptr = next_dir_ins_ptr
seg_count = next_seg_count
byte_count = next_byte_count {This is the beginning of the code which actually creates directory entries
in the dir ring. This whole block of code is conditional on a couple of
flags to insure that entries are only created in the correct directory} if (not done_with_file and have_new_descr) then

{see if we are creating a whole new entry or just adding on a partial
entry for another version of the file} if (done_with_entry) then {make a whole new entry}

{The following loop is executed once per entry created, as follows:

CASE I:
If the file we are processing is a data file and there are no
entries for directory files waiting in the Dir_Entry ring which precede
this data file in alphabetical order then the loop is executed one time
to create an entry for the data file in the dir ring.

CASE II:
If the file we are processing is a data file and there are entries for
directory files waiting in the Dir_Entry ring which precede this data
file in alphabetical order then the loop executes once per such directory
file to copy its entry from the Dir_Entry ring into the Dir ring plus
one more time to create an entry for the data file in the dir ring.

CASE III:
If the file we are processing is a directory file then the loop executes
one time to create its directory entry in the Dir_Entry ring.}

} R17

```
done = false
While (not done) do

{initialize condition flags used to control actions in the loop}
   dir_file = false
   dir_precedes = false {if we have a data file, check for dir entries in Dir_Entry ring}
   if (Ring90(dir_ptr).id.is_a_dir = false) then
      if (dir_entry_ins_ptr is not equal to dir_entry_ex_ptr) then
         dir_file = true {if there is a dir file see if it precedes the data file}
   if (dir_file) then {Extract the file name from the directory entry in Dir_Entry
      into a temporary string variable called Test_Str.
      The first byte of the dir entry is at Dir_Entry(dir_entry_ex_ptr).
      The length of the file name is stored the sixth byte.
      The file name starts in the seventh byte. Explicit code is not
      given because the byte-by-byte copy operation can be provided
      by one of ordinary skill in the art}

{See if the name of the directory file precedes the name of the
      data file in alphabetical order. Explicit code is not
      given because an alphabetical comparison operation can be provided
      by one of ordinary skill in the art} if (Test_Str precedes Ring90(dir_ptr).id.name) then
         dir_precedes = true {if there is a dir file which precedes, copy its entry to dir ring}
      if (dir_file and dir_precedes) then
      {Copy, byte-by-byte the directory entry in the Dir_Entry ring starting
      at dir_entry_ex_ptr to the dir ring starting at the location whose
      (segment,block,byte) is stored in (dir_ins_ptr,seg_count,byte_count).
      The first and second bytes contain the length of the entry. The
      entry starts in the third byte. Exact pseudo-code is not provided
      for the byte by byte copy operation because a person of ordinary skill
      in the art can provide it from the English-language description given} else {no need to copy from Dir_Entry} done = true

{if the file we are processing is a directory file create its
      entry in Dir_Entry ring otherwise create its entry directly in
      dir ring. Directory files always have only 1 version.}
```

} R45

```
if (Ring90(dir_ptr).id.is_a_dir) then (the following two calls create one whole entry in the
    Dir_Entry ring)

Create_Dir_Entry( Dir_Entry,                  (ring to use)
                          dir_entry_ins_ptr,          (insert location)
                          Ring90(dir_ex_ptr).id.name) (file name)

Create_Dir_Version( Dir_Entry,                  (ring to use)
                            dir_entry_ins_ptr,          (insert location)
                            Ring90(dir_ex_ptr).id.name, (version number)
                            Ring90(dir_ex_ptr).hdr.fileid_a, (file id)
                            Ring90(dir_ex_ptr).hdr.fileid_b,
                            Ring90(dir_ex_ptr).hdr.fileid_c)

else (this is a data file)

(the following call creates a partial entry (that part of the
    entry that is not repeated for each version) in the Dir ring)

Create_Dir_Entry( Dest_Dir,                            (ring to use)
                          dir_ins_ptr,seg_count,byte_count,    (insert location)
                          Ring90(dir_ex_ptr).id.name)          (file name)

END OF WHILE LOOP end of code conditional on (done_with_entry)

(see if this is a data file - needing a version entry)

if (Ring90(dir_ptr).id.is_a_dir = false) then (the following call creates a partial entry (that part of the entry
    that is repeated for each version) in the Dir ring)

Create_Dir_Version( Dest_Dir,                           (ring to use)
                        dir_ins_ptr,seg_count,byte_count,   (insert location)
                        Ring90(dir_ex_ptr).id.name,         (version number)
                        Ring90(dir_ex_ptr).hdr.fileid_a,    (file id)
                        Ring90(dir_ex_ptr).hdr.fileid_b,
                        Ring90(dir_ex_ptr).hdr.fileid_c)

(store the new length of the current Dir Ring segment)

dest_dir_LEN(dir_ins_ptr) = seg_count + 1 end of block of code conditional on (not done_with_file and have_new_descr)

(jump ahead if needed to do the Dir ring and Dir_Hdr ring operations in
the desired order)

if (do_dir_first = false) then
    Go To ENTRY POINT D

ENTRY POINT C: handle the dir_hdr ring (If we need a new segment in the dir_hdr ring we will get it here, remaining
blocked until we do)

if (need_new_dir_hdr_seg) then
```

{see if the next segment around the ring is available}
next_dir_hdr_ins_ptr = dir_hdr_ins_ptr
INCR(next_dir_hdr_ins_ptr)
if (dest_dir_hdr_STAT(next_dir_hdr_ins_ptr) = seg_free) then {the next segment is available. Correctly initialize all the
   pointers and fields associated with this segment} need_new_dir_hdr_seg = false
   dir_hdr_ins_ptr = next_dir_hdr_ins_ptr
   hdr_seg_count = 0
   dest_dir_hdr_STAT(dir_hdr_ins_ptr) = seg_busy
   dest_dir_hdr_PLACEMENT(dir_hdr_ins_ptr) = seg_sequential
   dest_dir_hdr_LEN(dir_hdr_ins_ptr) = 0
   dest_dir_hdr_LBN(dir_hdr_ins_ptr) = 0 else {the next segment is not available}

Return to Process Sequence Control (240) to be called again at
     ENTRY POINT C {see if we need to do the header operation} if (insert_new_hdr) then
   {copy the whole ID AREA from the File Description Ring (90)} dest_dir_hdr(dir_hdr_ins_ptr,hdr_seg_count).id_area =
                               Ring90(dir_ex_ptr).hdr    R32—

{set every word in the MAP AREA to zero} dest_dir_hdr(dir_hdr_ins_ptr,hdr_seg_count).map_area = 0

{update the length of the segment}      R44 dest_dir_hdr_LEN(dir_hdr_ins_ptr) = hdr_seg_count + 1

{advance the insert location for the dir_hdr ring} hdr_seg_count = hdr_seg_count + 1 if (hdr_seg_count = seg_size) then

{the segment is full. mark it as needing final file lengths yet} dest_dir_hdr_STAT(hdr_ins_ptr) = seg_await_len

{jump back if needed to do the Dir ring and Dir_Hdr ring operations in
the desired order} if (do_dir_first = false) then
  Go To ENTRY POINT B

ENTRY POINT D: completion code

{if we succeeded in processing a file from the File Description Ring (90)
then advance the dir_ptr.}

```
if (not done_with_file and have_new_descr) then

INCR(dir_ptr)
```

(Start over with the next file from the File Descriptor Ring (90))

Go To ENTRY POINT A

PSEUDO-CODE FOR THE DESTINATION WRITE PROCESS (160)

TOP LEVEL

P6

(The Destination Write Process (160) is responsible for writing the contents
of the data, hdr, dir, dir_hdr, and allocation control list rings (132,
172, 176, 192, and 162) to the destination disk (22) in minimum time.

It is primarily the action of the dest write process (160) which gives
TURBOSTORE its speed. However, the sorting of the information into
different rings done by the other processes is a prerequisite.

The Dest Write Process (160) achieves the speed by choosing the size and
order of write operations to minimize the time consumed by the mechanical
movements of the disk and the head/arm assembly in the drive. The algorithm
is simple and may be stated in the following general terms: try to write
126 blocks at a time and use the buffering action of the rings to minimize
switching between rings.

The dest write process (160) is currently limited to writing to a blank
disk. It assigns four fixed size regions on the destination disk to contain
the contents of the four main rings (data, dir, hdr, dir_hdr). Writing
from a ring to its region proceeds sequentially.

The complexity of the dest write process (160) does not come from the actions
just described but rather from a large number of coordination details
(particularly to coordinate with the dest dir process (174) in the use of
the dir and dir_hdr rings). These coordination details are necessary to
insure that the requested directory tree from the source disk is correctly
created on the dest disk.

The pseudo-code for the dest write process is organized as follows.
A short top-level piece of pseudo-code describes the process as it does
its four main actions (taking ring census, assigning ring priority,
choosing a ring, and writing a ring). The first three actions are then each
described by more detailed pieces of pseudo-code. The fourth action (writing
a ring) depends on which ring is being written. So there are four longer
pieces of pseudo-code corresponding the the writing of the four main rings
(data, hdr, dir, and dir_hdr).

Though the four longer pieces of pseudo-code are all written out there are
major similarities among them. For example, the writing of the dir_hdr
ring is identical to the writing of the hdr ring except for the names of
the ring-dependent variables. )

ENTRY POINT A:

(First Main Action)

Count the Ready and Free segments in each ring (132,172,176,192).

(Second Main Action)

Assign a priority to each ring (132,172,176,192)

If (no ring has a ready segment) then (see if there will be any ready segments in the future)

if (write_ptr = insert_ptr) and
     (source open process DONE flag is set) then (no more ready segments in future. Check for partially filled segments
    in the dir_hdr ring still waiting for update of the LBN fields.)

if (dest_dir_hdr_STAT(dir_hdr_ex_ptr) = seg_await_lbn) then (there is a partial segment. Change its STAT field to ready so it
       will be written out next time this process is called at ENTRY POINT A.)

dest_dir_hdr_STAT(dir_hdr_ex_ptr) = seg_ready

Return to Process Sequence Control (240) to be called again at
          ENTRY POINT A else  (no partial segment)

Write the Allocation Control List (162) to the dest disk (22)

Set DONE flag for the dest write process
       Return to Process Sequence Control (240) never to be called again else  (there may be more ready segments in the future)

Return to Process Sequence Control (240) to be called again at
       ENTRY POINT A else  (there is at least one segment ready to write)

(Third Main Action)

Choose which ring to write (Fourth Main Action)

Write the selected ring

Go To ENTRY POINT A

PSEUDO-CODE FOR THE DESTINATION WRITE PROCESS (160)

COUNT READY AND FREE SEGMENTS IN EACH RING

*P6.1*

(The following is a nested loop. The outer loop is executed four times
(once for each ring 132, 172, 176, 192). The inner loop is executed
either 2 or 3 times (once for each segment in a ring).)

For each ring

For each segment in this_ring if (this_ring_STAT(this_segment) = seg_free) then
       free_segs(this_ring) = itself + 1

```
   if (this_ring_STAT(this_segment) = seg_ready) then
      ready_segs(this_ring) = itself + 1

End of inner loop

End of outer loop

PSEUDO-CODE FOR THE DESTINATION WRITE PROCESS (160)

ASSIGN A PRIORITY TO EACH RING
```

P6.2

```
(The following is a loop executed four times (once for each ring
132, 172, 176, 192). The function Ring_Number is defined as follows:

Ring_Number(data ring 132)    = 4
   Ring_Number(hdr ring 172)     = 3
   Ring_Number(dir ring 176)     = 2
   Ring_Number(dir_hdr ring 192) = 1

Priority is assigned according to the following algorithm:

No ready segments              priority = 0
   Still plenty of free segments  priority = Ring_Number
   Only 1 free segment            priority = 4 + Ring_Number
   Ring full - no free segments   priority = 8 + Ring_Number)

For each ring if (ready_segs(this_ring) = 0) then priority(this_ring) = 0 else priority(this_ring) = 8 - 4 * free_segs(this_ring)

if (priority(this_ring) < 0) then priority(this_ring) = 0 priority(this_ring) = priority(this_ring) + Ring_Number(this_ring)

End of loop

PSEUDO-CODE FOR THE DESTINATION WRITE PROCESS (160)

CHOOSE WHICH RING TO WRITE
```

P6.3

```
(See if we are currently writing from a ring)

if (current_ring = no_ring) then          (dest write process is idle)

Choose the highest priority ring else  (we are currently writing from a ring)

(see if another ring is close enough to being clear full to justify switching
   rings (and incurring a mechanical motion delay))

if (priority(any_ring) > threshold) and
      (priority(current_ring) < threshold) then Choose the highest priority ring else  (there are no urgent rings)

Stay with current ring (NOTE: Typical values of threshold are 5 - 12. The value of threshold
which maximizes throughput depends on the average file size as well as
segment and ring sizes.)
```

PSEUDO-CODE FOR THE DESTINATION WRITE PROCESS (160)

WRITING THE DATA RING (132)

(see if this segment is to placed immediately after the last data segment written)

if (dest_dat_PLACEMENT(dat_ex_ptr) = seg_sequential) then (segment is to be placed after the last segment written. See if there is room on the disk in the space allowed for data)

Temp = data_lbn + dest_dat_LEN(dat_ex_ptr)
   if (Temp > data_base + data_size) then (there is no more room in the allowed space for data. Handle the error condition by conventional techniques known to a person of ordinary skill in the art. For example, displaying an error message for the operator, logging an error message in a file, etc.)

else (there is room for this segment)

(place this segment immediately following the last segment written)
     dest_dat_LBN(dat_ex_ptr) = data_lbn (Send a block level write command to the driver system (18) to begin writing.
NOTE: control returns from this command as soon as VMS has recorded the
request in its internal data structures. When the writing completes, VMS
sets fields in the Synchronization/Status structure. The block level write
command ($QIO) and the content and use of the Synchronization/Status structure
are described in the VAX/VMS SYSTEM SERVICES REFERENCE MANUAL.)

$QIO( Write Logical Block Function Code,
     Address of Synchronization/Status structure,
     Channel Number for the dest disk,   (there is just 1 chan to dest disk)
     dest_dat(dat_ex_ptr),   (address of data to be written)
     dest_dat_LEN(dat_ex_ptr),   (number of blocks to write)
     dest_dat_LBN(dat_ex_ptr))   (starting absolute LBN on dest disk)

Return to Process Sequence Control (240) to be called again at
  ENTRY POINT B3

ENTRY POINT B3:

(see if the write operation is still underway. NOTE: the dest write process
(160) has only one $QIO write operation going at a time so it only has
one Synchronization/Status structure and one channel number and the dest
disk never has more than one command posted to it at at time. By contrast,
the source search process (40), the source open process (41), and the
source read process (130) each independently issue commands to the source
disk with their own Synchronization/Status structures and their own channel
numbers. The queue of commands to the source disk is maintained in VMS
internal data structures.)

if (Completion Flag is not set in Synchronization/Status structure) then (write operation is still going)
  Return to Process Sequence Control (240) to be called again at
    ENTRY POINT B3

{Write operation is now done. The number of data files begun in the segment just written was put in the SEG_FILE_COUNT field by the read process 130. Their slot numbers in the File Description Ring (90) were stored in the SEG_FILE_ARRAY by the read process 130. Their segment-relative logical block numbers were stored in the dest_lbn field of their entries in the File Description Ring (90) by the read process 130. The following loop is executed once for each file begun in this segment. The purpose of the loop is to convert the segment-relative LBNs to absolute LBNs now that the location of the segment on the disk is known, thus completing the information in the File Description Ring (90) so that the hdr process (170) can create their headers.} i = 0    {i is used as index into the SEG_FILE_ARRAY}

While (i < SEG_FILE_COUNT(dat_ex_ptr) > 0) do

{The write_ptr 98 would always be pointing to the next file in the File Description Ring (90) that needs its LBN converted to absolute EXCEPT ᵤᵢ ₜₕᵤ fact that directory files are mixed in with data files in Ring 90. So SEG_FILE_ARRAY is used as the definitive list of slots in Ring 90 to update and the write_ptr 98 is set to point to the slot being updated so that the write_ptr 98 stays current} write_ptr = SEG_FILE_ARRAY(i)

{convert the segment-relative LBN to absolute LBN}

Ring90(write_ptr).dest_lbn = itself + dest_dat_LBN(dat_ex_ptr)

{Mark the blocks to which this segment was written as in use}

Allocate_Blks_in_Bitmap( Ring90(write_ptr).Alloc_len,   {file length}
                        Ring90(write_ptr).LBN)          {file LBN}

{We are done updating the LBN of one file begun in this segment. Increment the index into SEG_FILE_ARRAY and loop back for next one.} i = i + 1

END of WHILE LOOP
{Compute the absolute block number where the next segment of data will go} data_lbn = data_lbn + dest_dat_LEN(dat_ex_ptr)

{Mark this segment of the dat ring as unused} dest_dat_STAT(dat_ex_ptr) = seg_free

{Advance the extract location in the data ring}

INCR(dat_ex_ptr)

PSEUDO-CODE FOR THE DESTINATION WRITE PROCESS (160)

WRITING THE HDR RING (172)

{see if this segment is to placed immediately after the last hdr segment written} if (dest_hdr_PLACEMENT(hdr_ex_ptr) = seg_sequential) then

{segment is to be placed after the last segment written. See if there is
room on the disk in the space allowed for hdrs}

Temp = hdr_lbn + dest_hdr_LEN(hdr_ex_ptr)
if (Temp > hdr_base + hdr_size) then

{there is no more room in the allowed space for hdrs. Handle the
   error condition by conventional techniques known to a person of ordinary
   skill in the art. For example, displaying an error message for the
   operator, logging an error message in a file, etc.)

else {there is room for this segment}

{place this segment immediately following the last segment written}
   dest_hdr_LBN(hdr_ex_ptr) = hdr_lbn {Send a block level write command to the driver system (18) to begin writing.
NOTE: control returns from this command as soon as VMS has recorded the
request in its internal data structures. When the writing completes, VMS
sets fields in the Synchronization/Status structure. The block level write
command ($QIO) and the content and use of the Synchronization/Status structure
are described in the VAX/VMS SYSTEM SERVICES REFERENCE MANUAL.}

$QIO( Write Logical Block Function Code,
      Address of Synchronization/Status structure,
      Channel Number for the dest disk,    (there is just 1 chan to dest disk)
      dest_hdr(hdr_ex_ptr),         (address of data to be written)
      dest_hdr_LEN(hdr_ex_ptr),     (number of blocks to write)
      dest_hdr_LBN(hdr_ex_ptr))     (starting absolute LBN on dest disk)

Return to Process Sequence Control (240) to be called again at
  ENTRY POINT B2

ENTRY POINT B2:

{see if the write operation is still underway}
if (Completion Flag is not set in Synchronization/Status structure) then {write operation is still going}
   Return to Process Sequence Control (240) to be called again at

ENTRY POINT B2

{Write operation is now done. Compute the absolute block number where the
next segment of hdrs will be written} hdr_lbn = hdr_lbn + dest_hdr_LEN(hdr_ex_ptr)

{Mark this segment of the hdr ring as unused} dest_hdr_STAT(hdr_ex_ptr) = seg_free

{Advance the extract location in the hdr ring}

INCR(hdr_ex_ptr)

PSEUDO-CODE FOR THE DESTINATION WRITE PROCESS (160)

WRITING THE DIR RING (176)

P6.6

(see if this segment is to placed immediately after the last dir segment written)

if (dest_dir_PLACEMENT(dir_ex_ptr) = seg_sequential) then (segment is to be placed after the last segment written. See if there is room on the disk in the space allowed for dirs)

Temp = dir_lbn + dest_dir_LEN(dir_ex_ptr)
  if (Temp > dir_base + dir_size) then (there is no more room in the allowed space for dirs. Handle the error condition by conventional techniques known to a person of ordinary skill in the art. For example, displaying an error message for the operator, logging an error message in a file, etc.)

else (there is room for this segment)

(place this segment immediately following the last segment written)
    dest_dir_LBN(dir_ex_ptr) = dir_lbn (Send a block level write command to the driver system (18) to begin writing.
NOTE: control returns from this command as soon as VMS has recorded the
request in its internal data structures. When the writing completes, VMS
sets fields in the Synchronization/Status structure. The block level write
command ($QIO) and the content and use of the Synchronization/Status structure
are described in the VAX/VMS SYSTEM SERVICES REFERENCE MANUAL.)

$QIO( Write Logical Block Function Code,
    Address of Synchronization/Status structure,
    Channel Number for the dest disk,   (there is just 1 chan to dest disk)
    dest_dir(dir_ex_ptr),    (address of data to be written)
    dest_dir_LEN(dir_ex_ptr),   (number of blocks to write)
    dest_dir_LBN(dir_ex_ptr))   (starting absolute LBN on dest disk)

Return to Process Sequence Control (240) to be called again at
  ENTRY POINT B3

ENTRY POINT B3:

(see if the write operation is still underway. NOTE: the dest write process
(160) has only one $QIO write operation going at a time so it only has
one Synchronization/Status structure and one channel number and the dest
disk never has more than one command posted to it at at time. By contrast,
the source search process (40), the source open process (41), and the
source read process (130) each independently issue commands to the source
disk with their own Synchronization/Status structures and their own channel
numbers. The queue of commands to the source disk is maintained in VMS
internal data structures.)

if (Completion Flag is not set in Synchronization/Status structure) then (write operation is still going)
  Return to Process Sequence Control (240) to be called again at

ENTRY POINT B3

{Write operation is now done. The number of dir files begun in the segment
just written was put in the DIR_SEG_FILE_COUNT field by the dir process 174.
Their segment-relative logical block numbers were stored in the LBN field
of their headers in the dir_hdr ring (192) by the dir process 174. The
following loop is executed once for each file begun in this segment. The
purpose of the loop is to convert the segment-relative LBNs to absolute
LBNs now that the location of the segment on the disk is known, thus
completing the headers and releasing them for writing to the dest disk.}

While (DIR_SEG_FILE_COUNT(dir_ex_ptr) > 0) do

{Copy the file length and segment-relative LBN to temporary locations.
   NOTE: as usual, lbn_rel_ptr identifies the segment and lbn_rel_count
   identifies the block of the header being updated}

Temp1 = dest_dir_hdr(lbn_rel_count,lbn_rel_ptr).id_area.next_vbn_to_allocate
   Temp2 = dest_dir_hdr(lbn_rel_count,lbn_rel_ptr).map.lbn {Convert segment-relative LBN to absolute LBN}

Temp2 = Temp2 + dest_dir_LBN(dir_ex_ptr)

{Put the absolute LBN and final LEN back into the header in the
   compressed map format}

Compress_Map( Temp1,                                      (file length)
              Temp2,                                      (file LBN)
              dest_dir_hdr(lbn_rel_count,lbn_rel_ptr)) (address of header)

{Add the checksum to the completed header}

Add_Checkword(dest_dir_hdr(lbn_rel_count,lbn_rel_ptr),  (address of header)
            255)                                      (offset of checksum)

{Mark the blocks to which this segment was written as in use}

Allocate_Blks_in_Bitmap( Temp1,                          (file length)
                     Temp2)                            (file LBN)

{Advance the LBN-RELEASE location in the dir_hdr ring} lbn_rel_count = ((lbn_rel_count + 1) modulo seg_size)

{see if we crossed a segment boundary in the dir_hdr ring}
   if (lbn_rel_count = 0) then {the LBN-RELEASE location crossed a segment boundary. The segment we
     just left can now be released for writing to dest disk} dest_dir_hdr_STAT(lbn_rel_ptr) = seg_ready

{advance the pointer to the new segment}

INCR(lbn_rel_ptr)

{We are done updating the header of one file begun in this segment.
Decrement the count of files begun in this segment and loop back for
the next one.}

DIR_SEG_FILE_COUNT = DIR_SEG_FILE_COUNT - 1      R30

END of WHILE LOOP

{Compute the absolute block number where the next segment of dirs will go} dir_lbn = dir_lbn + dest_dir_LEN(dir_ex_ptr)

{Mark this segment of the dir ring as unused} dest_dir_STAT(dir_ex_ptr) = seg_free

{Advance the extract location in the dir ring}

INCR(dir_ex_ptr)

PSEUDO-CODE FOR THE DESTINATION WRITE PROCESS (160)

WRITING THE DIR_HDR RING (192)

Pg.7

{see if this segment is to placed immediately after the last dir_hdr segment
written} if (dest_dir_hdr_PLACEMENT(dir_hdr_ex_ptr) = seg_sequential) then

{segment is to be placed after the last segment written. See if there is
  room on the disk in the space allowed for dir_hdrs}

Temp = dir_hdr_lbn + dest_dir_hdr_LEN(dir_hdr_ex_ptr)
  if (Temp > dir_hdr_base + dir_hdr_size) then {there is no more room in the allowed space for dir_hdrs. Handle the
    error condition by conventional techniques known to a person of ordinary
    skill in the art. For example, displaying an error message for the
    operator, logging an error message in a file, etc.} else {there is room for this segment}

{place this segment immediately following the last segment written}
    dest_dir_hdr_LBN(dir_hdr_ex_ptr) = dir_hdr_lbn {Send a block level write command to the driver system (18) to begin writing.
NOTE: control returns from this command as soon as VMS has recorded the
request in its internal data structures. When the writing completes, VMS
sets fields in the Synchronization/Status structure. The block level write
command ($QIO) and the content and use of the Synchronization/Status structure
are described in the VAX/VMS SYSTEM SERVICES REFERENCE MANUAL.}

$QIO( Write Logical Block Function Code,
      Address of Synchronization/Status structure,
      Channel Number for the dest disk,    (there is just 1 chan to dest disk)
      dest_dir_hdr(dir_hdr_ex_ptr),        (address of data to be written)
      dest_dir_hdr_LEN(dir_hdr_ex_ptr),    (number of blocks to write)
      dest_dir_hdr_LBN(dir_hdr_ex_ptr))    (starting absolute LBN on dest disk)

Return to Process Sequence Control (240) to be called again at
  ENTRY POINT 84

ENTRY POINT 84:

(see if the write operation is still underway)
if (Completion Flag is not set in Synchronization/Status structure) then (write operation is still going)
  Return to Process Sequence Control (240) to be called again at

ENTRY POINT 84

(Write operation is now done. Compute the absolute block number where the
next segment of dir_hdrs will be written)

dir_hdr_lbn = dir_hdr_lbn + dest_dir_hdr_LEN(dir_hdr_ex_ptr)

(Mark this segment of the dir_hdr ring as unused)

dest_dir_hdr_STAT(dir_hdr_ex_ptr) = seg_free (Advance the extract location in the dir_hdr ring)

INCR(dir_hdr_ex_ptr)

PSEUDO-CODE FOR THE PROCESS SEQUENCE CONTROL (240)

{ The Process Sequence Control (240) is responsible for transferring
control to each of the processes (40,41,130,170,174,160) in a round-robin
fashion. Each process will continue to execute until it becomes blocked
for a circumstance such as no input data, no room for output data,
or waiting on a disk read or write operation. When a process is blocked
it returns control to the Process Sequence Control (240) which activates
the next process.

Each process (40,41,130,170,174,160) has a DONE flag which it sets when
it determines that there is no more work for it to do. Processes with
their DONE flag set are skipped in the rotation.

When all the DONE flags are set, Process Sequence Control (240) exits
to the operating system causing termination of the program.}

Repeat if (source search process DONE flag is not set) then
  Pass control to the source search process if (source open process DONE flag is not set) then
  Pass control to the source open process if (source read process DONE flag is not set) then
  Pass control to the read process if (destination write process DONE flag is not set) then
  Pass control to the destination write process if (destination header process DONE flag is not set) then
  Pass control to the destination header process if (destination directory process DONE flag is not set) then
  Pass control to the destination directory process Until (all DONE flags are set)

EXPLANATORY NOTE: Use of the STAT field in the Dir_Hdr Ring 192

```
Contents of STAT field
dir_hdr_STAT(any_seg)                Meaning
---------------------                ------- seg_free                  Segment is not in use seg_busy                  Dir_hdr_ins_ptr points to this segment.
                          New dir_hdrs are being created in this segment.

seg_await_len             No more new headers being created in this
                          segment. Len fields are being updated in
                          this segment. Len_rel_ptr points to this
                          segment.

seg_await_lbn             No more len fields need updating in this
                          segment. LBN fields are being updated in
                          this segment. LBN_rel_ptr points to this
                          segment.

seg_ready                 All headers are complete. Segment is ready
                          to be written to disk.
```

EXPLANATORY NOTE: Order of Files in File Description Ring (90).

The source search process (40) and the source open process (41) guarentee that:

1. A given directory file will precede in Ring 90 all files in that directory. There may be other files between a given directory file and the files it contains.

2. All the DIRECTORY files contained in a given directory will form a contiguous block of files in Ring 90. Within this block, the files are in alphabetical order by file name.

3. All the DATA files contained in a given directory will form a contiguous block of files in Ring 90. Within this block, the files are in alphabetical order by file name.

4. The block of DIRECTORY files from a given directory is immediately followed in Ring 90 by the block of DATA files from that same directory. Taken together, these two blocks are the entire contents of the given directory.

5. The order of directory files is identical to the order of content blocks. In other words, if directory file A precedes directory file B in Ring 90 then the blocks of files contained in directory A will precede the blocks of files contained in directory B.

The destination directory process (174) depends on the above rules to correctly recreate the directory tree on the destination disk (22).

EXAMPLE DIRECTORY TREE:
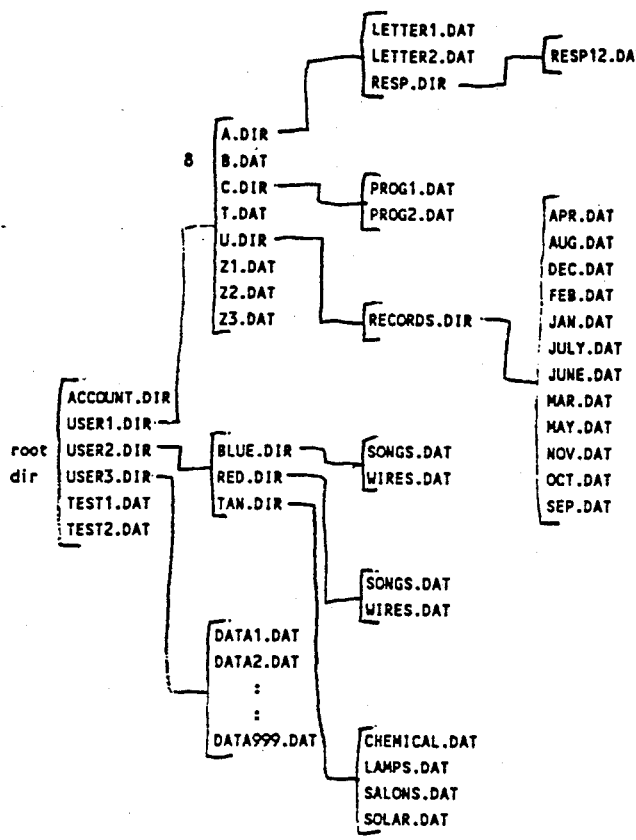
ORDER OF FILES IN RING 90 FOR EXAMPLE DIRECTORY TREE:
```
ROOT.DIR
USER1.DIR — 1
USER2.DIR — 6
USER3.DIR
ACCOUNT.DAT
TEST1.DAT
TEST2.DAT
    A.DIR ⎫
    C.DIR ⎬ — 2
4 — U.DIR ⎭
    B.DAT ⎫
    T.DAT ⎪
    Z1.DAT ⎬ — 3
    Z2.DAT ⎪
    Z3.DAT ⎭
    BLUE.DIR ⎫
    RED.DIR  ⎬ — 7
    TAN.DIR  ⎭
    DATA1.DAT
    DATA2.DAT
        :
        :
    DATA999.DAT
    RESP.DIR
    LETTER1.DAT
    LETTER2.DAT
    PROG1.DAT
    PROG2.DAT
```

```
5 — RECORDS.DIR
    SONGS.DAT
    WIRES.DAT
    SONGS.DAT
    WIRES.DAT
    CHEMICAL.DAT
    LAMPS.DAT
    SALONS.DAT
    SOLAR.DAT
    RESP12.DAT
    APR.DAT
    AUG.DAT
    DEC.DAT
    FEB.DAT
    JAN.DAT
    JULY.DAT
    JUNE.DAT
    MAR.DAT
    MAY.DAT
    NOV.DAT
    OCT.DAT
    SEP.DAT
```

ILLUSTRATION OF THE FIVE RULES USING THE EXAMPLE DIRECTORY TREE:

Rule 1: The USER1 directory file (1) precedes its contents (2,3). The U directory file (4) precedes its contents (5) though they are separated by more than 1000 files.

Rule 2: The directory files (2) contained in the USER1 directory form a contiguous block of files in alphabetical order.

Rule 3: The data files (3) contained in the USER1 directory form a contiguous block of files in alphabetical order.

Rule 4: The block of directory files (2) contained in directory USER1 is immediately followed by the block of data files (3) contained in directory USER1. Blocks 2 and 3 comprise the entire contents of directory USER1.

Rule 5: USER1 directory file (1) precedes the USER2 directory file (6). Likewise, the contents of the USER1 directory (2,3) precede the contents of the USER2 directory (7).

EXPLANATORY NOTE: Method of Alphabetizing Directory Entries

VMS requires that the entries in a directory file be alphabetical by filename. Note: this requirement only effects the contents of the directory files. It has no effect on the placement of files on a disk or on the order of their headers in the index file.

The following discussion refers to the Explanatory Note called "Order of Files in File Description Ring (90)".

The Dir process (174) must create a directory file on the dest disk (22) for directory USER1 containing a single alphabetical list of the files in USER1 (8). BUT, the Dir Process 174 must handle files in the order it encounters them in Ring 90 (2,3) which is not quite the right order. In Ring 90 they are in two separate alphabetical lists, one for directory files (2) and one for data files (3).

The Dir process (174) uses the following simple scheme to merge the
two alphabetical lists into a single list. As it moves file-by-file
through Ring 90 it creates directory entries for data files directly
into the Dir Ring (176). But it creates directory entries for directory
files into a temporary holding area (the Dir_Entry Ring (178)) which acts
like a FIFO buffer for directory entries. Rules 2,3, and 4 guarentee that
by the time the directory entry for the first data file (B.DAT) is ready
to be inserted into the Dir Ring 176, the directory entries for the directory
files (A.DIR, C.DIR, U.DIR) have been created and are waiting, in order,
in the Dir_Entry Ring 178. So, before inserting the directory entry for
the data file (B.DAT) into the Dir Ring 176, the Dir Process 174 first moves
a directory entry from the Dir_Entry Ring 178 to the Dir Ring 176 for each
directory file (just A.DIR in this example) which precedes in alphabetical
order the data file (B.DAT). In this way, the Dir Process 174 acts as an
"alphabetizing switch" to merge the two lists of files into a single
alphabetical list.

EXPLANATORY NOTE: Clusters

BLOCKS

To VMS a block is always 512 bytes. This is true even if the physical
size of a sector on the disk is larger. If the physical size is larger
then the interface electonics perform the conversion. In TURBOSTORE
a block is always 512.

E3

CLUSTERS

A cluster is a group of either 1, 2, 3, or 4 contiguous blocks on current
VMS disks. In the preferred embodiment the cluster size is 4.

Blocks are allocated to files by cluster. A one byte file will use 1
cluster on the disk. The number of blocks occupied by a file will always
be an integer multiple of the cluster size. There is a bit in the allocation
control bitmap for each cluster (not for each block). Files always start
on cluster boundaries.

In general, operating systems introduce the concept of the cluster for larger
disks where the size of the allocation control list (and therefore the
speed of manipulating it) would be a problem if there were 1 element in the
allocation control list per block.

In VMS, the actual length of a file is a number of bytes which, in general,
will not be an integral number of blocks or clusters. The field efblk (end of
file block) in the header contains the number of blocks (including a
partially filled block at the end) containing file data. The field ffbyte
(first free byte) gives the byte number where the file data ends in the
last block (the partially filled block). The fields hiblk and
next_vbn_to_allocate store the number of blocks allocated to the file
(which is efblk rounded up to be an integral number of clusters).

DATA STRUCTURE DEFINITION: File_Descr_Type size = 434 bytes

DS 1

This data structure defines the content of each slot in the File Description
Ring (90).

Data files from the File_ID Ring (180) and directory files from the Tree
Array (182) which are successfully opened by the Source Open Process (41)
are placed into the File Description Ring (90).

| Field Name | size in bytes | content |
|---|---|---|
| ID | 218 | File_ID_Type  *See. DS 2* |
| chan | 4 | VMS channel used to access the file on the source disk (20) |
| dest_alloc_len | 4 | Number of blocks allocated to this file on the destination disk (22) |
| dest_lbn | 4 | Absolute logical block number where the file will be located on the destination disk (22) |
| len | 4 | Length of this file in blocks |
| hdr | 200 | The complete ID_Area from the file's header on the  *See. DS 4* source disk (20) |

DATA STRUCTURE DEFINITION: File_ID_Descr_Type size = 218 bytes

This data structure defines the content of each slot in the File_ID Ring (180). It also defines the content of each element in the Tree Array (182).

Data Files from the source disk which match the user's request are placed in the File_ID Ring (180) by the source search process (40).

Directory Files from the source disk which match the user's request are placed in the Tree Array (182) by the source search process (40).

*DS2*

| Field Name | size in bytes | content |
|---|---|---|
| name.body | 190 | file name in ascii |
| name.len | 2 | length of file name |
| dir | 4 | slot number of its directory in the Tree Array (182) |
| file_num | 4 | unique number used to identify the file (the File ID on the dest disk will be derived from this number) |
| search_num | 4 | a sequential number assigned to this file by the source search process (40) |
| fid | 6 | FID_Type. File ID on source disk. |
| did | 6 | FID_Type. Directory's File ID on source disk. |
| level | 1 | the level in the source disk directory tree where this file came from (root = 0, next level down = 1, etc). |
| is_a_dir | 1 | flag indicating whether this file is a data file or a directory file |

*See DS 3* (for fid and did)

DATA STRUCTURE DEFINITION: FID_Type size = 6 bytes

This structure is used to store File ID's. The File ID comprises three numbers: file number, sequence number, and relative volume number. The File ID uniquely identifies files on a VMS disk. Files may have the same names and version numbers but their file IDs must be unique.

Two representations are used for this 6 byte structure.

Representation #1:

| Field Name (if used) | size in bytes | content (if used) |
|---|---|---|
| num | 2 | lower 2 bytes of 3 byte file number |
| seq | 2 | sequence number |
| rvn | 1 | relative volume number |
| nmx | 1 | file number extension - highest byte of 3 byte file number |

Representation #2:

| Field Name (if used) | size in bytes | content (if used) |
|---|---|---|
| a | 2 | first number |
| b | 2 | second number |
| c | 2 | third number |

DATA STRUCTURE DEFINITION: ID_Area_Type size = 200 bytes

This data structure is defined by DEC in the ACP-QIO Interface Chapter of the VAX/VMS IO USER'S REFERENCE MANUAL. Further details of the definition can be found in the macro library files LIB.MLB and STARLET.MLB in the system library (SYS$LIBRARY) and by examination of file headers using the DUMP utility.

This data structure is the first 200 bytes of the file header.

This data structure is copied largely unmodified from the source disk to the destination disk. The pseudo-code describes which fields are read and which fields are modified.

The unused fields are always copied unmodified from the source disk to the destination disk. They contain information about the file which is independent of where the file is stored. This information is used by VMS but not by TURBOSTORE.

| Field Name (if used) | size in bytes | content (if used) |
|---|---|---|
| unused | 1 | |
| unused | 1 | |
| unused | 1 | |
| unused | 1 | |
| exten_seg_num | 2 | extension segment number |
| unused | 1 | |
| unused | 1 | |
| fileid_a | 2 | file ID - first number |
| fileid_b | 2 | file ID - second number |
| fileid_c | 2 | file ID - third number |
| exten_fileid_a | 2 | extension file ID - first number |
| exten_fileid_b | 2 | extension file ID - second number |
| exten_fileid_c | 2 | extension file ID - third number |
| RMS_attr | 32 | RMS_Attributes_Type    See DS 5 |
| unused | 4 | |
| unused | 2 | |
| map_area_words | 2 | map area size in words |
| unused | 2 | |
| unused | 2 | |
| unused | 2 | |
| back_link_fileid_a | 2 | back_link file ID - first number |
| back_link_fileid_b | 2 | back_link file ID - second number |
| back_link_fileid_c | 2 | back_link file ID - third number |
| unused | 2 | |
| unused | 2 | |
| next_VBN_to_allocate | 4 | blocks allocated to file |
| filename1 | 20 | filename - first part |
| unused | 2 | |
| unused | 8 | |
| unused | 8 | |
| unused | 8 | |
| unused | 8 | |
| filename2 | 66 | filename - second part |

DATA STRUCTURE DEFINITION: RMS_Attributes_Type

DS 5 size = 32 bytes

This data structure is defined by DEC in the ACP-QIO Interface Chapter of the VAX/VMS IO USER'S REFERENCE MANUAL. This structure is part of the file header.

This structure contains information about the internal layout of a file which is used by various modules in VMS to modify, store, and retrieve information from the file.

This structure is copied unmodified from the source disk (20) to the destination disk (22) with the exception of the hiblk field which contains the number of blocks allocated to the file. This number may be adjusted slightly if the cluster sizes of the source and destination disks are different.

The unused fields are always copied unmodified from the source disk to the destination disk. They contain information about the file which is independent of where the file is stored. This information is used by VMS but not by TURBOSTORE.

| Field Name (if used) | size in bytes | content (if used) |
|---|---|---|
| unused | 1 | |
| unused | 1 | |

| | | |
|---|---|---|
| unused | 2 | |
| hiblk | 4 | allocated blocks |
| efblk | 4 | actual file length |
| ffbyte | 2 | first free byte |
| unused | 1 | |
| unused | 1 | |
| unused | 2 | |
| unused | 2 | |
| unused | 2 | |
| unused | 8 | |
| unused | 2 | |
| | | |
| total | 32 bytes | |

DATA STRUCTURE DEFINITION: File_Header_Type size = 512 bytes

DS 6

The file header contains attribute and location information about the file. The file header ends with a 2-byte checksum which is used to detect corruption of the information in the header.

The ID_Area contains the attribute information including the filename, file size, number of blocks allocated to file, file's internal structure, file's creation, revision, and backup dates, pointer to its directory file, access control information, and other information used by VMS.

The Map_Area contains the location information for the file. A file may be stored in non-contiguous pieces called extents. The Map_Area contains the list of the extents including length and absolute logical block number on the disk of each extent. This list is stored in compressed format to conserve space in the file header.

| field name | size in bytes | contents |
|---|---|---|
| ID_Area | 200 | ID_Area_Type  DS 4 |
| Map_Area | 310 | Map_Area_Type  DS 7 |
| Checkword | 2 | 2-byte checksum of header |

DATA STRUCTURE DEFINITION: Map_Area_Type size = 310 bytes

DS 7

This region of the file header is used to store the compressed list of extents of the file. Because the compressed list is a variable length list of variable length elements it cannot be represented by a static data structure. Since the compression algorithm operates on words it is represented below as an array of words (representation #1).

When a directory header is created by the Dir Process (174) its Map_Area is empty because the file's length and absolute logical block number on the dest disk (22) are unknown. During this time the Map_Area is used to store temporarily the file's length and absolute LBN as they become available. Consequently, the Map_Area is also represented below as two integers followed by unused area (representation #2).

The Map_Area in the file header is newly created for each file written to the destination disk (22).

Representation #1:

| Field Name (if used) | size in bytes | content (if used) |
|---|---|---|
| word | 310 | array of 155 words of 2 bytes each storing the compressed map |

Representation #2:

| Field Name (if used) | size in bytes | content (if used) |
|---|---|---|
| len | 4 | file length |
| lbn | 4 | LBN of file on dest disk |
| unused | 302 | |

DATA STRUCTURE DEFINITION: Directory_Entry

DS 8 size = variable

This variable length data structure defines the content of each directory entry in a directory file. There is one directory entry for each file in a directory regardless of how many versions of the file are present.

The length of this structure varies with the length of the file name and with the number of versions of the file as follows:

Length (in bytes) = 6 + L + (8 * V)

where
L = length of file name rounded up to nearest even number
V = number of versions of the file The repeated fields (Version and ID) shown below represent a list. There is an element in the list for each version of the file. Each element in the list gives the version number and file ID for that version. The list is stored by descending version number.

| Field Name | size in bytes | content |
|---|---|---|
| Length | 2 | Length of entry (does not include the two bytes of the Length field) |
| unused | 3 | |
| Name_Length | 1 | Actual length of file name (not rounded) |
| Name | L | File name. If Name_Length is odd a byte containing zero is appended. |

REPEAT

| | | |
|---|---|---|
| Version | 2 | Version number. |
| ID | 6 | FID_Type. |

END OF REPEAT

EXPLANATORY NOTE: Placement Control Variables in Dest Write Process (160)

```
data_lbn     = absolute block number on dest disk where the next segment
                 from the data ring (132) will be written
hdr_lbn      = same but for the hdr ring (172)
dir_lbn      = same but for the dir ring (176)
dir_hdr_lbn  = same but for the dir_hdr ring (192)

data_base    = absolute block number on dest disk where the space allowed
                 for the data ring (132) contents begins.
hdr_base     = same but for the hdr ring (172)
dir_base     = same but for the dir ring (176)
dir_hdr_base = same but for the dir_hdr ring (192)

data_size    = size in blocks of the space allowed for the data ring (132).
hdr_size     = same but for the hdr ring (172)
dir_size     = same but for the dir ring (176)
dir_hdr_size = same but for the dir_hdr ring (192)
```

DS9

SUBROUTINE DEFINITION: Compress_Map

The Compress_Map subroutine is called whenever a file header is being completed. Thus it is called by the Dest Hdr process (170) for data files and by the Dest Write process (160) for directory files.

On VMS disks, a file can be stored non-contiguously (i.e. in pieces). Each piece is called an extent. The list of extents is stored in the header. The length in blocks and the absolute LBN of each extent is stored in this list.

To allow for the largest files and largest disks, 4-byte integers may be needed to hold length and LBN. At 8 bytes per extent a file with more than about 30 extents would exhaust the space in the header allowed for the list.

Therefore, VMS uses a data compression algorithm on the list when storing it into the header. The algorighm works on the principle that while some extents may need 4 bytes for the LBN, most do not. And while a few extents may need 4 bytes for the length, most do not.

The algorithm is simple. The pair of numbers (length, LBN) are stored in a 4, 6, or 8 byte format depending on their numerical magnitudes. Two bits are reserved to identify the format. The exact formats are shown below.

With this information a person of ordinary skill in the art can easily create the Compress_Map subroutine.

4 byte format (F=1)

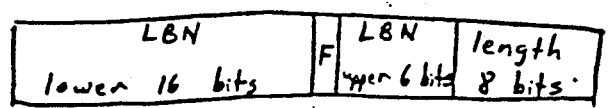

6 byte format (F=2)

8 byte format (F=3)

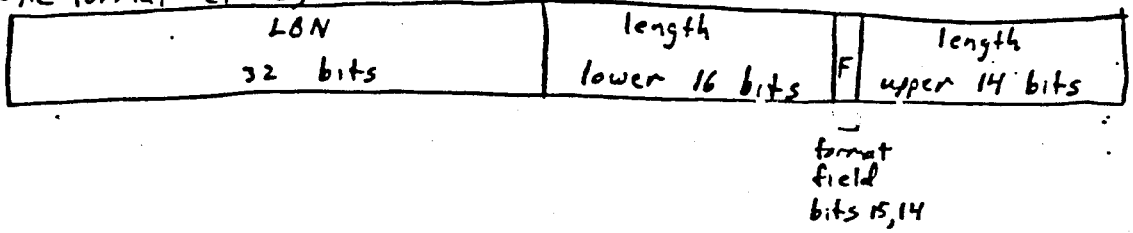

format field bits 15,14

SUBROUTINE DEFINITION: Allocate_Blks_in_Bitmap

This subroutine sets bits in the Allocation Control List Ring 162 (which is called the Bitmap under VMS).

There is one bit per cluster on the disk. When a cluster is in use its bit = 1. When a cluster is not in use its bit = 0.

This is simply a bit-setting subroutine. It does not check to see if the bits are already set. It never clears bits.

This subroutine has two input arguments: the number of blocks to mark as in use (they are assumed to be contiguous); and the absolute logical block number of the first block on the dest disk.

From these arguments, the subroutine computes the count and location of bits to set as follows:

count of bits = (number of blocks to mark as in use) / cluster_size
  location of bits = (absolute LBN of first block to mark) /cluster_size The only output of this subroutine is to cause bits to be set in the Allocation Control List Ring 162.

With this information a person of ordinary skill in the art can easily create this subroutine.

SUBROUTINE DEFINITION: INCR(pointer_name)

This is a pointer increment function. It advances a pointer to the next element of a ring. It takes into account the size of the elements and the number of elements in the ring.

In segmented rings it is used to advance the segment pointers. Blocks and bytes within segments are identified by simple counters which are incremented by adding one.

From the pointer name the subroutine looks up element size and ring size and advances the pointer as follows:

new pointer value = (old pointer value + element size ) modulo ring size

From this information a person of ordinary skill in the art can easily create this subroutine.

This subroutine is called throughout TURBOSTORE to advance pointers in many rings.

Pointers never move backwards in TURBOSTORE.

SUBROUTINE DEFINITION: Add_Checkword

The Add_Checkword subroutine is called whenever a file header is being completed. This it is called by the Dest Hdr process (170) for data files and by the Dest Write process (160) for directory files.

When VMS creates a header it generates and stores a checksum into the header. It later uses this checksum to detect corruption of the header information.

The subroutine has two arguments, the address of the header (ADDR) and the number of words to sum (NUM).

The checksum is generated as follows (a word = 2 bytes):

The first NUM words of the header at ADDR are summed. The lowest 16 bits of the resulting sum is stored in the (NUM+1)th word of the header.

With this information a person of ordinary skill in the art can easily create this subroutine.

SUBROUTINE DEFINITION: Create_Dir_Entry

Purpose:

Creates at a given location in memory the first part (non-repeated part) of a Directory Entry (see the DATA STRUCTURE DEFINITION: Directory_Entry) using a given file name. The non-repeated part consists of fields Length through Name.

This subroutine has two arguments, the location in memory and the file name.

Operation:

Count characters in the given file name.

Store count in field Name_Length.

Round count up to even number.

Store (4 + rounded count) in field Length.

Store given file name in field Name.

If actual length of file name is odd then store a zero byte following name.

From the above information a person of ordinary skill in the art can create this subroutine.

SUBROUTINE DEFINITION: Create_Dir_Version

Purpose:

Creates at a given location in memory the second part (the repeated part)
of a Directory Entry (see the DATA STRUCTURE DEFINITION: Directory_Entry)
using a given file name and a given file ID. The repeated part consists
of fields Version and ID. NOTE: the file name contains the version number.

This subroutine has three arguments, the location in memory, the file name,
and the file ID.

Operation:

Extract the version number from the given file name.

Store the version number in field Version.

Store the given file ID in field ID.

Add 8 to the contents of the Length field.

From the above information a person of ordinary skill in the art can
easily create this subroutine.

What I claim is:

1. A method of performing a multi-file transfer of at least two files to a random access storage media using a computer where each file includes file contents and has file location information, comprising the steps of:
 (a) storing the file contents of each file in a contents buffer comprising a segmented data buffer, and comprising the step of:
  (a1) storing the file contents received from a source media of a data file in the data buffer;
 (b) storing, separately from the contents buffer, the file location information for the at least two files in an information buffer comprising a segmented directory header buffer, a segmented header buffer and a segmented directory buffer, and comprising the steps of:
  (b1) producing a file directory entry from the file description information and storing the file directory entry in the directory buffer;
  (b2) producing a file header from the file description information and storing the file header in the header buffer; and
  (b3) producing a directory header from the file description information and storing the directory header in the directory header buffer; and
 (c) writing, to the storage media, a portion of the contents of the contents buffer when the contents buffer is a predetermined percentage full and separately writing a portion of the contents of the information buffer to the storage media, including the file location information of the at least two files, when the information buffer is the predetermined percentage full, and comprising the steps of:
  (c1) separately writing the contents of a full segment of the data, directory, header and directory header buffers to the random access storage media; and
  (c2) indicating on the storage media which portions of the storage media have been allocated; and
 (d) storing the file description information in a file description buffer.

2. A method as recited in claim 1, wherein when in step (b3) a directory header is stored before the directory is written in step (c1), step (c1) updates the directory header when the directory is written.

3. A method as recited in claim 1, wherein the file description buffer has entries and has associated therewith an insert pointer indicating in what entry in the file description buffer the file description information of step (d) is to be stored, a read pointer indicating what file is being stored in step (a1), a write pointer indicating what file contents are being written in step (c1), a directory pointer indicating the directory entry being stored in step (b1), an a header pointer indicating the file header being stored in step (b2).

4. A method of performing a multifile transfer from a random access non-removable storage media to a removable erasable optical disk using a computer where each file includes file contents and a directory listing the file, said method comprising the steps of:
 (a) locating the directories and files on the storage media, cr~ ng data file and directory file entries on a file description ring buffer and advancing an insert pointer for the file description ring buffer;

(b) retrieving file contents for each data file entry, storing, separately from the file description ring buffer, the file contents on a segmented file contents ring buffer and advancing a read pointer for the file description ring buffer when the insert pointer does not equal the read pointer;

(c) creating a file header for each data file entry on the description ring buffer, storing, separately from the file description ring buffer and the file contents ring buffer, the file header on a segmented file header ring buffer and advancing a file header pointer for the file description ring buffer when the file header pointer does not equal a write pointer;

(d) creating a directory entry for each directory file entry and each data file entry on the description ring buffer, storing, separately from the file description ring buffer, the file contents ring buffer, and the file header ring buffer, the directory entry on a segmented directory ring buffer and advancing a directory pointer for the file description ring buffer when the directory pointer does not equal the file header pointer;

(e) creating a directory header for each directory file entry on the description ring buffer, storing, separately from the file description ring buffer, the file contents ring buffer, the file header ring buffer, and the directory ring buffer, the directory header on a segmented directory header ring buffer and advancing the director pointer for the description ring buffer when the directory pointer does not equal the insert pointer;

(f) writing the contents of a segment of one of the segmented ring buffers to a corresponding region on the disk when a segment is full, and indicating that the written portion of the disk is in use on all allocation control list ring when the contents of the file contents ring buffer or the directory ring buffer are written;

(g) advancing the write pointer for the description ring buffer when step (f) writes from the file contents; and (h) writing the contents of the allocation control list ring to a corresponding region on the disk.

5. An apparatus for performing a multi-file transfer, comprising:

a random access source storage media storing source files and source file location information;

a random access destination storage media storing destination files and destination file location information; and a computer connected to said source and destination storage media, said computer including:

search means for searching the source storage media for files to be transferred and storing file description information for each file in a file description buffer;

file read means for reading contents of a file from the source storage media and storing, separately from the file description buffer, the file contents in a data buffer;

file location means for creating file location information from the file description information and storing, separately from the file description buffer and the data buffer, the location information in a location information buffer; and write means for writing a portion of the contents of the data buffer to the destination storage media when the data buffer is a predetermined percentage full and writing a portion of the contents of the information buffer to the destination storage media when the information buffer is a predetermined percentage full.

6. An apparatus for performing a multi-file transfer of at least two files, comprising:

a random access source storage media storing source files and source file location information;

a random access destination storage media storing destination files and destination file location information; and a computer connected to said source and destination storage media, said computer including:

search means for searching the source storage media for the at least two files to be transferred and storing file description information for each file in a file description buffer;

file read means for reading contents of the at least tow files from the source storage media and storing, separately from the file description buffer, the file contents in a data buffer;

file location means for creating file location information from the file description information and storing, separately from the file description buffer and the date buffer, the location information in a location information buffer;

write means for writing a portion of the contents of the data buffer to the destination storage media when the data buffer is a predetermined percentage full and writing a portion of the contents of the information buffer including the file location information for the at least two files to the destination storage media when the information buffer is a predetermined percentage full, and said data buffer and sad location information buffer each storing data units in said computer and upon which operations are performed, and said file data and information buffers comprising corresponding ring buffers storing the data units; and at least three operation pointers each designating the address of a data unit stored in one of said ring buffers upon which an operation is being performed.

7. An apparatus as recited in claim 6, wherein a first one of the operation pointers indicates the address where the file contents are stored, a second one of said operation pointers indicating the address where the file location information is stored and a third one of said operation pointers indicating the location of available space on said corresponding ring buffer.

8. A data structure as recited in claim 7, wherein there is a fixed order of said pointers around said ring buffer.

* * * * *

UNITED STATES PATENT AND TRADEMARK OFFICE
CERTIFICATE OF CORRECTION

PATENT NO. : 5,053,945

DATED : October 1, 1991

INVENTOR(S) : Whisler

It is certified that error appears in the above-identified patent and that said Letters Patent is hereby corrected as shown below:

```
Col. 1, line 14, after "such" insert --as--.
Col. 4, line 41, after "search" insert --40--.
Col. 7, line 52, delete first occurence of "of the".
Col. 8, line 5, delete "782,".
Col. 14, line 31, "With" should be --with--.
Col. 19, line 42, after "sector" insert --and--.

Col. 118, line 27, "tow" should be --two--.
```

Signed and Sealed this

Twenty-second Day of February, 1994

Attest:

BRUCE LEHMAN

*Attesting Officer*   *Commissioner of Patents and Trademarks*